United States Patent [19]
Suzuki et al.

[11] Patent Number: 5,481,553
[45] Date of Patent: Jan. 2, 1996

[54] METHODS AND APPARATUS FOR PREVENTING ROUNDING ERRORS WHEN TRANSFORM COEFFICIENTS REPRESENTING A MOTION PICTURE SIGNAL ARE INVERSELY TRANSFORMED

[75] Inventors: Teruhiko Suzuki, Chiba; Yoichi Yagasaki, Tokyo; Tatsuya Sudo, Kanagawa; Toru Okazaki, Tokyo, all of Japan

[73] Assignee: Sony Corporation, Tokyo, Japan

[21] Appl. No.: 202,783

[22] Filed: Feb. 28, 1994

[30] Foreign Application Priority Data

Mar. 1, 1993 [JP] Japan ................................. 5-040203
Mar. 19, 1993 [JP] Japan ................................. 5-059909

[51] Int. Cl.$^6$ ................................................ H04N 1/415
[52] U.S. Cl. ........................ 371/49.1; 348/403; 348/415; 364/725
[58] Field of Search ........................ 371/49.1; 364/725; 348/403, 409, 415

[56] References Cited

U.S. PATENT DOCUMENTS

| | | | |
|---|---|---|---|
| 4,463,377 | 7/1984 | Meyer-Ebrecht et al. | 358/133 |
| 4,807,033 | 2/1989 | Keesen et al. | 358/167 |
| 5,218,650 | 6/1993 | Blonstein et al. | 382/56 |

OTHER PUBLICATIONS

"Oddification Problem for iDCT Miss–match," International Organization for Standardization—Coding of Moving Pictures and Associated Audio, ISO/IEC JTC1/SC2/WG11, MPEG93/278, Mar. 29, 1993.

"Information Technology—Generic Coding of Moving Pictures and Associated Audio," Recommendation H.26x, ISO/IEC xxxxx, Third working draft (preparation for Jul. 1993 meeting).

*Primary Examiner*—Stephen M. Baker
*Attorney, Agent, or Firm*—Limbach & Limbach; Ian Hardcastle

[57] ABSTRACT

Mismatch errors occur in the local decoder of a MPEG-standard compressor for a motion picture signal, and in an MPEG-standard expander for a compressed motion picture signal. This is because of the lack of a standard for rounding results of *0.5 (* is an integer) obtained when a set of transform coefficients resulting from compressing the motion picture signal is inversely orthogonally transformed. The invention prevents mismatch errors by pre-processing the set of transform coefficients prior to the inverse orthogonal transform. The transform coefficients in the set are summed, and the parity (odd or even) of the sum is judged. When the parity of the sum is judged to be even, the parity of one of the transform coefficients in the set is inverted to provide a parity-inverted transform coefficient. This makes the parity of the sum odd. Then, when the set of transform coefficients including the parity-inverted transform coefficient is inversely orthogonally transformed, none of the results of the orthogonal transform will have a value of *0.5.

47 Claims, 28 Drawing Sheets

| 409 (0,0) | 409 (1,0) | 409 (2,0) | 409 (3,0) | 409 (4,0) | 409 (5,0) | 409 (6,0) | 409 (7,0) |
|---|---|---|---|---|---|---|---|
| 568 (0,1) | 481 (1,1) | 321 (2,1) | 113 (3,1) | $\overline{113}$ (4,1) | $\overline{321}$ (5,1) | $\overline{481}$ (6,1) | $\overline{568}$ (7,1) |
| 535 (0,2) | 221 (1,2) | $\overline{221}$ (2,2) | $\overline{535}$ (3,2) | $\overline{535}$ (4,2) | $\overline{221}$ (5,2) | 221 (6,2) | 535 (7,2) |
| 481 (0,3) | $\overline{113}$ (1,3) | $\overline{568}$ (2,3) | $\overline{321}$ (3,3) | 321 (4,3) | 568 (5,3) | 113 (6,3) | $\overline{481}$ (7,3) |
| $\overline{409}$ (0,4) | $\overline{409}$ (1,4) | $\overline{409}$ (2,4) | $\overline{409}$ (3,4) | $\overline{409}$ (4,4) | $\overline{409}$ (5,4) | $\overline{409}$ (6,4) | $\overline{409}$ (7,4) |
| 321 (0,5) | $\overline{568}$ (1,5) | 113 (2,5) | $\overline{481}$ (3,5) | $\overline{481}$ (4,5) | $\overline{113}$ (5,5) | 568 (6,5) | $\overline{321}$ (7,5) |
| 221 (0,6) | $\overline{535}$ (1,6) | 535 (2,6) | $\overline{221}$ (3,6) | $\overline{221}$ (4,6) | 535 (5,6) | $\overline{535}$ (6,6) | 221 (7,6) |
| 113 (0,7) | $\overline{321}$ (1,7) | 481 (2,7) | $\overline{568}$ (3,7) | 568 (4,7) | $\overline{481}$ (5,7) | 321 (6,7) | $\overline{113}$ (7,7) |

FIG.4
(PRIOR ART)

Intra Macro Block rec(i,j)=(mquant*2*QAC(i,j)*Wi(i,j))/16 if(rec(i,j) is an EVEN number && rec(i,j) >0)
    rec(i,j)=rec(i,j)-1 if(rec(i,j) is an EVEN number && rec(i,j) <0)
    rec(i,j)=rec(i,j)+1 if(QAC(i,j)==0)
    rec(i,j)=0

The DC term is special case
    rec(1,1)=8*QDC

Non-Intra Macro Block if(QAC(i,j)>0)
    rec(i,j)=((2*QAC(i,j)+1)*mquant*Wn(i,j))/16 if(QAC(i,j)<0)
    rec(i,j)=((2*QAC(i,j)-1)*mquant*Wn(i,j))/16 if(rec(i,j) is an EVEN number && rec(i,j) >0)
    rec(i,j)=rec(i,j)-1 if(rec(i,j) is an EVEN number && rec(i,j) <0)
    rec(i,j)=rec(i,j)+1 if(QAC(i,j)==0)
    rec(i,j)=0

FIG.5
(PRIOR ART)

METHODS AND APPARATUS FOR PREVENTING ROUNDING ERRORS WHEN TRANSFORM COEFFICIENTS REPRESENTING A MOTION PICTURE SIGNAL ARE INVERSELY TRANSFORMED

FIELD OF THE INVENTION

This invention relates to a method and apparatus for pre-processing transform coefficients, a method and apparatus for performing an inverse orthogonal transform, a method and apparatus for compressing an information signal, and a method and apparatus for expanding a compressed information signal. More particularly, the invention relates to a method and apparatus for pre-processing transform coefficients, a method and apparatus for performing inverse orthogonal transform, a method and apparatus for compressing an information signal, and a method and apparatus for expanding a compressed information signal for a motion picture signal.

BACKGROUND OF THE INVENTION

Orthogonal transforms are used in various applications in diverse digital signal processing systems. Orthogonal transforms permit signal processing to be carried out in the frequency domain. The Fast Fourier Transform (FFT) and the Discrete Cosine Transform (DCT), etc. are widely known types of orthogonal transform. An orthogonal transform analyzes, for example, a fragment of a signal in the time domain into frequency components (varying depending upon the orthogonal transform function applied) indicating the spectrum (i.e., the distribution of energy versus frequency) of the original signal fragment in the time domain. By processing in various ways the frequency components (commonly called transform coefficients) resulting from orthogonally transforming the signal fragment, redundancy in the original signal fragment can be reduced. In other words, by orthogonally transforming the original signal fragment, and processing the resulting transform coefficients, the original signal fragment can be represented using fewer bits than were used to represent the original signal fragment. Moreover, by inversely orthogonally transforming the transform coefficients, the original signal fragment in the time domain can be recovered.

Apparatus for compressing a motion picture signal and for expanding a compressed motion picture signal are common examples of digital signal processing systems that use orthogonal transform processing.

It is known that the signal power of signals having a high correlation is concentrated at lower frequencies in the frequency domain. As the concentration of signal power on a specific coordinate axis (e.g., the frequency axis) increases, signal redundancy can be progressively reduced, and the signal can be compressed more efficiently.

Since a motion picture signal is generally highly correlated, both spatially and in time, orthogonal transform processing can be applied to concentrate the signal power on a specific coordinate axis, and the motion picture signal can be compressed with high efficiency.

Hitherto, an extremely large amount of information has been required to represent a motion picture, using, for example, an NTSC-standard video signal. Because of this, recording a motion picture signal has required a recording medium with a very high storage capacity if the medium is to provide an acceptably-long recording time. Moreover, the information rate at which the motion picture signal is recorded on and reproduced from such a medium has been very high. Physically large magnetic tapes or optical discs have therefore been required to store motion picture signals.

If it is desired to record a motion picture signal on a more compact recording medium with an acceptably-long recording time, signal compression must be applied to the motion picture signal to reduce the amount of information that needs to be stored. In addition, an apparatus must be provided that is capable of expanding the compressed motion picture signal reproduced from the compact recording medium.

To meet the requirements just described, various motion picture signal compression systems have been proposed that exploit the correlation between and within the portions of the motion picture signal representing the pictures constituting the motion picture signal. For example, the motion picture signal compression system proposed by the Moving Picture Experts Group (MPEG) is widely known. Since the MPEG system has been widely described in various printed publications, a detailed explanation of the MPEG system will not be repeated here.

The following description will refer frequently to a "picture." Since the signal processing techniques described herein relate to processing a motion picture signal representing a motion picture, it is to be understood that the word "picture," as generally used herein, refers to the portion of a motion picture signal that represents a picture of the motion picture. Moreover, a motion picture signal can represent a picture of the motion picture as a frame or a field. Unless stated otherwise, a "picture" means a field or a frame.

The MPEG system first determines the differences between the pictures constituting the motion picture signal to reduce the redundancy of the motion picture signal in the time domain. Then, the MPEG system reduces the redundancy of the motion picture signal in the spatial domain by applying orthogonal transform processing to blocks of inter-picture differences in the spatial domain. The MPEG system applies discrete cosine transform (DCT) processing as the orthogonal transform processing. By reducing redundancy in both the time and spatial domains, the motion picture signal is compressed extremely efficiently. The compressed motion picture signal resulting from the compression process just described may then be recorded on a recording medium, or transmitted via a suitable transmission medium.

When the compressed motion picture signal is reproduced from the recording medium, or is received from the transmission medium, the blocks of transform coefficients resulting from the DCT transform are extracted from the compressed motion picture signal. The transform coefficients are processed using an inverse orthogonal transform (an inverse discrete cosine transform (IDCT) in the MPEG system) to recover blocks of inter-picture differences in the course of reconstructing the pictures of the original motion picture signal.

An example of the construction of a motion picture signal compressor apparatus based on the MPEG system is shown in FIG. 1. In the compressor shown in FIG. 1, a digital motion picture signal is fed into the block formatting circuit 101, where it is converted from a standard video format, e.g., from the NTSC standard video signal format, into a block format to provide a blocked motion picture signal. In this, each picture of the motion picture signal is divided in the spatial domain, i.e., horizontally and vertically, into macroblocks of, e.g., 16×16 pixels. The macroblocks are also sub-divided into blocks of 8×8 pixels.

The apparatus shown in FIG. 1 compresses each picture of the motion picture signal block-by-block until all the blocks constituting the picture have been processed. The apparatus then processes another picture of the motion picture signal, which may or may not be the next picture in the sequence of pictures constituting the motion picture. The following description of the apparatus shown in FIG. 1, the compression of one block of pixels in one picture will be described. The block of pixels being compressed is the current picture block, which is a block of the current picture. The blocked motion picture signal is delivered to the motion predictor 102. The motion predictor feeds the current picture, including the current picture block S1, block-by-block to the difference block calculating circuit 103.

When the difference block calculating circuit 103 receives the current picture block from the motion predictor 102, it also receives the matching block S2 corresponding to the current picture block from the motion predictor 102. The matching block is derived from the reconstructed pictures stored in the picture memory group 112 by the predictor 113. The difference block calculating circuit 103 determines the pixel-by-pixel difference between the current picture block S1 and its corresponding matching block S2. The resulting block of differences, the difference block S3, is fed to the orthogonal transform circuit 104.

The orthogonal transform circuit 104, which is normally a discrete cosine transform (DCT) circuit, applies orthogonal transform processing to the difference block S3, and feeds the resulting block of transform coefficients to the quantizer 105. The quantizer 105 quantizes the block of transform coefficients to provide a block of quantized transform coefficients. The variable-length coder 106 subjects the block of quantized transform coefficients from the quantizer 105 to variable-length coding, such as Huffmann coding or run length coding, etc. The resulting block of coded transform coefficients is then fed as a bit stream to, e.g., a digital transmission path, via the output buffer 107.

A control signal indicating the number of bits stored in the output buffer 107 is fed back to the quantizer 105. The quantizer adjusts the quantizing step size in response to the control signal to prevent the output buffer from overflowing or underflowing. Increasing or decreasing the quantizing step size respectively decreases or increases the number of bits fed into the output buffer.

The block of quantized transform coefficients is also delivered from the quantizer 105 to the inverse quantizer 108, which forms part of the local decoder used in the compressor to derive from the quantized transform coefficients the reconstructed pictures used in the prediction coding. The inverse quantizer 108 inversely quantizes the block of quantized transform coefficients by performing processing complementary to the quantizing processing performed by the quantizer 105. The resulting block of transform coefficients is fed to the inverse orthogonal transform circuit 109, where it is inversely orthogonally transformed by processing complementary to the orthogonal transform processing performed by the orthogonal transform circuit 104. The resulting restored difference block S4 is fed to the adder 110.

The adder 110 also receives the matching block S2 for the current picture block S1 from one of the picture memories in the picture memory group 112 selected by the predictor 113. The adder 110 performs pixel-by-pixel addition between the restored difference block S4 from the inverse orthogonal transform circuit 109 and the matching block S2 from the picture memory group 112 to provide the reconstructed picture block S5. The reconstructed picture block is delivered to one of the picture memories 112A to 112D selected by the selector 111, where it is stored.

The reconstructed picture block is stored in the selected picture memory, where it forms one block (corresponding to the current block) of the reconstructed picture being reconstructed, block-by-block, from reconstructed picture blocks in the selected picture memory. When complete, the reconstructed picture will be used for deriving matching blocks for performing prediction coding to compress other pictures of the motion picture signal.

The motion predictor 102 determines, for each macroblock of the current picture, a motion vector between the macroblock of the current pictures and different macroblocks of the other pictures of the motion picture signal stored therein. The motion predictor also generates a sum of the absolute values of the differences (the "difference absolute value sum") between the pixels in each macroblock of the current picture and the different macroblocks of the other pictures. Each difference absolute value sum indicates the degree of matching between each macroblock of the current picture and the macroblocks of the other pictures. The motion predictor feeds each motion vector and its corresponding difference absolute value sum to the prediction mode determining circuit 115.

The prediction mode determining circuit 115 uses the data received from the motion predictor 102 to determine the prediction mode that will be used for prediction coding the current picture relative to one or more of the reconstructed pictures. The current picture can be prediction coded using any of the following prediction modes:

(1) Intra-picture mode, in which the picture is compressed by itself, without reference to any other pictures. A picture coded in this way is called an I-picture.

(2) Forward prediction mode, in which prediction is carried out with reference to a reconstructed picture occurring earlier in the motion picture. A picture coded in this way is called a P-picture.

(3) Bidirectional prediction mode, in which block-by-block prediction is carried out with reference to a reference block derived from a reconstructed picture occurring earlier in the motion picture, a reconstructed picture occurring later in the motion picture, or by performing a pixel-by-pixel linear operation (e.g., an average value calculation) between an earlier reconstructed picture and a later reconstructed picture. A picture coded in this way is called a B-picture.

In other words, an I-picture is a picture in which intra-picture coding is completed within the picture. A P-picture is predicted from a reconstructed I-picture or P-picture occurring earlier in the motion picture. A B-picture is predicted block-by-block using an earlier or a later reconstructed I-picture or P-picture or using a block obtained by performing a linear operation using a reconstructed I-picture or P-picture occurring earlier in the motion picture and a reconstructed I-picture or P-picture occurring later in the motion picture.

The prediction mode determining circuit 115 delivers the prediction mode and the corresponding motion vector for the current block to the predictor 113 and to the readout address generator 114. The readout address generator 114 provides readout addresses to the picture memory group 112 in response to the motion vector, which causes each picture memory 112A through 112D to read out a block of the reconstructed picture stored therein. The location of the read out block in the reconstructed picture is designated by the motion vector. The predictor 113 selects one of the read out blocks from the picture memories 112A to 112D in response to the prediction mode signal PM received from the prediction mode determining circuit 115. The selected read out block provides the matching block S2 for the current block S1. When the current block is part of a B-picture, the predictor also performs linear operations on the read out blocks from the picture memories 112A though 112D to provide the required matching block. The predictor delivers the matching block S2 to the difference block calculating circuit 103 and the adder 110.

An example of the construction of a compressed motion picture signal expander apparatus based on the MPEG system is shown in FIG. 2. In this, the compressed motion picture signal obtained directly from the compressor or by reproducing it from a recording medium is fed as a bit stream into the input buffer 121, where it is temporarily stored. The compressed digital signal includes blocks of coded transform coefficients (including a block of coded transform coefficients representing the current block), and prediction mode information, quantizing step-size information, and a motion vector for each block.

The compressed motion picture signal is read out of the input buffer 121 one picture at a time, and is delivered to the inverse variable-length coder (IVLC) 122. The inverse variable-length coder 122 applies inverse variable length coding to the compressed motion picture signal, and separates the compressed motion picture signal into its components, including blocks of quantized transform coefficients, and prediction mode information, step-size information, and a motion vector for each block.

Each block of coded transform coefficients is fed into the inverse quantizer 123, which uses the step-size information for the block to inversely quantize the block of quantized transform coefficients to provide a block of transform coefficients. The inverse orthogonal transform circuit 124 applies inverse orthogonal transform processing, normally IDCT processing, to the block of transform coefficients to derive a restored difference block. The inverse quantizer 123 and the inverse orthogonal transform circuit 124 respectively apply processing complementary to that applied by the quantizer 105 and orthogonal transform circuit 104 in the compressor shown in FIG. 1.

The readout address generator 130 provides a readout address to the picture memories 128A to 128D in response to the motion vector for the current block received from the inverse variable-length coder 122. In response to the readout address, each of the picture memories 128A to 128D reads out a block of the reconstructed picture stored therein. The predictor 129 selects one of the read out blocks from the picture memories 128A to 128D in response to the prediction mode signal PM, also received from the inverse variable-length coder 122. The selected read out block provides the matching block for reconstructing the current block. When the current block is part of a picture coded as a B-picture, the predictor also performs linear operations on the read out blocks from the picture memories 112A though 112D to provide the matching block. The predictor 129 delivers the matching block to the adder 125.

The adder 125 performs a pixel-by-pixel addition between the restored difference block from the inverse transform circuit 124 and the matching block from the predictor 129 to reconstruct the current picture block of the current picture. The selector 126 feeds the reconstructed current picture block for storage in the one of the picture memories 128A through 128D in which the current picture is being reconstructed. The reconstructed current picture block is stored in the selected picture memory in the position of the current picture block in the reconstructed current picture. When all the reconstructed blocks of the current picture have been stored in the selected picture memory 128A to 128D, the reconstructed current picture is ready for reading out, and also for use as a reference picture for reconstructing other pictures occurring earlier or later in the motion picture.

The reconstructed pictures stored in the picture memories 128A to 128D are read out as the motion picture output signal via the selector 126 in response to readout addresses generated by the display address generator 127. A scan converter (not shown) converts the motion picture output signal read out from the picture memories 128A through 128D to the raster format of the desired video signal format, e.g., NTSC. The resulting motion picture output signal can then be displayed on a suitable display, e.g., a CRT, etc. In this example, the sync. signal generator 131 is locked to an external sync. source, and periodically generates a frame sync. signal for delivery to the display address generator 127. The display address generator 127 the generates readout addresses in synchronism with the frame sync. signal.

The orthogonal transform circuits, for example, the DCT and the IDCT circuits used in the compressor and the expander described above, respectively perform arithmetic operations on pixel values and transform coefficients represented by integers having a finite number of bits. Thus, the orthogonal transform operations performed by the orthogonal transform circuits can result in a truncation of the number of bits. For this reason, a difference in the accuracy of the orthogonal transform operation using real numbers, or a difference in the configuration of the circuit used to perform the orthogonal transform operation, can change the result of the orthogonal transform operation. This can lead to a mismatch between the compressor and the expander, and to mismatches between expanders expanding a common compressed signal.

For example, in the compressor, the difference block derived from the motion picture signal is orthogonally transformed, and predetermined processing is applied to quantize the resulting transform coefficients in the course of generating the compressed motion picture signal. Then, in the expander, if the real number operational accuracy or the configuration of the inverse orthogonal transform circuit does not correspond to that of the compressor, then it is possible the output of the expander will differ from the input to the compressor. Hence, the output of the expander can depend on the accuracy and the configuration of the apparatus used for the expander.

The operational accuracy or the configuration of an inverse orthogonal transform may vary depending upon the apparatus used to perform the inverse orthogonal transform. For example, inversely transforming a block of transform coefficients using two different constructions of the same type of inverse orthogonal transform circuit may produce different results. Such a difference in the results is called an inverse orthogonal transform mismatch error (a "mismatch error").

The MPEG system defines the operational accuracy with which the DCT and the IDCT are to be performed, but does not define the operational method and the configuration. This is because circuits and methods for performing DCTs and IDCTs were developed before the MPEG standards were established.

In the MPEG system, as described above, the compressor implements, e.g., inter-picture motion-compensated prediction coding to the motion picture signal. In this, the motion picture signal is divided into blocks, a difference block is derived from the current picture block and a matching block obtained by applying motion compensation to a reconstructed picture, the difference block is orthogonally transformed using DCT processing, the resulting transform coefficients are quantized, the quantized transform coefficients are subject to variable-length coding, and the coded transform coefficients are assembled together with prediction mode information, quantizing step size information, and motion vectors to provide the compressed motion picture signal.

The expander applies inverse variable-length coding to the coded transform coefficients, inverse quantizing to the quantized transform coefficients resulting from the inverse variable-length coding, and IDCT processing to the transform coefficients resulting from the inverse quantizing. The resulting restored difference block is added to a matching block obtained by applying motion compensation to a reconstructed picture in response to the motion vector. The resulting reconstructed picture block is stored as a block of a reconstructed picture, which provides a picture of the motion picture output signal, and also is available for use as a reference picture.

The compressor includes a local decoder that derives, from the quantized transform coefficients, reconstructed pictures for use in carrying out the prediction coding. The local decoder includes an inverse quantizer and an inverse orthogonal transform circuit.

If the configuration of IDCT circuit in the local decoder in the compressor is different from that of the IDCT circuit in the expander, there are instances in which the reconstructed pictures produced by the local decoder in the compressor are different from the reconstructed pictures produced by the expander. The dependency of the IDCT processing on implementation can cause problems when the compressed motion picture signal generated by a compressor conforming with the MPEG standard is recorded on a recording medium, such as an optical disc, etc., for distribution to the public. When the compressed motion picture signal reproduced from the optical disc is expanded by expanders manufactured and sold by different makers, the reproduced picture may be different from the original picture. Moreover, the differences may depend upon the actual expander used. Similar incompatibilities between different expanders may also occur when the compressed motion picture signal is distributed by a distribution system such as terrestrial or satellite broadcasting, telephone system, ISDN system, cable or optical distribution system, etc.

Mismatch errors are particularly problematical when inter-picture prediction coding is carried out. Inter-picture prediction coding can be inter-field coding or inter-frame coding. Inter-picture prediction coding can cause mismatch errors to accumulate to the extent that they result in fatal flaws in the reconstructed pictures.

In the motion picture signal compression performed by the MPEG system, each video sequence is divided into Groups of Pictures (GOPs) of, for example, eight or twelve pictures. Each picture is classified as an I-picture, a P-picture, and a B-picture, as described above.

A B-picture is not used as a reference picture in performing motion prediction. Hence, a mismatch error occurring in a B-picture does not lead to errors in other pictures.

When a mismatch error occurs in a P-picture, the picture with the mismatch error is stored in the picture memory for use in carrying out prediction coding. Accordingly, when inter-picture prediction coding is carried out, the error in the P-picture stored in the picture memory gradually spreads to the P-pictures and B-pictures derived from it by prediction coding. The error accumulates until the picture is replaced by an I-picture or a P-picture lacking such an error.

Similarly, when a mismatch error occurs in an I-picture, the reconstructed picture with the mismatch error is stored in the picture memory for use in carrying out prediction coding. Accordingly, when inter-picture prediction coding is carried out, the error in the I-picture stored in the picture memory spreads to the P-pictures and B-pictures derived from it by prediction coding. The error accumulates until the picture is replaced by a new I-picture lacking such an error.

Error accumulation is illustrated in FIG. 3. In FIG. 3, if the mismatch error in decoding an I-picture is EI, and the mismatch error in decoding the P-picture P1 is EP1, the value of the error in the reconstructed P-picture P1 is EI+EP1. Further, when the mismatch error in decoding the P-picture P2 is EP2, the value of the error in the reconstructed P-picture P2 is EI+EP1+EP2. Even if the individual mismatch errors are small, the gradual accumulation of these errors will result in a large error.

Mismatch errors produced by the IDCT processing used in the MPEG decoders in both the compressor and the expander can be classified into two distinct types:

Type (1): Errors resulting from insufficient operational accuracy.

Type (2): Errors resulting from systematic differences in rounding.

The MPEG standard sets forth a requirement for operational accuracy. However, this requirement is not so stringent that it can guarantee that a mismatch error will not occur. Therefore, a Type (1) mismatch error can occur between IDCT devices whose operational accuracy satisfies the MPEG requirement.

The outputs of the IDCT processing are integers. Hence, after the IDCT processing has been performed using real numbers, the processing results must be rounded. In general, the processing results are rounded to the nearest integer. However, a problem occurs when the processing result is *0.5, where * is any integer. The MPEG standard does not define how a processing result of *0.5 should be rounded. Some IDCT devices round *0.5 up, and other IDCT devices round *0.5 down. Further, there are instances in which rounding up or rounding down depends on the sign of the processing result. Mismatch errors resulting from the systematic rounding errors just described are Type (2) mismatch errors.

Type (1) mismatch errors differ from Type (2) mismatch errors in that Type (1) errors occur randomly, whereas Type (2) errors are systematic. Because Type (1) errors are random, positive errors and negative errors occur with roughly equal probability. Hence, when prediction coding is carried out over a long time, it can be assumed that Type (1) mismatch errors will cancel out.

On the other hand, since Type (2) mismatch errors are systematic, and are inherent in the IDCT processing itself, such errors consistently have the same polarity. Accordingly, when prediction coding is carried out over a long time, the mismatch error will be cumulative in one direction. Although each Type (2) mismatch error is only +1 or −1, if many mismatch errors accumulate in one direction, the cumulative mismatch error will be large.

Since Type (1) mismatch errors, although temporarily generated, cancel out over time, Type (1) are relatively unproblematical. On the other hand, since Type (2) mismatch errors accumulate in one direction, Type (2) mismatch errors are problematical. Because of this, it is desirable to prevent cumulative Type (2) mismatch errors from occurring.

It has been proposed in the MPEG1 system to perform processing prior to the IDCT processing to prevent Type (2) mismatch errors from occurring. The processing sets the transform coefficients of all the components to an odd value, except for the transform coefficient of the component (0, 0) of a macroblock of an intra-picture coded picture (an "intra macroblock"). In an intra macroblock, the component (0, 0) is the DC component. As shown in FIG. 4, for example, the transform coefficients of the components (0, 1), (7, 1), (2, 3), (5, 3), (1, 5), (6, 5), (3, 7), and (4, 7) are initially all 568. Since this is an even number, the pre-processing sets the values of these coefficients to an odd value, e.g., 567. When IDCT processing is applied to the pre-processed transform coefficients, fractional results never occur.

Since the DC component of the intra macroblock is very important to the appearance of the picture derived from the compressed motion picture signal, its accuracy is only limited to 8 bits. It is not subject to conversion to an odd value, since this would degrade the accuracy of this important component. On the other hand, all of the transform coefficients resulting from transforming a macroblock of a picture coded using inter-picture coding (a "non-intra macroblock") are subject to processing similar to that of the transform coefficients of the components, other than the DC component, of an intra macroblock to restrict the transform coefficients only to odd values.

The processing in which the values of the transform coefficients subject to the IDCT processing are all set to an odd value is called oddification processing.

By carrying out oddification processing, the IDCT processing in both the compressor and the expander will both perform rounding in accordance with a common rule. This will make it possible to maintain a consistent picture quality between different expanders.

However, despite the above-described oddification processing, the above-described cumulative Type (2) mismatch errors still occur in MPEG processors because the IDCT processing can still produce results of *0.5, where * denotes an integer. The circumstances that lead to a result of *0.5 will be described next using as an example the two-dimensional 8×8 IDCT used in the MPEG system.

The two-dimensional 8×8 IDCT is expressed by the following equation:

$$f(x,y) = \frac{1}{4} \sum_{u=0}^{7} \sum_{v=0}^{7} C(u)C(v)F(u,v)\cos\left(\frac{(2x+1)u\pi}{16}\right)\cos\left(\frac{(2y+1)v\pi}{16}\right) \quad (1)$$

$$u,v,x,y = 0,1,\ldots,7$$

$$C(u),C(v) = \frac{1}{\sqrt{2}} \quad (u,v=0)$$

$$= 1 \quad (u,v \neq 0)$$

In the above equation, F(u, v) indicates the DCT coefficients subject to the two-dimensional IDCT. In equation (1), each output value of the IDCT is a real number, i.e., a rational number or an irrational number. Because *0.5 is a rational number, making the output value of the IDCT an irrational number will prevent a cumulative mismatch error from occurring. On the other hand, when the output value is a rational number, it is possible for the output value to be *0.5.

The DCT coefficients F(0, 0) F(0, 4), F(4, 0), F(4, 4) are special DCT coefficients. When any one of these DCT coefficients has a non-zero value, the output value of the IDCT is a rational number. The output values of the IDCT in this case are expressed by equation (2).

$$f(x,y) = \frac{1}{4} F(0,0) \quad (2)$$

$$f(x,y) = \frac{1}{4\sqrt{2}} F(0,4)\cos\frac{2y+1}{4}\pi$$

$$f(x,y) = \frac{1}{4\sqrt{2}} F(4,0)\cos\frac{2x+1}{4}\pi$$

$$f(x,y) = \frac{1}{4} F(4,4)\cos\frac{2x+1}{4}\pi\cos\frac{2y+1}{4}\pi$$

$$\text{where } \cos\frac{2x+1}{4}\pi = \pm\frac{1}{\sqrt{2}}$$

Thus, when only one of the special DCT coefficients F(0, 0), F(0, 4), F(4, 0), F(4, 4) has a non-zero value that is a multiple of 4, but not a multiple of 8, the output value is equal to *0.5.

When the four special DCT coefficients are the only coefficients with a non-zero value, the output value of the IDCT is expressed by equation (3).

$$f(x,y) = \frac{1}{4}(0,0) + \frac{1}{4\sqrt{2}} F(0,4)\cos\frac{2y+1}{4}\pi + \quad (3)$$

$$\frac{1}{4\sqrt{2}} F(4,0)\cos\frac{2x+1}{2}\pi +$$

$$\frac{1}{4} F(4,4)\cos\frac{2x+1}{4}\pi\cos\frac{2y+1}{4}\pi$$

With different combinations of x and y, f(x,y) in Equation (3) can have the following values:

$$\frac{1}{8}[F(0,0) + F(0,4) + F(4,0) + F(4,4)] \quad (4)$$

-continued $$\frac{1}{8}[F(0,0) + F(0,4) - F(4,0) - F(4,4)]$$

$$\frac{1}{8}[F(0,0) - F(0,4) + F(4,0) - F(4,4)]$$

$$\frac{1}{8}[F(0,0) - F(0,4) - F(4,0) + F(4,4)]$$

Thus, when the values of the four special coefficients are such that any of the expressions set forth in equation (4) is multiple of 4 but is not multiple of 8, a result of *0.5 will occur.

Thus, when the four special coefficients have non-zero values, there is high probability that the output value of the IDCT will be equal to *0.5.

Also, various symmetrical pairs of DCT coefficients with non-zero values, other than the four special coefficients just discussed, can produce an output value of *0.5:

(1) when the pair of coefficients X(2n+1, 2m+1), X(2m+1, 2n+1) have the same non-zero values, and the value is multiple of 4 but not multiple of 8, or (2) when the pair of coefficients X(2n+1, 2n+1), X(8−2n−1, 8−2n−1) have the same non-zero values, and the value is multiple of 4 but not multiple of 8.

In the above expressions, X(i, j) is the transform coefficient of one component of a two-dimensional 8×8 DCT.

When an actual motion picture signal is compressed by a compressor according to the MPEG system, non-zero DCT coefficients are frequently produced in the patterns just mentioned, which can cause an IDCT output value equal to *0.5 . Moreover, the values of the four special coefficients are non-zero most of the time.

Since the most common cause of a result of *0.5 is the pattern of DCT coefficients in which the values of the four special coefficients are non-zero, preventing a mismatch error from occurring in response to the four special coefficients will substantially reduce the probability of a mismatch error occurring.

The processing method by which an intra macroblock and a non-intra macroblock are inversely quantized in MPEG1 is shown in FIG. 5. In FIG. 5, QAC(i. j) is the (i, j)-th DCT coefficient, Wi(i, j) is the (i, j)-th element of a weighting matrix, mquant is the quantizing coefficient, and rec(i, j) is the (i, j)-th inversely-quantized DCT coefficient. The processing method is written in the syntax of the C programming language. The syntax of this language is set forth in Herbert Schildt, USING TURBO C, Osborne McGraw Hill (1988), especially at pages 83–87.

The quantized DCT coefficients are inversely quantized, and the resulting DCT coefficients are then subject to IDCT processing. However, in MPEG1, the DCT coefficients having an even value have +1 or −1 added to them to ensure that the DCT coefficients subject to IDCT processing all have odd values. As a result of this operation, when, e.g., only the one of the four special coefficients F(0, 0) has a non-zero value, because a mismatch error occurs when F(0, 0) is multiple of 4 but is not multiple of 8, if the DCT coefficients are processed so that they all have an odd value, the result, when the DCT coefficient is subject to IDCT processing, cannot be equal to *0.5. Similarly, when only one of the others of the four special coefficients F(0, 4), F(4, 0), F(4, 4) has a non-zero value, a mismatch error will not occur. However, when plural ones of the four special coefficients have a non-zero value, as can be seen from FIG. 4, or when pairs of symmetrically arranged coefficients occur, as in cases (1) and (2) mentioned above, making all the DCT coefficients an odd value will not prevent a mismatch error occurring.

Hence, the oddification processing of MPEG1 will not prevent a cumulative mismatch error from occurring when two or more of the DCT coefficients have a non-zero value. Moreover, the oddification processing of MPEG1 reduces the resolution of the quantized transform coefficients by a factor of 2. since transform coefficients with even values are not allowed. This degrades the picture quality. If a high picture quality is required, this is problem. A better way of preventing cumulative mismatch errors than that proposed in the MPEG1 standard is clearly desirable.

OBJECTS AND SUMMARY OF THE INVENTION

With the above problems of the prior art in view, an object of this invention is to provide a method and an apparatus which effectively prevent cumulative mismatch errors from occurring when transform coefficients are inversely orthogonally transformed, and in which the resolution of the transform coefficients is not degraded.

Particularly, an object of this invention is to provide a method and apparatus for inversely orthogonally transforming transform coefficients, and which effectively solve the mismatch error problem.

Particularly, an object of this invention is to provide a method and apparatus for pre-processing a block of transform coefficients prior to inversely orthogonally transforming the block of transform coefficients so that rounding errors are prevented when the block of transform coefficients is inversely orthogonally transformed.

In addition, an object of this invention is to provide motion picture signal compressor, and a compressed motion picture signal expander recording medium for a compressed motion picture signal in which mismatch errors are eliminated, and in which the measures taken to prevent mismatch errors cause as little deterioration of picture quality as possible.

The object of this invention contemplates effectively and easily preventing mismatch errors which could not be prevented by the conventional approach.

Accordingly, the invention provides a method of processing a set of transform coefficients to provide an error-immune set of transform coefficients for processing by an inverse orthogonal transform. The error-immune set of transform coefficients is immune to rounding errors when subject to the inverse orthogonal transform. In the method, the transform coefficients in the set are summed. The parity of the sum (i.e., whether the sum is odd or even) is judged. When the parity of the sum is judged to be even, the parity of one of the transform coefficients in the set is inverted to provide a parity-inverted transform coefficient. The parity-inverted transform coefficient makes the parity of the sum odd. Finally, the set of transform coefficients including the parity-inverted transform coefficient is provided as the error-immune set.

The invention also provides an apparatus for pre-processing a set of transform coefficients to provide an error-immune set of transform coefficients for processing by an inverse orthogonal transform. The error-immune set of transform coefficients is immune to rounding errors when subject to the inverse orthogonal transform. The apparatus comprises an accumulator that receives each of the transform coefficients in the set and provides a sum. A parity judgment circuit receives the sum from the accumulator, and judges the parity of the sum. A parity inverting circuit operates when the parity judgment circuit judges that parity of the sum is even, and inverts the parity of one of the transform coefficients to provide a parity-inverted transform coefficient. The parity-inverted transform coefficient makes the parity of the sum odd. Finally, a circuit provides the set of transform coefficients including the parity-inverted transform coefficient as the error-immune set.

The invention further provides a method of inversely orthogonally transforming a set of transform coefficients without incurring rounding errors. Each of the transform coefficients is represented by a binary number. In the method, the least-significant bit of each of the transform coefficients in the set is determined. The transform coefficients in the set having a least-significant bit of one are counted to provide a count. The count is judged to determine when it is an even number. When the count is judged to be an even number, one of the transform coefficients is changed to provide a changed transform coefficient. The changed transform coefficient makes the count an odd number. Finally, the set of transform coefficients including the changed transform coefficient is inversely orthogonally transformed.

The invention also provides an apparatus for inversely orthogonally transforming a set of transform coefficients without incurring rounding errors. The apparatus comprises a circuit for summing the transform coefficients to provide a sum, and a parity judging circuit that judges the parity of the sum. A sum oddifying circuit operates when the parity judging circuit judges that the parity of the sum is even, and inverts the parity of one of the transform coefficients to provide a parity-inverted transform coefficient. The parity-inverted transform coefficient makes the sum odd. Finally, an inverse orthogonal transform circuit receives the set of transform coefficients, including the parity-inverted transform coefficient, from the sum oddifying means.

The invention also provides an apparatus for inversely orthogonally transforming a set of transform coefficients without incurring rounding errors. The apparatus comprises a least-significant bit judging circuit that judges the state of the least-significant bit of each transform coefficient. A counting circuit provides a count by counting those transform coefficients in the set that the least-significant bit judging circuit judges to have a least-significant bit of one. A count judging circuit judges when the count from the counting circuit is an even number. Finally, a count oddifying circuit operates when the count judging circuit judges that the count is an even number to change one of the transform coefficients to provide a changed transform coefficient. The changed transform coefficient makes the count an odd number. Finally, an inverse orthogonal transform circuit receives the set of transform coefficients, including the changed transform coefficient, from the count oddifying circuit.

The invention also provides an apparatus for compressing a motion picture signal. The motion picture signal includes pictures, and each picture is divided into blocks. The apparatus comprises a predictive coder that predictively codes blocks of the motion picture signal by using matching blocks of a reference picture to form difference blocks. A difference block encoder compresses the difference blocks from the predictive coder to form a compressed motion picture signal. The difference block encoder includes an orthogonal transform circuit that orthogonally transforms the difference block from the predictive coder to provide blocks of transform coefficients, and a quantizer that quantizes the blocks of transform coefficients from the orthogonal transform circuit to provide compressed signal blocks. The compressed motion picture signal is derived from the compressed signal blocks.

The apparatus also includes a local decoder that provides restored difference blocks by expanding the compressed signal blocks from the difference block encoder in a manner that prevents rounding errors. The local decoder includes an inverse quantizer that inversely quantizes the compressed signal blocks from the difference block encoder to provide blocks of restored transform coefficients. An accumulator sums the restored transform coefficients in each block of transform coefficients from the inverse quantizer to provide a sum, the parity of which is judged by a parity judging circuit. A sum oddifier operates when the parity judging circuit judges that the parity of the sum is even to invert the parity of one of the restored transform coefficients in the block to provide a parity-inverted transform coefficient that makes the sum odd. Finally, an inverse orthogonal transform circuit receives the block of restored transform coefficients including the parity-inverted transform coefficient from the sum oddifying means. The inverse orthogonal transform circuit provides the restored difference blocks.

The apparatus also includes a predictive decoder that predictively decodes the restored difference blocks from the local decoder to reconstruct picture blocks corresponding to the blocks of the motion picture signal. Finally, the apparatus includes a picture memory which stores the reconstructed picture blocks from the predictive decoder as blocks of a reconstructed picture for use as a reference picture for predictively coding other pictures of the motion picture signal.

In the apparatus just described, the accumulator, parity judging circuit, and sum oddifier in the local decoder may be replaced by a least-significant bit determining circuit that determines the least-significant bit of each of the restored transform coefficients; a counter that provides a count by counting the restored transform coefficients in each block that have a least-significant bits of one; a count judging circuit that judges when the count from the counter is an even number; and a count oddifying circuit that operates when the count judging circuit judges that the count is an even number to change one of the restored transform coefficients in the block to provide a changed transform coefficient that makes the count an odd number.

The invention also provides apparatus for expanding a compressed motion picture signal to provide a motion picture output signal. The compressed motion picture signal includes signal portions each representing a picture of the motion picture output signal. The signal portions include variable-length coded compressed signal blocks. The apparatus comprises an inverse variable-length coder that applies inverse variable-length coding to the variable-length coded compressed signal blocks to provide compressed signal blocks.

A decoder provides restored difference blocks by expanding the compressed signal blocks from the inverse variable-length coder in a manner that prevents rounding errors. The decoder includes an inverse quantizer that inversely quantizes each compressed signal block from the difference block encoder to provide a block of restored transform coefficients. An accumulator sums the restored transform coefficients in the block of transform coefficients from the inverse quantizer to provide a sum, the parity of which is judged by a parity judging circuit. A sum oddifier operates when the parity judging circuit judges that the parity of the sum is even to invert the parity of one of the restored transform coefficients in the block to provide a parity-inverted transform coefficient that makes the parity of the sum odd. An inverse orthogonal transform circuit receives the block of restored transform coefficients, including the parity-inverted transform coefficient, from the sum oddifier and provides the restored difference blocks.

In the expander apparatus just described, the accumulator, parity judging circuit, and sum oddifier in the decoder may be replaced by a least-significant bit determining circuit that determines the least-significant bit of each of the restored transform coefficients; a counter that provides a count by counting the restored transform coefficients in each block that have a least-significant bit of one; a count judging circuit that judges when the count from the counter is an even number; and a count oddifying circuit operates when the count judging circuit that judges that the count is an even number to change one of the restored transform coefficients in the block to provide a changed transform coefficient that makes the count an odd number.

The invention further provides a method of compressing a motion picture signal to provide a compressed motion picture signal. In the method, prediction coding and orthogonal transform processing are applied to blocks of the motion picture signal to provide blocks of transform coefficients from which the compressed motion picture signal is derived. The blocks of transform coefficients are sum oddified prior to applying inverse orthogonal transform processing and prediction decoding to provide blocks of a reconstructed picture for use as a reference picture in prediction coding other pictures of the motion picture signal.

The invention also provides a method for compressing a motion picture signal to provide a compressed motion picture signal. In the method, motion between blocks of a picture of the motion picture signal and blocks of a reconstructed picture signal serving as a reference picture is detected, and motion compensation is applied to the reference picture in response to the detected motion to derive matching blocks of the reference picture. The matching blocks of the reference picture are used to apply predictive coding to the blocks of the motion picture signal to provide block of differences. The blocks of differences are orthogonally transformed to provide blocks of transform coefficients. The compressed signal is derived from the blocks of transform coefficients by applying quantizing and variable-length coding. Prior to applying inverse orthogonal transform processing to the blocks of transform coefficients to provide blocks of restored differences, each block of transform coefficients is sum oddified to prevent rounding errors in the inverse orthogonal transform processing. Finally, prediction decoding is applied to the blocks of restored differences to provide picture blocks of a reconstructed picture for use as a reference picture in applying predictive coding to other pictures of the motion picture signal.

The way in which the invention prevents cumulative mismatch errors will now be described.

Examination of equation (4) shows that a mismatch occurs when the expressions in the equation produce a result of $(2n+1)/2$, where n is any integer.

Equation (4) can be summarized as:

$$f(x, y) = \tfrac{1}{8} ACC$$

where ACC is the sum of all the coefficients.

The most frequent mismatch pattern is:

$$f(x, y) = \tfrac{1}{8} ACC = (2n+1)/2 = \tfrac{1}{8}(4*(2n+1))$$

From this, it can be seen that, if ACC is made an odd number, a mismatch error will never occur.

Accordingly, this invention employs a scheme to inversely quantize the quantized DCT coefficients, and then, prior to the IDCT processing, to calculate the sum of the DCT coefficients. If the sum of DCT coefficients is an even value (i.e., the parity of the sum is even), the parity of one of the DCT coefficients is changed to make the sum of the DCT coefficients an odd value (i.e., to make the parity of the sum odd). It is sufficient to change the parity of only one DCT coefficient to oddify the sum of the DCT coefficients. Moreover, the parity of the coefficient that has the least influence on the output value of IDCT can be changed. In other words, this invention, by checking the parity of the sum of the DCT coefficients prior to the IDCT processing, and, if the parity of the sum is even, by changing the parity of one of the DCT coefficients to oddify the sum of the DCT coefficient, effectively prevents mismatch errors from occurring.

It must be stressed that, according to the invention it is sufficient to change the parity of only one DCT, coefficient to oddify the sum of the DCT coefficients. MPEG1 oddities all the DCT coefficients, which reduces the resolution of the DCT coefficients subject to IDCT processing by a factor of two. The mismatch error prevention procedure according to the invention, on the other hand, oddities the sum of the DCT coefficients in a way that does not substantially decrease the accuracies of the input and output values of the IDCT. When the method according to the invention is applied to a motion picture signal compressor, a compressed motion picture signal expander, or an apparatus for transmitting a compressed motion picture signal, degradation of the picture quality is minimized.

In addition, when the method according to the invention is applied to the MPEG system, the minimum quantizing step can be 1, in contrast to the prior an method in which the minimum quantizing step was 2.

BRIEF DESCRIPTION OF THE DRAWINGS

FIG. 4 shows actual examples of the values of DCT coefficients.

FIG. 5 shows the processing steps used to inversely quantize both intra macroblocks and non-intra macroblocks in the conventional MPEG1 system.

DETAILED DESCRIPTION OF THE INVENTION

Preferred embodiments of an inverse discrete cosine transform method, an inverse cosine transform apparatus, a motion picture signal compressor apparatus, a compressed motion picture signal expander apparatus, and a transmitting apparatus will now be described with reference to the drawings.

The invention is applied to a hybrid coding system in which motion compensating prediction coding and discrete cosine transform (DCT) processing are combined. This hybrid coding system is described in H. 261 of ISO-IEC/JTC1/SC2/WG11 (popularly named MPEG) of the Consultative Committee for International Telegraph and Telephone (CCITT), which is an international committee for promulgating standards for, inter alia, compressing motion picture signals, and for compressing motion picture signals for storage on a recording medium. The basic configuration of the MPEG hybrid coding system is well known. The report of WG11 includes a useful glossary of the terms used herein.

Motion-compensating prediction coding is a method for reducing the redundancy of a motion picture signal by exploiting the correlation of the motion picture signal in the time domain. Motion-compensating prediction of the current picture (i.e., the picture currently being coded) is performed using another, already decoded, picture of the motion picture as a reference picture. The resulting motion-compensated prediction errors are included in the compressed signal together with respective motion vectors and prediction mode information, etc. This significantly reduces the amount of information in the compressed motion picture signal required to represent the current picture.

The motion-compensated prediction error signal is compressed using a signal compressor that exploits the spatial correlation of each picture constituting the motion picture. The difference signal compressor typically includes an orthogonal transform circuit, such as a DCT circuit, and a quantizer. The DCT is a form of orthogonal transform that concentrates the signal power in specific frequency components as a result of the intra-picture (frame or field) two-dimensional correlation of the picture. This way, only the concentrated and distributed coefficients are included in the compressed signal, either directly, or after additional compression. This further reduces the amount of information in the compressed motion picture signal required to represent the current picture.

The inter-picture motion-compensating prediction coding may be carried out between frames of the motion picture signal. Alternatively, if the motion picture signal is an interlaced signal, the motion-compensating prediction coding may be carried out between fields. In addition, inter-picture motion-compensating prediction coding may be adaptively switched between inter-frame coding and inter-field coding depending upon the properties of the motion picture signal.

1. FIRST EMBODIMENT

Figure 1:
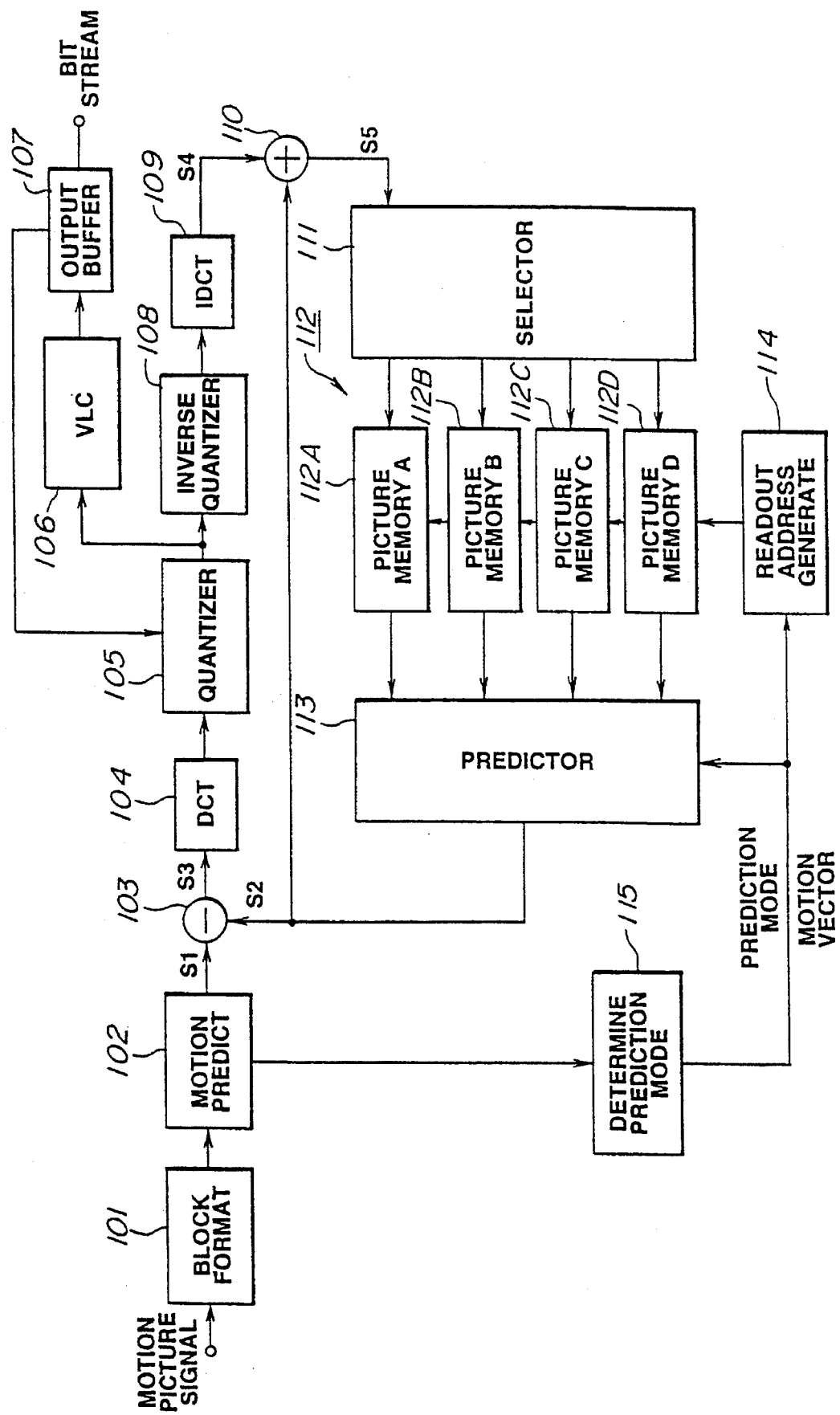
FIG. 1 is a block diagram showing the configuration of a conventional motion picture signal compressor apparatus according to the MPEG system.
Figure 2:
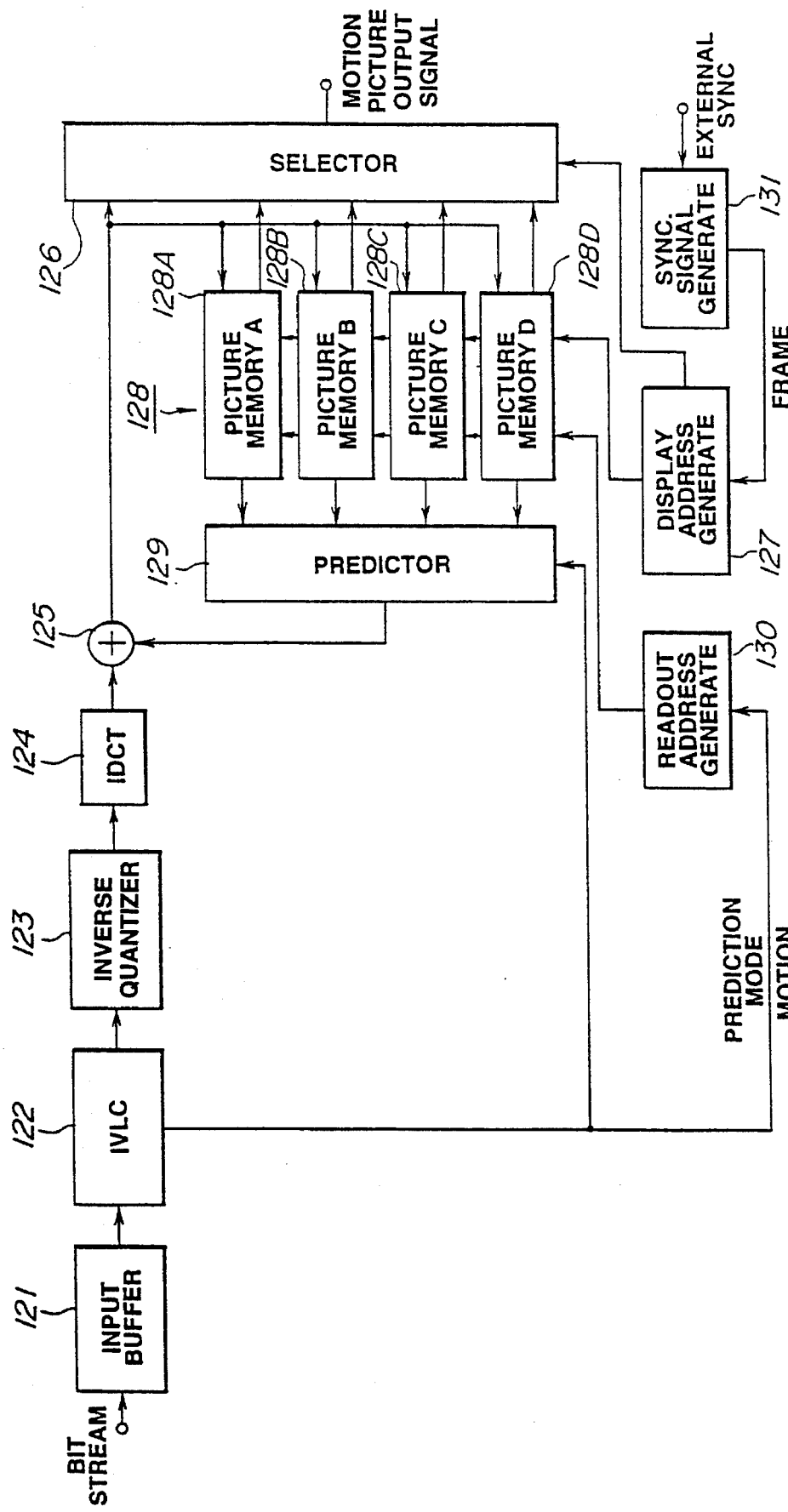
FIG. 2 is a block diagram showing the configuration of a conventional compressed motion picture signal expander apparatus according to the MPEG system.
Figure 3:
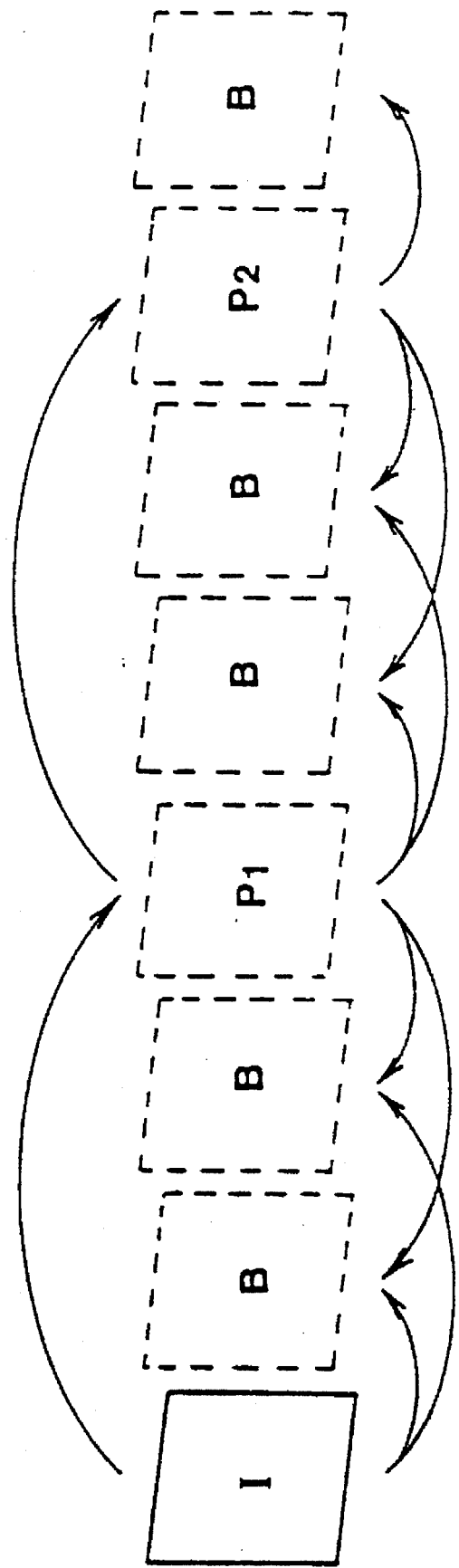
FIG. 3 illustrates the sequence in which a motion picture signal is compressed in the MPEG system.
Figure 6:
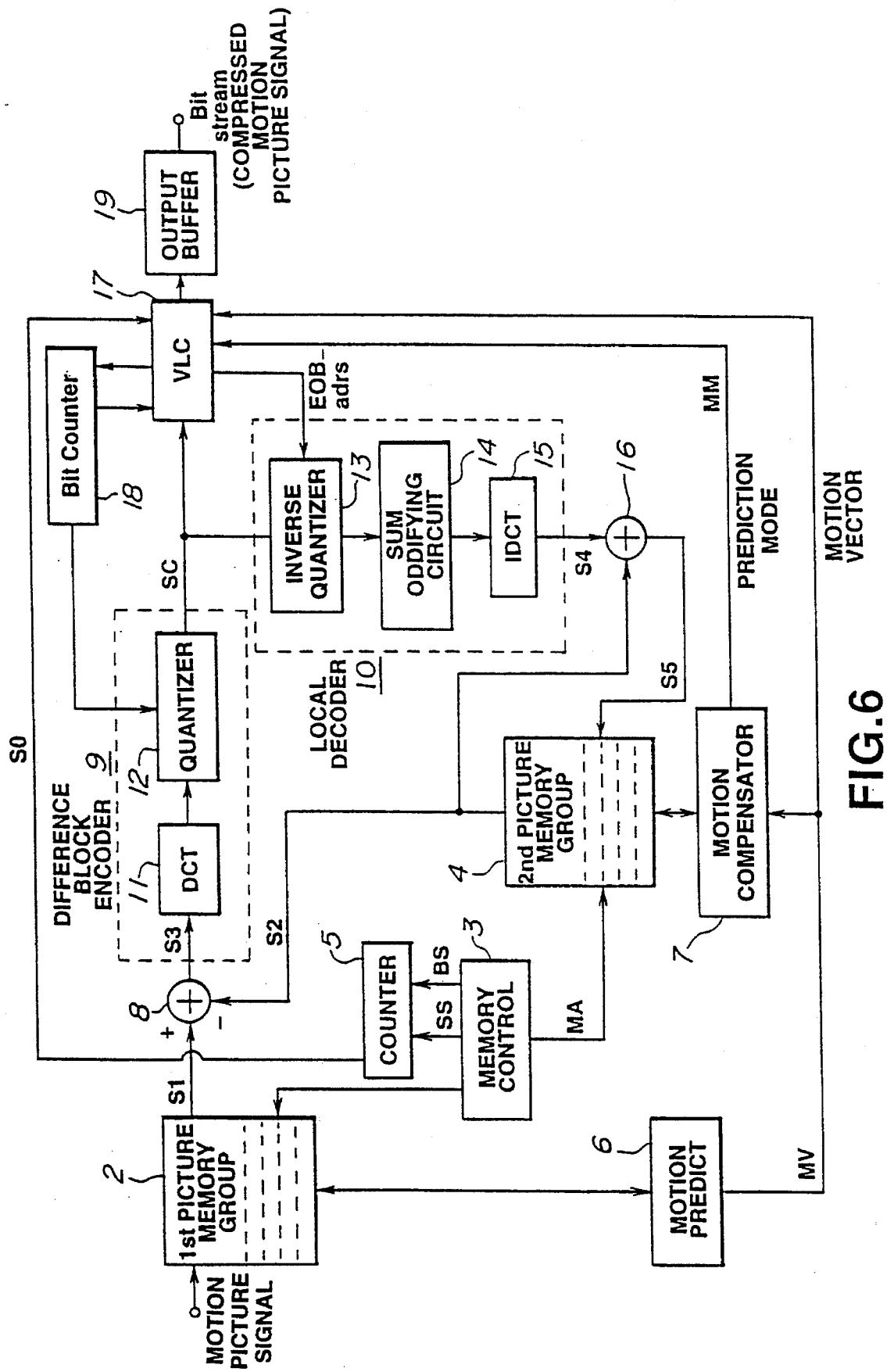
FIG. 6 is a block diagram showing the configuration of a first embodiment of a motion picture signal compressor apparatus according to the invention.

The practical configuration of the motion picture signal compressor apparatus to which the invention is applied is shown in FIG. 6. In the apparatus shown in FIG. 6, the motion picture signal is divided into pictures, and is compressed picture-by-picture. Each picture is divided into picture blocks, and the picture is compressed block-by-block. The picture block being compressed will be called the current picture block. The current picture block is a block of a picture called the current picture.

The motion picture signal, normally a video signal, is delivered to the first picture memory group 2, where plural pictures of the motion picture signal are temporarily stored. The memory controller 3 controls the reading of pictures from the first picture memory group 2 and the second picture memory group 4. The memory controller 3 also delivers the slice start signal SS and the macro block start signal BS to the slice/macro block counter 5. The memory controller respectively delivers these signals synchronously with each slice and each macroblock of each picture (e.g., the current picture) read out of the first picture memory group 2 for compression. A slice is a horizontal row of blocks covering the width of the picture.

The motion predictor 6 carries out motion prediction by performing block matching between the current picture block and multiple blocks of the prior and following pictures stored in the first picture memory group 2. The block matching is performed using blocks of, e.g., 16×16 pixels. The motion prediction reference picture indication signal generated by the memory controller 3 selects the blocks of the prior and following pictures stored in the first picture memory group 2 to be block matched with the current block. The motion predictor 6 then delivers to the motion compensator 7, as the motion vector MV, the position of a block in one of the prior or following pictures stored in the first picture memory group for which the differences between the block and the current picture block, i.e., the motion prediction error, are minimum.

In response to the motion vector MV, the motion compensator 7 causes a block of each of the reconstructed pictures stored in the second picture memory group 4 to be read out as a potential matching block. The position in the reconstructed pictures from which the potential matching blocks are read is specified by the motion vector MV. The motion compensation reference picture indication signal from the memory controller 3 then selects one of the potential matching blocks read out from the second picture memory group 4 as the matching block for the current block. The reconstructed pictures stored in the second picture memory group 4 are pictures that have been reconstructed by locally decoding the quantized DCT coefficients generated by the difference block encoder 9, which will be described below.

The reconstructed picture from which the matching block is selected by the motion compensation reference picture indication signal depends on the prediction mode of the current picture. In the forward prediction mode, the matching block is selected from a prior reconstructed picture. In the bidirectional prediction mode, the matching block is selected from a prior reconstructed picture, a future reconstructed picture, or can be generated by performing a linear operation (e.g., average value calculation) on blocks of a prior reconstructed picture and a future reconstructed picture. Finally, when the current picture is coded in the intra-picture coding mode, i.e., the picture is coded without prediction, a zero block, in which all the pixel values are set to zero, is used as the matching block. The matching blocks read out from the second picture memory group 4 are adaptively modified so that an optimally-matching matching block is selected for each block of the motion picture signal.

The motion compensator 7 selects the prediction mode for each picture by first calculating the sum of the absolute values of the pixel-by-pixel differences between the current picture block and potential matching blocks generated in the different prediction modes. Then, the motion compensator selects the prediction mode for which this sum is a minimum. The motion compensator feeds the prediction mode signal MM, which indicates the selected prediction mode, to the variable-length coder 17, which will be described below. The motion compensator 7 also causes the second picture memory group 4 to feed the matching block S2 for the selected prediction mode to the difference block calculating circuit 8.

The difference block calculating circuit 8 also receives the current picture block S1 of the motion picture signal read out from the first picture memory group 2, and calculates the pixel-by-pixel difference between the current picture block S1 and the matching block S2. The difference block calculating circuit feeds the resulting difference block S3 to the difference block encoder 9. The difference block encoder 9 compresses the difference block S3 to form the block of quantized transform coefficients SC. The block of quantized transform coefficients SC is fed into the local decoder 10, where it is expanded to provide the recovered difference block S4. The local decoder 10 in the motion picture signal compressor apparatus has a configuration similar to the compressed motion picture signal expander apparatus, to be described below, but differs in detail.

The difference block encoder 9 and the local decoder 10 will now be described.

The difference block encoder 9 comprises the DCT circuit 11 and the quantizer 12, as shown in FIG. 6. The DCT circuit 11 uses DCT processing to orthogonally transform the difference block S3 from the difference block generating circuit 8. The difference block may alternatively be orthogonally transformed using other types of orthogonal transform. The DCT circuit 11 feeds the resulting block of DCT coefficients to the quantizer 12. The quantizer 12 quantizes the block of DCT coefficients to provide the block of quantized DCT coefficients SC.

The local decoder 10 comprises the inverse quantizer 13, the sum oddifying circuit 14 and the IDCT circuit 15, as shown in FIG. 6. The inverse quantizer 13 uses a quantizing table to inversely quantize the block of quantized DCT coefficients SC from the quantizer 12. The oddification circuit performs a parity inversion operation on the resulting block of DCT coefficients when the sum of the DCT coefficients in the block is not an odd number. This prevents a mismatch error from an occurring when the resulting block of sum-oddified DCT coefficients is inversely orthogonally transformed. The IDCT circuit 15 performs inverse discrete cosine transform (IDCT) processing on the sum oddified block of DCT coefficients from the sum oddifying circuit 14 to provide the recovered difference block S4.

The quantizing performed by the quantizer 12 will now be described. Each block of 8×8 DCT coefficients is quantized. Each macroblock of a picture compressed in the intra-picture coding mode (an I-picture) is called an intra macroblock. Each macroblock compressed in an inter-picture coding mode is called a non-intra macroblock. When an intra macroblock is orthogonally transformed, the DCT coefficient of the (0, 0) component is the DC coefficient. The DC coefficient is quantized by dividing, with rounding, the DC coefficient by 8 when quantizing with 8-bit accuracy, by 4 when quantizing with 9-bit accuracy, by 2 when quantizing with 10-bit accuracy, and by 1 when quantizing with 11-bit accuracy. The DC component of an intra macroblock is quantized according to the following equations, which are written in the syntax of the C programming language:

$$QDC = dc \text{ // } 8 \text{ (8 bits)} \quad (5)$$
$$QDC = dc \text{ // } 4 \text{ (9 bits)}$$
$$QDC = dc \text{ // } 2 \text{ (10 bits)}$$
$$QDC = dc \text{ // } 1 \text{ (11 bits)}$$

where dc is the DC coefficient and QDC is the quantized DC coefficient

The DCT coefficients, other than the DC coefficient, resulting from orthogonally transforming an intra macroblock (the "AC components"), are quantized by determining the quantizing factors $ac^-(i, j)$ by weighting the DCT coefficients $ac(i, j)$ by the weighting matrix Wi according to the following equation:

$$ac^-(i, j) = (16*ac(i, j))//Wi(i, j) \quad (6)$$

The coefficients of the weighting matrix Wi are as follows:

$$Wi = \begin{matrix} 8 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{matrix} \quad (7)$$

Then, using the following equation, the quantizing factors $ac^-(i, j)$ are quantized to determine the quantizing levels QAC(i, j) of the respective AC coefficients.

$$QAC(i,j) = \frac{ac^-(i,j) + \text{sign}(ac^-(i,j)) * ((p*mquant)//q)}{(2*mquant)} \quad (8)$$

In the above equation, p and q are arbitrary fixed integers, for example, p=3 and q=4, and mquant is the quantizing coefficient.

The DCT coefficients resulting from orthogonally transforming an inter-picture coding macroblock (a "non-intra macroblock") are quantized by determining the quantizing factors $ac^-(i, j)$ by weighting all the DCT coefficients obtained by transforming the non-intra macroblock by the weighting matrix Wn according to the following equation:

$$ac^-(i, j) = (16 * ac(i, j))//Wn(i, j) \quad (9)$$

The coefficients of the weighting matrix Wn are as follows:

$$Wn = \begin{matrix} 16 & 17 & 18 & 19 & 20 & 21 & 22 & 23 \\ 17 & 18 & 19 & 20 & 21 & 22 & 23 & 24 \\ 18 & 19 & 20 & 21 & 22 & 23 & 24 & 25 \\ 19 & 20 & 21 & 22 & 23 & 24 & 26 & 27 \\ 20 & 21 & 22 & 23 & 25 & 26 & 27 & 28 \\ 21 & 22 & 23 & 24 & 26 & 27 & 28 & 30 \\ 22 & 23 & 24 & 26 & 27 & 28 & 30 & 31 \\ 23 & 24 & 25 & 27 & 28 & 30 & 31 & 33 \end{matrix} \quad (10)$$

Then, using the following equation, the quantizing factors $ac^-(i, j)$ are quantized to determine the quantizing levels QAC(i, j) of the AC coefficients.

$$QAC(i,j) = ac^-(i,j)/(2*mquant) \quad (11)$$
if (mquant == add)
$ac^-(i,j) + 1/(2*mquant)$
if (mquant == even AND $ac^-$ < 0)
$ac^-(i,j) - 1/(2*mquant)$
if (mquant == even AND $ac^-$ > 0)

The resulting quantizing levels QAC(i, j) are fed to the variable-length coder 17 and to the local decoder 10 as the above-described block of quantized DCT coefficients SC.

The variable-length coder 17 applies variable-length coding to the block of quantized DCT coefficients obtained by quantizing the block of DCT coefficients. The variable-length coder 17 determines differences between the quantized transform coefficients in the four luminance blocks constituting each macroblock and the DC coefficient of the respective intra macroblock. The variable length coder then uses a variable-length coding table to apply variable-length coding to the resulting difference values. This technique exploits the high correlation between the four adjacent luminance blocks, which means that the DC coefficients have substantially the same value. The variable-length coder 17 also determines the differences between the quantized coefficients of the two color difference blocks, and uses a variable-length coding table to apply variable-length coding to the resulting difference values. The variable-length coding table for the luminance coefficients and that for the color differences are different from one another.

Figure 7:
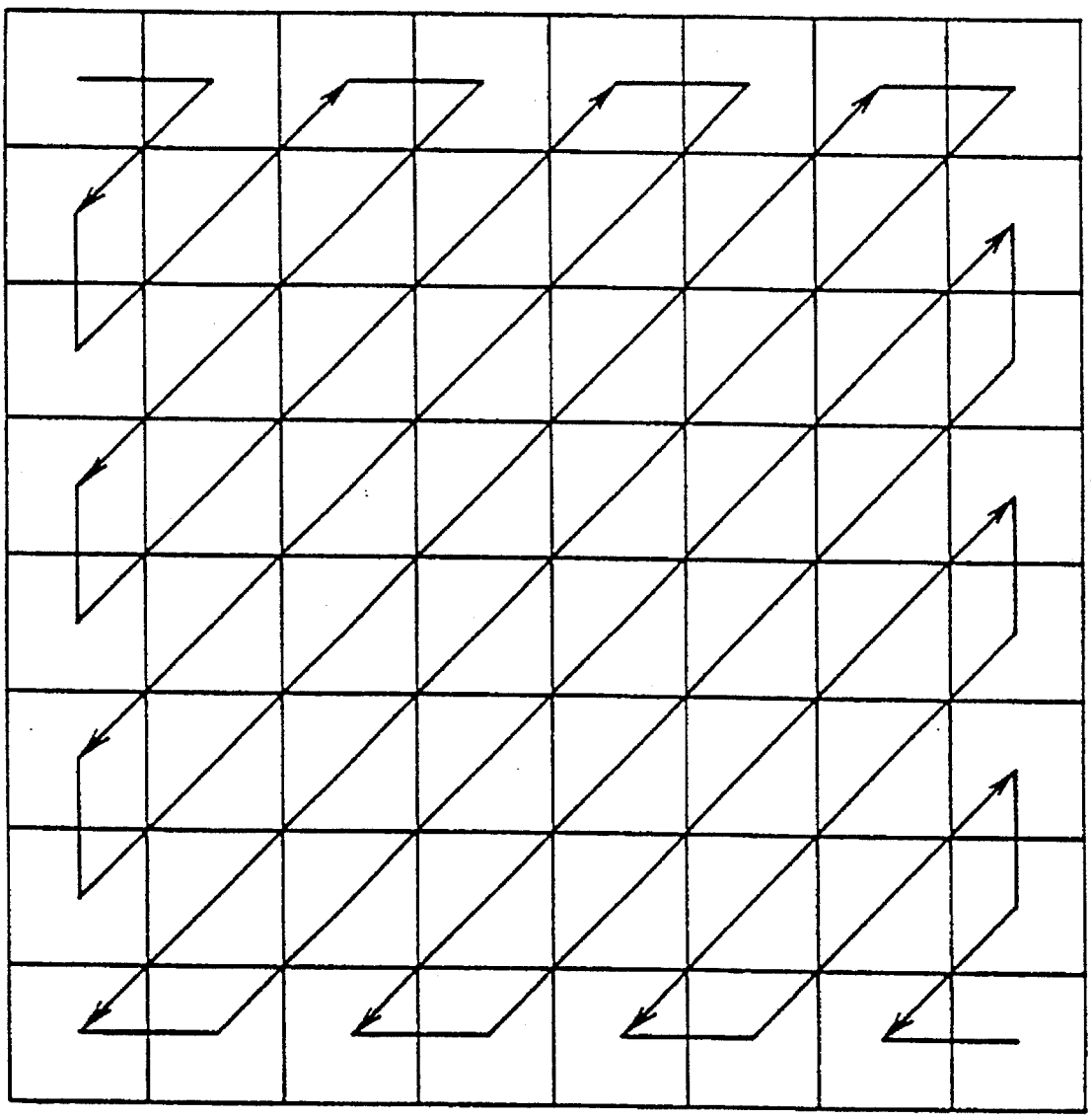
FIG. 7 illustrates how a block of DCT coefficients is read using zigzag scanning.

The variable-length coder 17 applies variable-length coding to the block of quantized DCT coefficients by reading the block of quantized DCT coefficients in zigzag scan order, starting with the DCT coefficient of the component (0, 0), as shown in FIG. 7. The block of quantized DCT coefficients is read in zigzag scan order because the non-zero DCT coefficients resulting from the DCT processing are generally concentrated in the vicinity of the (0, 0) component. Thus, reading the DCT coefficients in zigzag scan order increases the efficiency of the variable-length coding by increasing the run of consecutive zero DCT coefficients read between each non-zero DCT coefficient.

The variable-length coder 17 reads the DCT coefficients in zigzag scan order, and determines the value (in other words, the level) of each non-zero DCT coefficient, and the number (in other words, the run) of zero DCT coefficients preceding it. This performs a two-dimensional variable-length coding of the block of DCT coefficients. After coding, the coefficients in the block are expressed by a number of run and level pairs. The variable-length coder also adds a 2-bit code, EOB, that indicates the non-zero DCT coefficient that is the last non-zero DCT coefficient. The variable-length coder 17 delivers to an address converter (not shown) the address of the last non-zero coefficient in zigzag scan order. The address converter converts the address in zigzag scan order to an address, EOB_adrs, in raster scan order. The variable-length coder feeds the address EOB_adrs to the sum oddification circuit 14.

The sum oddification circuit 14 stores the address EOB_adrs in raster scan order in the register 25 shown, for example in FIG. 8, which will be described below.

Figure 8:
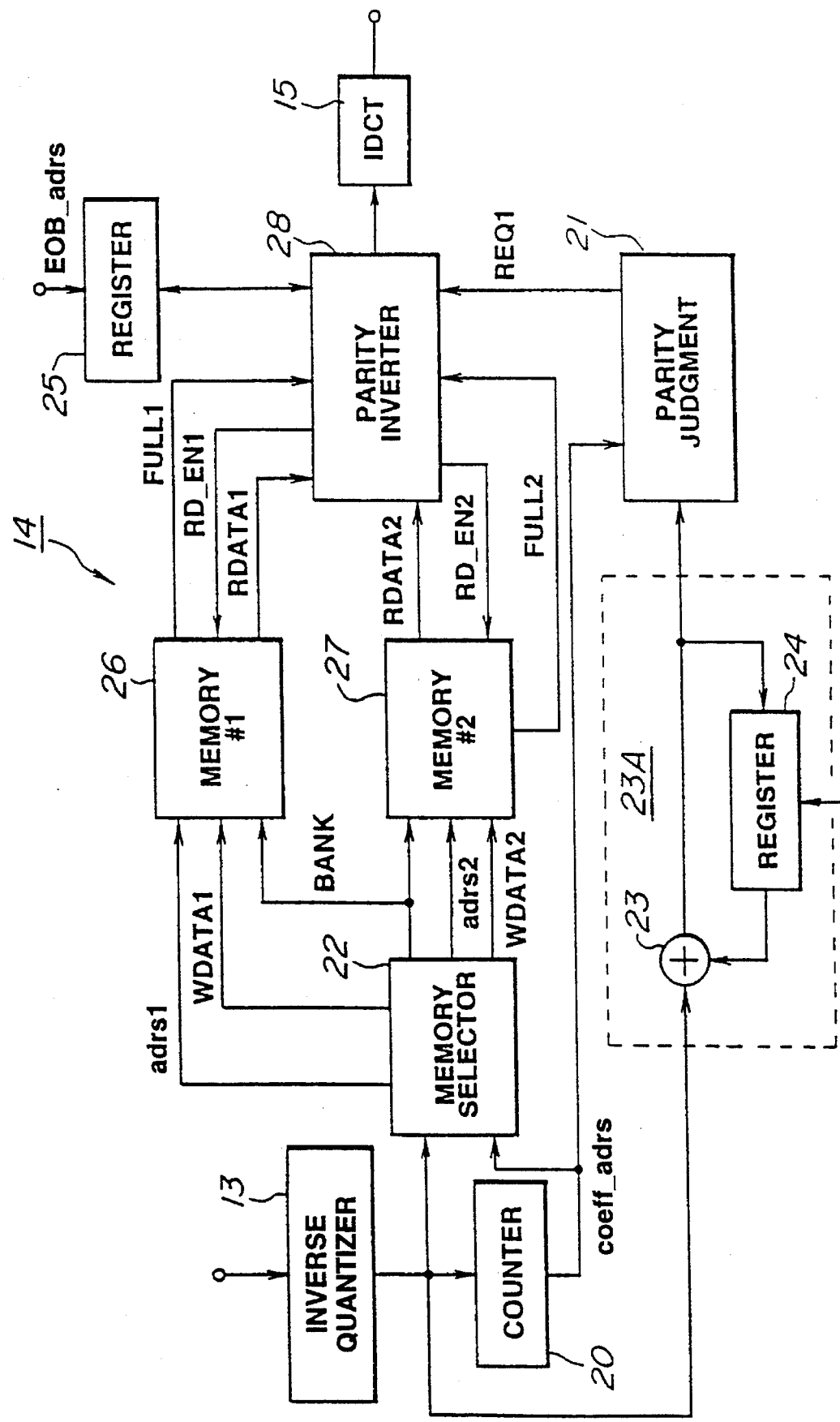
FIG. 8 is a block diagram of a first practical embodiment of the sum oddifying circuit 14 shown in FIG. 6.

The inverse quantizer 13 will now be described. The inverse quantizer 13 receives the block of quantized DCT coefficients SC from the difference block encoder 10, inversely quantizes the block of quantized DCT coefficients to provide a block of DCT coefficients. In practice, the inverse quantizer 13 inversely quantizes the quantized DC coefficients resulting from orthogonally transforming an intra macroblock using the processing defined in equation (12) to provide respective DC coefficients. The inverse quantizer 13 also inversely quantizes the quantized AC coefficients resulting from orthogonally transforming an intra macroblock using the processing defined in equation (13). Finally, the inverse quantizer 13 inversely quantizes all the quantized coefficients resulting from orthogonally transforming a non-intra macroblock using the processing defined in equation (14).

$$rec(0,0) = 8 * QDC \quad (12)$$
$rec(0,0) = 4 * QDC$ (9 bits)
$rec(0,0) = 2 * QDC$ (10 bits)
$rec(0,0) = 1 * QDC$ (11 bits)

$$rec(i,j) = (mquant * 2 * QAC(i,j) * Wi(i,j))/16 \quad (13)$$
if (QAC(i,j) == 0)
$rec(i,j) = 0$ if QAC(i,j) > 0 \quad (14)
$rec(i,j) = ((2*QAC(i,j) + 1) \, mquant*Wn(i,j))/16$
if QAC(i,j) < 0
$rec(i,j) = ((2*QAC(i,j) - 1)*mquant*Wn(i,j))/16$
if QAC(i,j) == 0
$rec(i,j) = 0$ The resulting block of DCT coefficients is fed from the inverse quantizer 13 to the sum oddifying circuit 14, a practical example of which is shown in FIG. 8.

The sum oddifying circuit 14 comprises the accumulator 23A, the parity judgment circuit 21, and the parity inverter 28. The accumulator 23A determines the sum of the DCT coefficients in the block of DCT coefficients received from the inverse quantizer 13. The parity judgment circuit 21 judges whether the sum of the DCT coefficients determined by the accumulator 23A is an odd number or an even number, i.e., whether the parity of the sum of the DCT coefficients is odd or even. Only when the parity judgment circuit judges that the parity of the sum of the DCT coefficients is even, the parity inverter 28 changes the parity of at least one of the DCT coefficients in the block to make the parity of the sum of the DCT coefficients odd. When the sum of the DCT coefficients in the block is an odd number (in other words, when the parity of the sum is odd), this prevents a mismatch error from occurring when the block of sum-oddified DCT coefficients from the sum oddification circuit 14 is inversely orthogonally transformed by the IDCT circuit 15.

The parity inverter 28 inverts the parity of one of the DCT coefficients by changing one of the DCT coefficients that had an odd parity to make its parity even, or by changing one of the DCT coefficients that had an even parity to make its parity odd. Inverting the parity of one of the DCT coefficients (or an odd number of DCT coefficients) inverts the parity of the sum of the DCT coefficients in the block. Hence, the sum of the DCT coefficients in the block is made an odd number, or, in other words, is oddified.

The counter 20 counts the number of DCT coefficients received from the inverse quantizer 13, and feeds the resulting count coeff_adrs to the parity judgment circuit 21 and to the memory selector 22.

The accumulator 23A comprises the adder 23 and the register 24. The adder 23 adds each DCT coefficient in a block of DCT coefficients received from the inverse quantizer 13 to the sum of the already-received DCT coefficients in the block stored in the register 24. The register 24 is reset after the sum has been determined for each block of DCT coefficients. The resulting sum of the DCT coefficients is fed from the adder 23 to the register 24, and to the parity judgment circuit 21. The accumulator 23A need only sum the least significant bits of the DCT coefficients in the block to provide a result suitable for the parity judgment circuit to judge whether the parity of the sum of the DCT coefficients is odd or even.

The parity judgment circuit 21 judges whether the parity of the sum of the DCT coefficients in the block of DCT coefficients is odd or even in response to the count value coeff_adrs received from the counter 20. When all the DCT coefficients in the block have been delivered to the accumulator 23A, the value of coeff_adrs indicates that the accumulator 23A has determined the sum of all the DCT coefficients in the block. In response to the count value coeff_adrs, the parity judgment circuit 21 judges whether the parity of the sum of the DCT coefficients from the accumulator 23A is odd or even. For example, in the case of a two-dimensional 8×8 DCT transform, the parity judgment circuit 21 judges whether the parity of the sum of the DCT coefficients from the accumulator 23A is odd or even when the value of coeff_adrs indicates that all 64 DCT coefficients in the block have been delivered to the accumulator 23A.

In practice, for example, when each DCT coefficient is represented by a binary number, the parity judgment circuit 21 examines the least-significant bit (LSB) of the sum of the DCT coefficients received from the accumulator 23A. An LSB of zero indicates that the parity of the sum is even. In this case, the parity judgment circuit 21 feeds the processing request signal REQ1 to the parity inverter 28 to cause the parity inverter to carry out a parity inversion operation. In response to the processing request signal REQ1, the parity inverter 28 changes the parity of one of the DCT coefficients in the block to oddify the sum of the DCT coefficients. Alternatively, the parity inverter 28 could invert the parity of an odd number of the DCT coefficients in the block to oddify the sum of the DCT coefficients, but it is only necessary to invert the parity of one of the DCT coefficients in the block. On the other hand, an LSB of one indicates that the parity of the sum is odd. In this case, the parity judgment circuit 21 does not provide the processing request signal REQ1, and the parity inverter 28 leaves the parity of all the DCT coefficients in the block unchanged.

In the practical circuit shown, the DCT coefficients from the inverse quantizer 13 are stored in the first memory 26 or the second memory 27 via the memory selector 22. The memory selector 22 operates in response to the count value coeff_adrs received from the counter 20. Thus, for example, when the memory selector 22 determines that all the DCT coefficients in the block have been stored in the first memory 26, the memory selector specifies the second memory, so that the DCT coefficients of the next block are stored in the second memory 27. Thus, consecutive blocks of DCT coefficients are stored alternately in the first memory 26 and the second memory 27. When all the DCT coefficients in the block have been stored in the either the first memory 26 or the second memory 27, the memory in which all the DCT coefficients in the block is stored feeds the memory full signal FULL1 or FULL2 to the parity inverter 28.

When the parity inverter 28 receives the memory full signal FULL1 or the memory full signal FULL2, it feeds the read enable signal RD_EN1 or RD_EN2 to the memory that provided the memory full signal. This causes the memory that generated the memory full signal to feed the block of DCT coefficients to the parity inverter.

The parity inverter 28 operates on the block of DCT coefficients read out from the memory in one of two ways, depending on whether the parity judgment circuit 21 has generated the processing request signal REQ1. When the parity inverter 28 receives the processing request signal REQ1, it inverts the LSB of one of the DCT coefficients in the block, for example, the last non-zero coefficient in zigzag scan order. Otherwise the parity inverter leaves the least-significant bits of all the DCT coefficients in the block unchanged, The parity inverter 28 identifies the DCT coefficient whose parity may be inverted by the address of the DCT coefficient whose parity may be inverted stored in the register 25. For example, FIG. 8 shows the address of the last non-zero coefficient, EOB_adrs, fed into the register 25. Hence, in this example, the DCT coefficient whose parity may be inverted is the last non-zero coefficient. When the parity inverter 28 inverts the parity of the DCT coefficient whose parity may be inverted, the parity of the sum of non-zero coefficients in the block from first to last is made odd. The parity inverter 28 feeds all the other DCT coefficients in the block to the IDCT circuit 15 with the state of their LSBs unchanged. The parity inverter 28 also feeds the DCT coefficient whose parity may be inverted to the IDCT circuit with the state of its LSB depending on whether the parity inverter received the request processing signal REQ 1.

Figure 9:
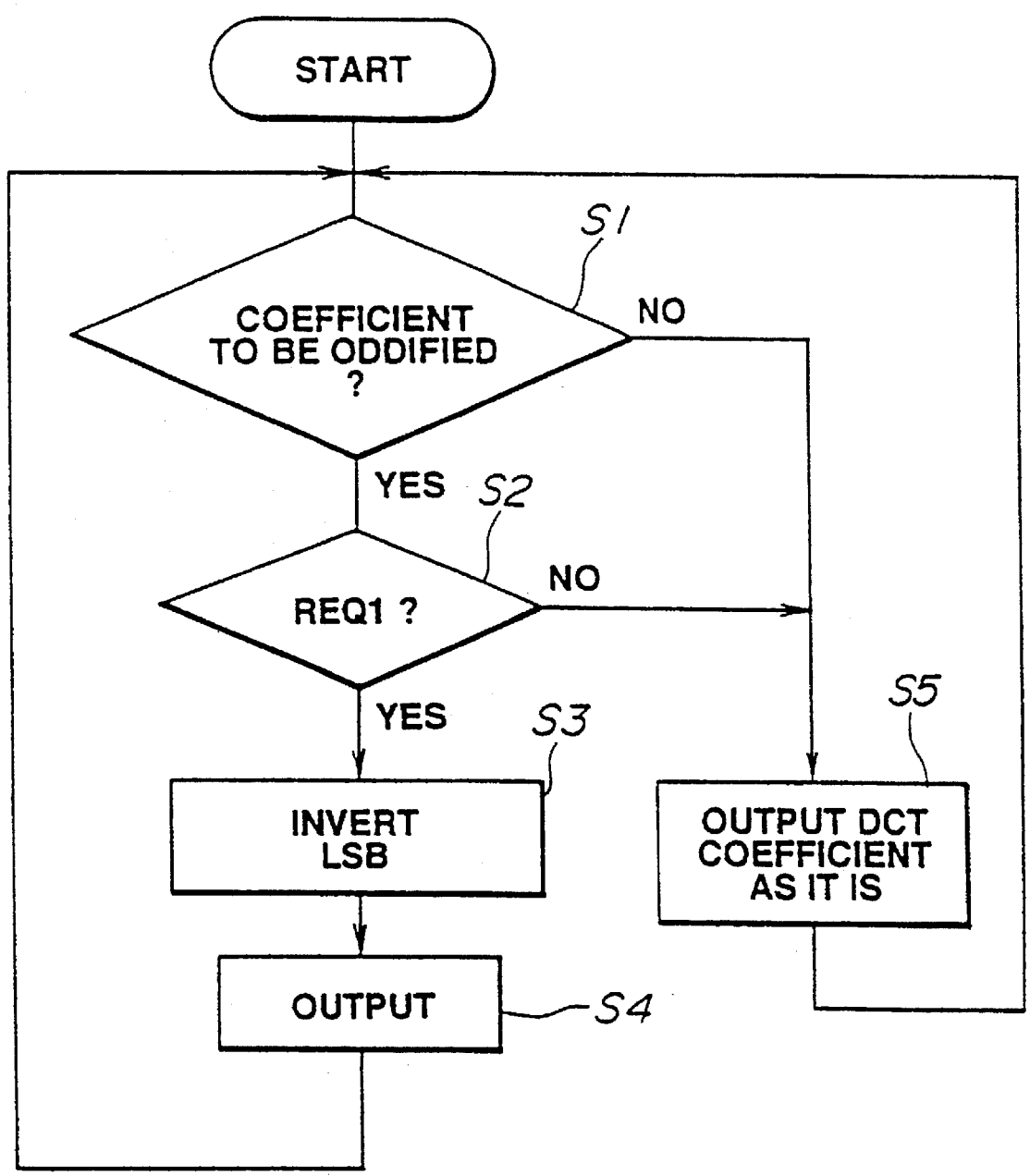
FIG. 9 is a flow chart showing the operation of the sum oddifying circuit shown in FIG. 8.

The parity inverter 28 may be provided using a computer or digital signal processor operating in accordance with the flow chart shown in FIG. 9, for example. In this example, the DCT coefficient whose parity may be inverted is the last non-zero coefficient in the block. At step S1, the parity inverter 28 judges from the address EOB_adrs whether or not the DCT coefficient being processed is the DCT coefficient whose parity may be inverted by inverting its LSB. If the result at step S1 is YES, execution proceeds to step S2. Otherwise, execution proceeds to step S5, which will be described below.

At step S2, the parity inverter 28 determines whether the processing request signal REQ 1 has been received. If the result at step S2 is YES, indicating that the processing request signal REQ1 has been received, execution proceeds to step S3. Otherwise, no processing request has been received, and execution proceeds to step S5.

Figures 10A, 10B:
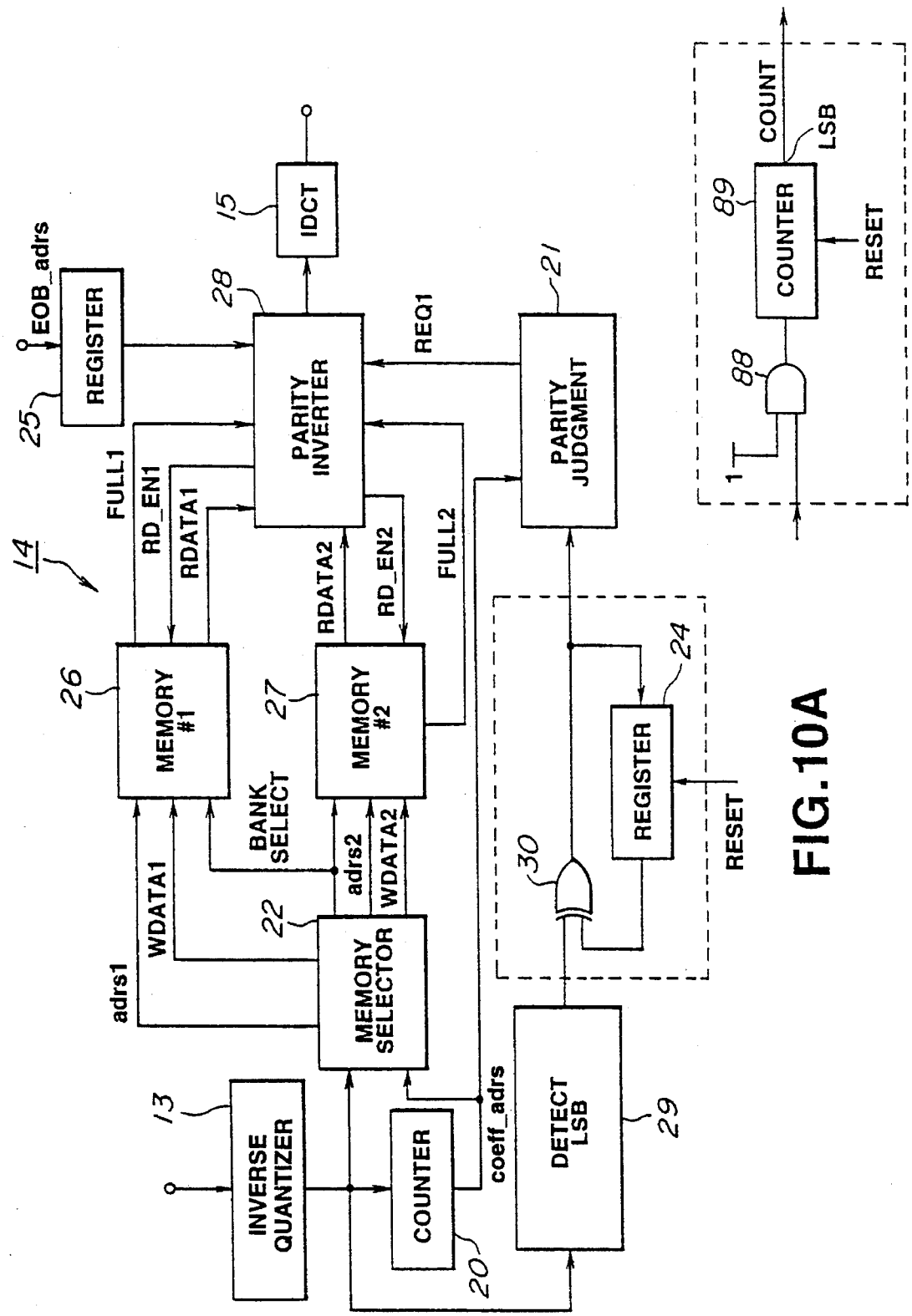
FIG. 10A is a block diagram of a second embodiment of the sum oddifying circuit shown in FIG. 6.
FIG. 10B shows a variation on the second embodiment of the sum oddifying circuit shown in FIG. 6.

At step S3, the parity inverter 28 inverts the LSB of the DCT coefficient whose parity may be inverted to invert its parity, and hence to change the parity of the sum of the DCT coefficients. Execution passes to step S4, where the parity-inverted DCT coefficient is fed to the IDCT circuit 15 (FIG. 10A). Then, execution returns to step S1, where the next DCT coefficient is processed.

Execution passes to step S5 when the DCT coefficient being processed is not the DCT coefficient whose parity may be inverted, or when the DCT coefficient whose parity may be inverted is not to have its parity inverted, i.e., when the processing request signal REQ1 has not been received. At step 85, the DCT coefficient is fed to the IDCT circuit 15 without modification. Then, execution returns to step S1, where the next DCT coefficient is processed.

When the DCT coefficients are represented by a 2's complement representation, the above-mentioned LSB is the LSB of the 2's complement representation. On the other hand, when the DCT coefficients are represented by a sign and an absolute value, the above-mentioned LSB is the LSB of the absolute value.

The configuration of the sum oddifying circuit 14 is not limited to that shown in FIG. 8. For example, in the sum oddifying circuit shown in FIG. 10A, the LSB detector 29 is added, and the exclusive-OR gate 30 is substituted for the adder 23 in the sum oddifying circuit shown in FIG. 8. Elements in the circuit shown in FIG. 10A corresponding to those in the circuit shown in FIG. 8 are indicated by the same reference numerals, and will not be described again here.

In FIG. 10A, the LSB detector 29 detects the LSB of each DCT coefficient in the block of DCT coefficients. The exclusive-OR gate 30 performs an exclusive-OR operation between the LSB of each DCT coefficient in the block and the exclusive logical sum, stored in the register 24, of the LSBs of the DCTs in the block that have already been processed. Thus, the exclusive-OR gate 30 and the register 24 derive the exclusive logical sum of the LSBs of the DCT coefficients in each block. The register 24 is reset after the exclusive logical sum of the LSBs of the DCT coefficients in each block has been determined.

The combination of the exclusive-OR gate 30 and the register 24 may also be regarded as counting the DCT coefficients in the block having an LSB of one. Then, when all the DCT coefficient in the block have been received, the state of the output of the exclusive-OR gate 30 indicates to whether the count of the DCT coefficients having an LSB of one is odd or even. The parity judgment circuit 21 then issues the processing request signal REQ1 when the count of the DCT coefficients having an LSB of one is even.

FIG. 10B shows an alternative configuration that can be substituted for the exclusive-OR gate 30 and the register 24. In this, the LSBs of each DCT coefficient received from the inverse quantizer 13 is fed from the LSB detector 29 to the AND gate 88. The AND gate passes only those LSB's that are a one to the counter 89. The counter is reset at the beginning of each block of DCT coefficients, and counts each LSB of one that it receives. The LSB of the count COUNT from the counter 89 is fed to the parity judgment circuit 21. At the end of each block, the parity judgment circuit determines the parity of the LSB of the count COUNT from the counter 89. If the parity of the count COUNT is odd (i.e., the LSB of COUNT is a one), this indicates that there are an odd number of DCT coefficients with an LSB of one in the block, and that the parity of the sum of the DCT coefficients in the block is odd. On the other hand, if the parity of the count COUNT is even (i.e., the LSB of COUNT is a zero), this indicates that there are an even number of DCT coefficients with an LSB of one in the block, and that the parity of the sum of the DCT coefficients in the block is even.

A practical configuration of a first embodiment of the parity inverter 28 in the sum oddifying circuits shown in FIGS. 8 and 10A will now be described with reference to FIG. 11. The parity inverter 28 comprises the readout counter 61, the address comparator 62, the LSB inverter 63, the AND gates 64, 65, 67, and 68, the OR gates 66 and 69, and the inverters 71 and 72.

The parity inverter 28 operates as follows. When the readout counter 61 receives the memory full signal FULL from the first memory 26 or the second memory 27, it delivers the read enable signal RD_EN to the first memory 26 or the second memory 27. The read enable signal causes the respective memory to sequentially feed the DCT coefficients in the block of DCT coefficients stored therein to the first AND gate 67 via the path marked RDATA.

The memory full signal FULL also causes the readout counter 61 to start counting the DCT coefficients received, and to provide to the comparator 62 a count value indicating the number of DCT coefficients received. The comparator 62 compares the count value with the address received from the register 25 to determine whether the DCT coefficient received by the first AND gate 67 is the DCT coefficient whose parity may be inverted, i.e., the DCT coefficient whose LSB may be inverted. In the example shown in FIG. 11, the DCT coefficient whose parity may be inverted is the last non-zero DCT coefficient, identified by the address EOB_adrs stored in the register 62. When the count value equals the address of the DCT coefficient whose parity may be inverted, in this example, the EOB_adrs, the comparator 62 determines that the DCT coefficient is the DCT coefficient whose parity may be inverted, and changes the state of its output from a 0 to a 1.

The output of the comparator 62 is fed directly to the second AND gate 68, and, via the inverter 72, to the first AND gate 67. Thus, when the DCT coefficient delivered to the parity inverter 28 is not the DCT coefficient whose parity may be inverted, and the count value is not equal to the address EOB_adrs, the first AND gate 67 is open, and the second AND gate circuit 68 is closed. Hence, the DCT coefficients pass unchanged through the first AND gate 67 and the OR gate 69 to the IDCT circuit 15.

On the other hand, when the DCT coefficient delivered to the parity inverter 28 is the DCT coefficient whose parity may be inverted, and the count value equals the address of the coefficient whose parity may be inverted, in this example, EOB_adrs, the output of the comparator 62 changes state, as described above. This closes the first AND gate 67 and opens the second AND gate 68. As a result, the DCT coefficient with its LSB inverted received via the OR gate 66 is fed via the second AND gate 68 and the OR gate 69 to IDCT circuit 15.

The DCT coefficient with its LSB inverted is selectively delivered to the IDCT circuit 15 in response to the processing request signal REQ1 by feeding the DCT coefficients received on the path RDATA into the third AND gate 64 and the LSB inverter 63. The processing request signal REQ1 is fed from the parity judgment circuit 21 directly to the fourth AND gate 65, and, via the inverter 71, to the third AND gate circuit 64. The LSB inverter 63 inverts the LSB of each DCT coefficient received on the path RDATA and feeds the resulting DCT coefficient with its LSB inverted to the fourth AND gate 65.

Absence of the processing request signal REQ1, i.e., the processing request signal in its zero state, indicates that the DCT coefficient whose parity may be inverted is to be delivered to the IDCT circuit 15 without its LSB inverted. The processing request signal in its zero state opens the third AND gate 64 and closes the fourth AND gate 65. This feeds the DCT coefficient whose parity may be inverted with its LSB unchanged from the path RDATA to the IDCT circuit 15 via the third AND gate 64, the OR gate 66, the second AND gate 68 and the OR gate 69.

On the other hand, presence of the processing request signal REQ1, i.e., the processing request signal REQ1 in its one state, indicates that the DCT coefficient whose parity may be inverted is to be delivered to the IDCT circuit 15 with its LSB inverted to change the parity of the sum of the DCT coefficients in the block. The processing request signal in its one state closes the third AND gate 64 and opens the fourth AND gate circuit 65. This feeds the DCT coefficient whose parity may be inverted with its LSB inverted from the LSB inverter 63 to the IDCT circuit 15 via the fourth AND gate 65, the OR gate 66, the second AND gate 68, and the OR gate 69.

A second embodiment of the parity inverter 28 will now be described with reference to FIG. 12. When the second embodiment of the parity inverter 28 receives the processing request signal REQ1, it oddities the sum of the DCT coefficients by adding 1 to DCT coefficient whose parity may be inverted.

Figure 12:
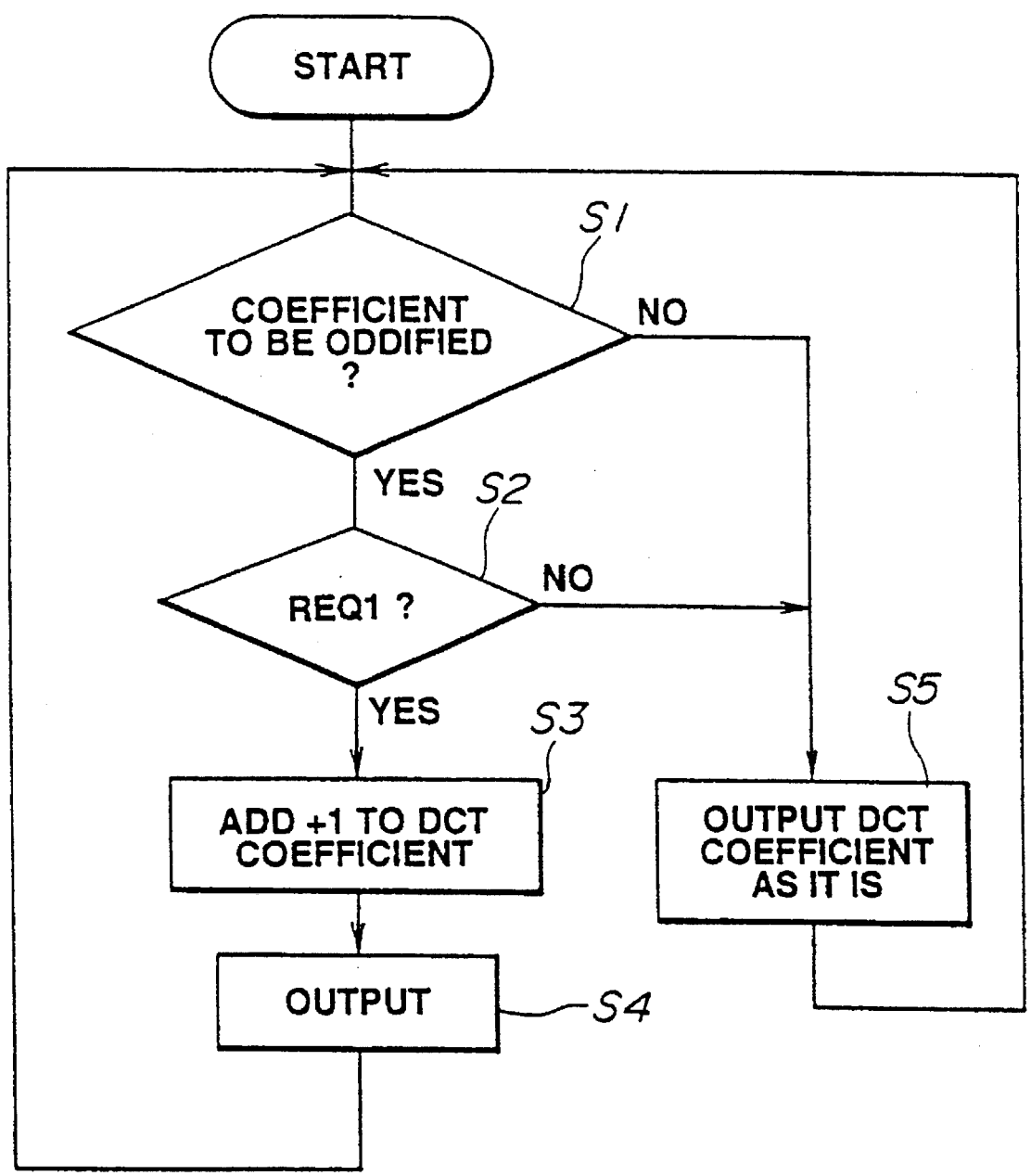
FIG. 12 is a flow chart for explaining the operation of a second embodiment of the above-mentioned parity inverter.

The second embodiment of the parity inverter 28 may be provided by a computer or digital signal processor operating in accordance with the flow chart shown in FIG. 12. The flow chart shown in FIG. 12 is similar to the flow chart shown in FIG. 9, except for the operation carried out at step S3. At step S3, the second embodiment of the parity inverter 28 oddities the sum of the DCT coefficients by adding 1 to the DCT coefficient whose parity may be inverted, instead of inverting the LSB of the DCT coefficient whose parity may be inverted. The DCT coefficient whose parity may be inverted may be, for example, the last non-zero coefficient in the block, or the DCT coefficient of the highest-frequency component in the block.

Figure 13:
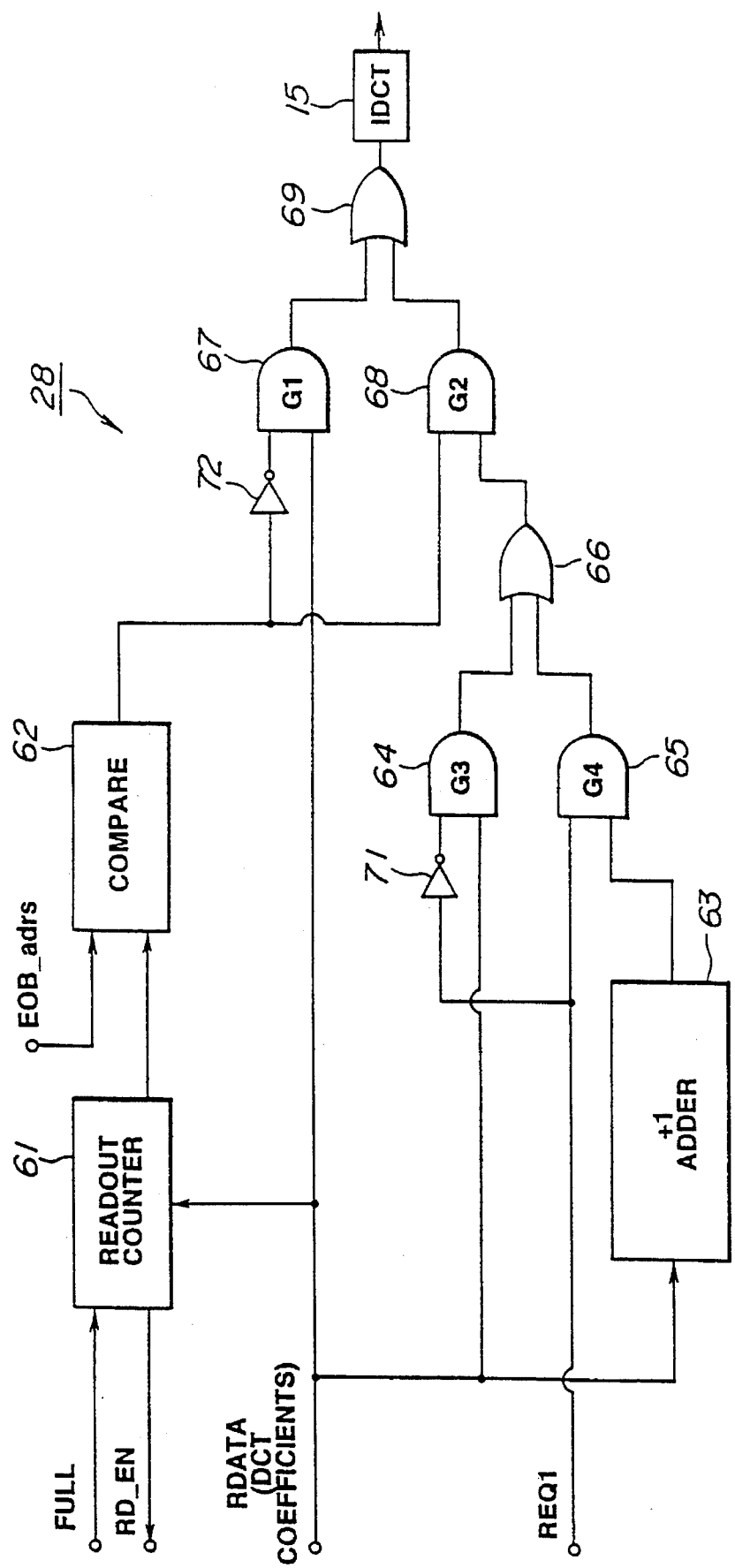
FIG. 13 is a block diagram of the second embodiment of the above-mentioned parity inverter.

A practical circuit configuration of the second embodiment of the parity inverter, in which one is added to the DCT coefficient whose parity may be inverted to oddify the sum of the DCT coefficients in the block of DCT coefficients, will now be described with reference to FIG. 13. The second embodiment of the parity inverter shown in FIG. 13 is similar to the first embodiment of the parity inverter 28 shown in FIG. 11. Elements in the circuit shown in FIG. 13 corresponding to those in the circuit shown in FIG. 11 are indicated by the same reference numerals, and will not be described again here.

Figure 11:
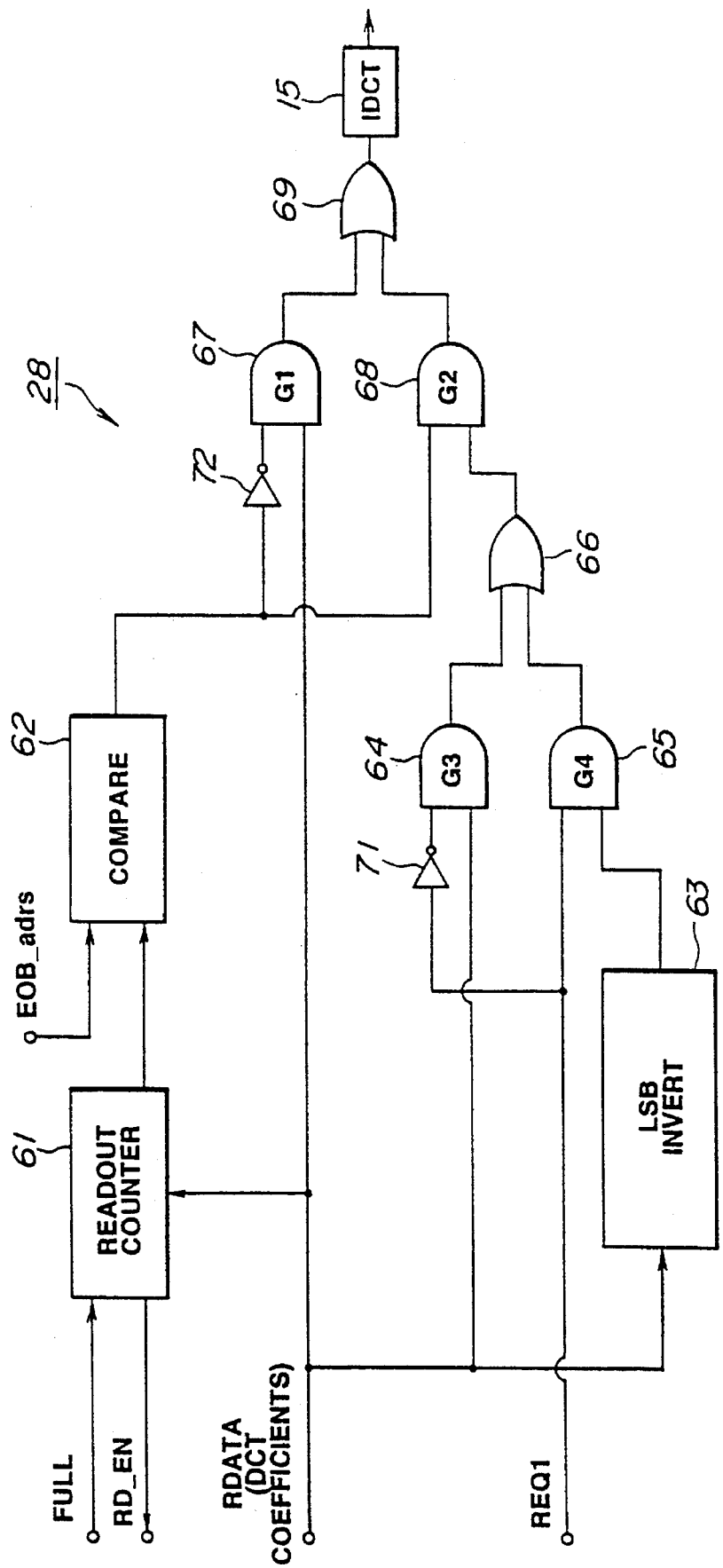
FIG. 11 is a block diagram showing a first embodiment of the parity inverter shown in FIG. 8.

The parity inverter shown in FIG. 13 includes the +1 adder 73 in lieu of the LSB inverter 63 shown in FIG. 11. The +1 adder 73 adds one to each DCT coefficient read out from the first memory 26 or from the second memory 27 and received via the path RDATA. One of the DCT coefficients with one added to it is selected in response to the processing request signal REQ1 to oddify the sum of the DCT coefficients.

Operation of the parity inverter shown in FIG. 13 is identical to that of the circuit shown in FIG. 11, except that the +1 adder 73 adds one to each DCT coefficient received on the path RDATA. Also, when the processing request signal REQ1 is present, and the DCT coefficient whose parity may be inverted is detected, the DCT coefficient with one added to it is fed from the +1 adder to the IDCT circuit 15 via the fourth AND gate 64, the OR gate 66, the second AND gate 68, and the OR gate 69.

A third embodiment of the parity inverter 28 will now be described with reference to FIGS. 14 and 15.

When the third embodiment of the parity inverter receives the processing request signal REQ1, it oddities the sum of the DCT coefficients in the block by replacing the DCT coefficient whose parity is to be inverted with the DCT coefficient whose parity is to be inverted from which one has subtracted when the sign of this DCT coefficient is positive, and to which one has been added when the sign of this DCT coefficient is negative. This processing not only inverts the parity of the DCT coefficient whose parity is to be inverted, but also reduces the magnitude of this DCT coefficient, i.e., makes the DCT coefficient whose parity is inverted closer to zero. The processing applied to the DCT coefficient whose parity is to be inverted is defined by the following equation:

$$\begin{aligned} &\text{if } (rec > 0) \\ &rec = rec - 1 \\ &\text{if } (rec < 0) \\ &rec = rec + 1 \end{aligned} \qquad (15)$$

where rec is the DCT coefficient whose parity is to be inverted.

Figure 14:
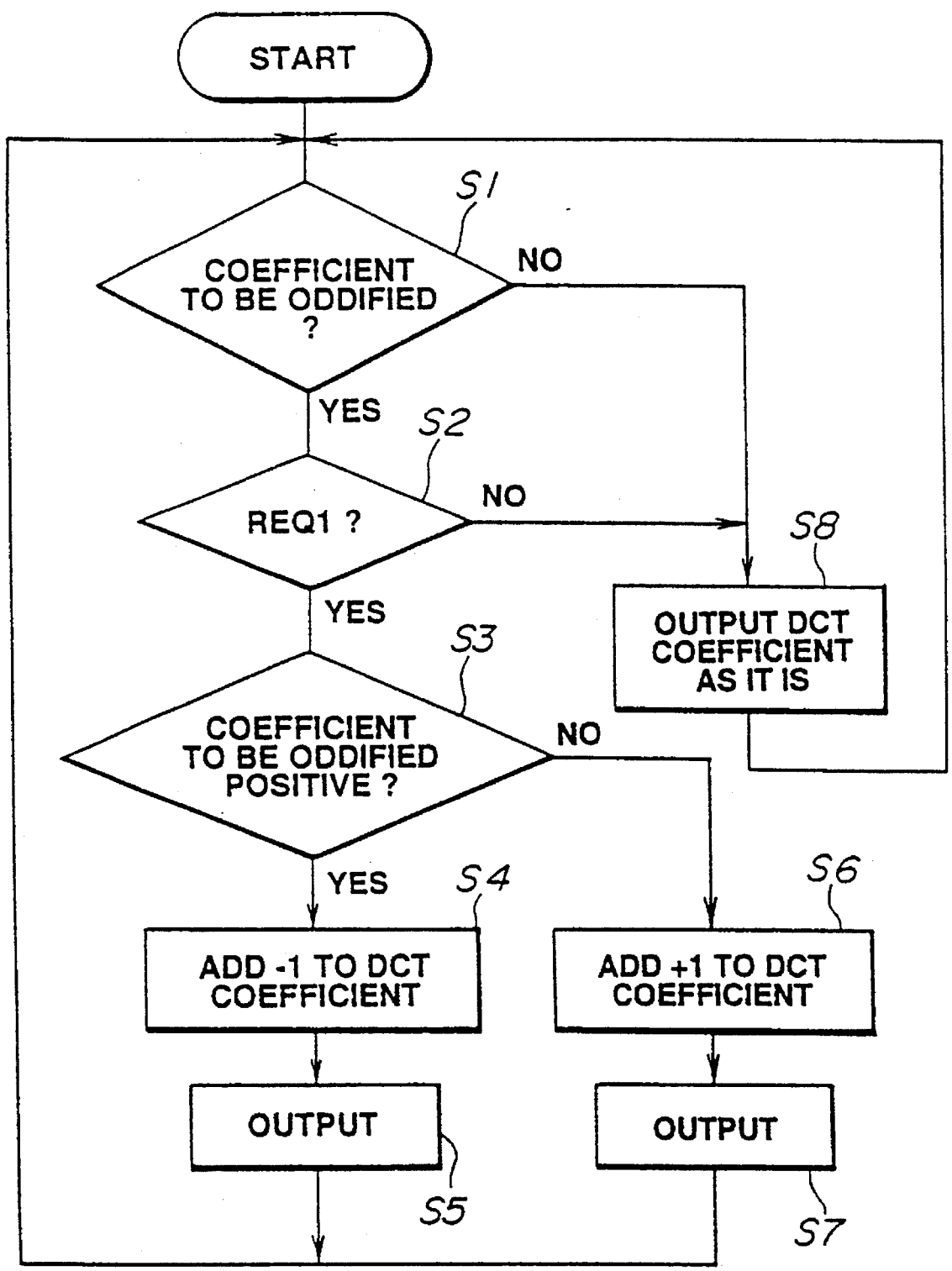
FIG. 14 is a flow chart for explaining the operation of a third embodiment of the above-mentioned parity inverter.

The third embodiment of the parity inverter 28 may be provided using a computer or digital signal processor operating according to the flow chart shown in FIG. 14. At step S1, parity inverter 28 judges whether or not the DCT coefficient is the DCT coefficient whose parity may be inverted. For example, the parity inverter judges whether or not the DCT coefficient is the last non-zero DCT coefficient. If the result at step S1 is YES, and the DCT coefficient is the DCT coefficient whose parity may be inverted, execution proceeds to step S2. Otherwise, and the DCT coefficient is not the DCT coefficient whose parity may be inverted, execution proceeds to step S8.

At step S2, the parity inverter 28 determines whether or not the processing request signal REQ1 has been received. If the result at step S2 is YES, indicating that the processing request signal REQ1 has been received, execution proceeds to step S3. Otherwise, no processing request signal has been received, and execution proceeds to step S8. Since a YES result at step S2 can only occur if a YES result is obtained at step S1, the YES result at step S2 indicates that the DCT coefficient is the DCT coefficient whose parity is to be inverted.

At step S3, the parity inverter 28 determines the polarity of the DCT coefficient whose parity is to be inverted. If the result at step S3 is YES, indicating that the polarity of the DCT coefficient is positive, execution proceeds to step S4. Otherwise, the polarity of the DCT coefficient is zero or negative, and execution proceeds to step S6.

At step S4, the parity inverter 28 subtracts one from the DCT coefficient whose parity is to be inverted (i.e., adds −1 thereto), after which execution passes to step S5, where the parity-inverted DCT coefficient is fed to the IDCT circuit 15 (FIG. 10A). Then, execution returns to step S1, where the next DCT coefficient is processed.

Otherwise, at step S6, the parity inverter 28 adds one to the DCT coefficient whose parity is to be inverted, after which execution proceeds to step S7, where the parity-inverted DCT coefficient is fed to the IDCT circuit 15. Then, execution returns to step S1, where the next DCT coefficient is processed.

Execution passes to step S8 when the DCT coefficient is not the DCT coefficient whose parity may be inverted, or when the DCT coefficient whose parity may be inverted is not have its parity inverted, i.e., when the processing request signal REQ1 has not been received. At step S8, the DCT coefficient is fed to the IDCT circuit 15 without modification. Then, execution returns to step S1, where the next DCT coefficient is processed.

Figure 15:
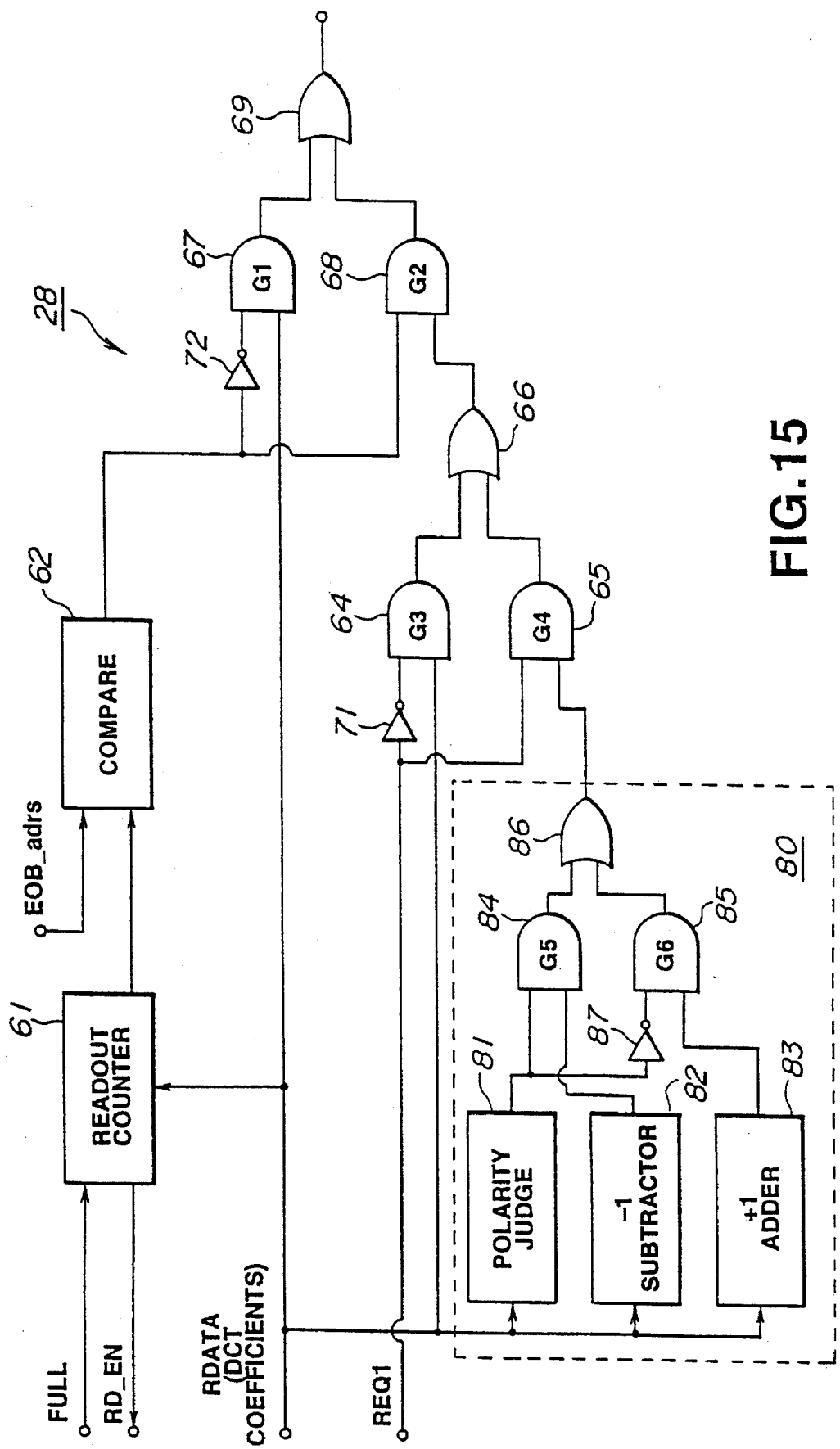
FIG. 15 is a block diagram of the third embodiment of the above-mentioned parity inverter.

FIG. 15 shows a practical example of the circuit configuration of the third embodiment of the parity inverter 28, in which the parity inversion is carried out to reduce the magnitude of the DCT coefficient whose parity is inverted, i.e., to make the DCT coefficient whose parity is inverted closer to zero.

The parity inverter shown in FIG. 15 is similar to the parity inverter 28 shown in FIG. 11. Elements in the circuit shown in FIG. 15 corresponding to those in the circuit shown in FIG. 11 are indicated by the same reference numerals, and will not be described again here. The parity inverter shown in FIG. 15 differs from the parity inverter shown in FIG. 11 in that it includes the magnitude reduction circuit 80 in lieu of the LSB inverter 63.

The magnitude reduction circuit 80 determines the polarity of each DCT coefficient received from the first memory 26 or the second memory 27 via the path RDATA. When the polarity of the DCT coefficient is positive, the magnitude reduction circuit subtracts one from the DCT coefficient, whereas, when the polarity of the DCT coefficient is zero or negative, it adds one to the DCT coefficient. The parity inverting circuit shown in FIG. 15 oddities the sum of the DCT coefficients in the block by selecting the DCT coefficient whose parity is inverted from the magnitude reduction circuit 80, and substituting the magnitude-decreased, parity-inverted DCT coefficient for the DCT coefficient whose parity is to be inverted.

The magnitude reduction circuit 80 comprises the polarity judgement circuit 81, which controls the fifth AND gate 84 directly, and the sixth AND gate 85 via the inverter 87. The magnitude reduction circuit 80 also includes the −1 subtractor 82 and the +1 adder 83 that respectively subtract one from and add one to each DCT coefficient received on the path RDATA. Either the output of the −1 subtractor 82 or the output of the +1 adder 83 is selected by the fifth AND gate 84 or the sixth AND gate 85 in response to the output of the polarity judgment circuit 81. The outputs of the AND gates 84 and 85 feed the OR gate 86, which provides the selected magnitude-reduced DCT coefficient to the fourth AND gate 65. When the parity of the sum of the DCT coefficients in the block needs to be inverted, the fourth AND gate selects the magnitude-reduced, parity-inverted output of the magnitude reduction circuit 80 for feeding to the IDCT circuit 15 in lieu of the DCT coefficient whose parity may be inverted.

The polarity judgment circuit 81 judges the polarity of each DCT coefficient in the block of DCT coefficients received via the path RDATA, and sets the state of its output to a one or a zero, depending upon whether the polarity of the DCT coefficient is positive or negative. When the polarity judgment circuit judges that the polarity of the DCT coefficient is positive, the output of the polarity judgment circuit opens the fifth AND gate 84 and closes the sixth AND gate circuit 85. This feeds the output of the −1 subtractor 82, i.e., the DCT coefficient from which one has been subtracted, to the fourth AND gate 65 via the fifth AND gate 84 and the OR gate 86.

On the other hand, when the polarity judgment circuit 81 judges that the polarity of the DCT coefficient is negative or zero, the output of the polarity judgment circuit closes the fifth AND gate 84 and opens sixth AND gate 85. This feeds the output of the +1 adder 83, i.e., the DCT coefficient to which 1 has been added, to the fourth AND gate 65 via the sixth AND gate 85 and the OR gate 86.

The fourth AND gate 65 feeds the parity-inverted, magnitude-reduced DCT coefficient from the magnitude reduction circuit 80 to the second AND gate 68 in response to the processing request signal REQ1. When the comparator 62 determines that the DCT coefficient received on the path RDATA is the DCT coefficient whose parity may be inverted, the magnitude-reduced, polarity-inverted DCT coefficient is fed from the magnitude reduction circuit 80 to the IDCT circuit 15 (FIG. 10A) in the manner described above with reference to FIG. 11. On the other hand, when the third embodiment of the parity inverter shown in FIG. 15 receives no processing request signal REQ1, the DCT coefficient whose parity may be inverted is fed to IDCT circuit 15 unchanged.

When the sum of the DCT coefficients is to be oddified, the third embodiment of the parity inverter 28 shown in FIG. 15 feeds to the IDCT circuit 15 the DCT coefficient whose parity has been inverted by subtracting one from it when its polarity is positive, and feeds to the IDCT circuit 15 the DCT coefficient whose parity has been be inverted by adding one to it when its polarity is zero or negative. This processing inverts the parity and reduces the magnitude of the DCT coefficient whose parity is inverted, and oddities the sum of the DCT coefficients.

A fourth embodiment of the parity inverter 28 will now be described with reference to FIGS. 16 and 17.

When the fourth embodiment of the parity inverter receives the processing request signal REQ1, it oddities the sum of the DCT coefficients in the block by replacing the DCT coefficient whose parity is to be inverted with the DCT coefficient whose parity is to be inverted to which one has added when the sign of the DCT coefficient is positive, and from which one has been subtracted when the sign of the DCT coefficient is negative. This processing not only inverts the parity of the DCT coefficient whose parity is inverted, but also increases the magnitude of this DCT coefficient, i.e., makes the DCT coefficient whose parity is inverted further from zero. The processing applied to the DCT coefficient whose parity is to be inverted is defined by the following equation:

$$\begin{aligned}&\text{if } (rec > 0)\\&rec = rec + 1\\&\text{if } (rec < 0)\\&rec = rec - 1\end{aligned} \quad (16)$$

where rec is the DCT coefficient whose parity is to be inverted.

Figure 16:
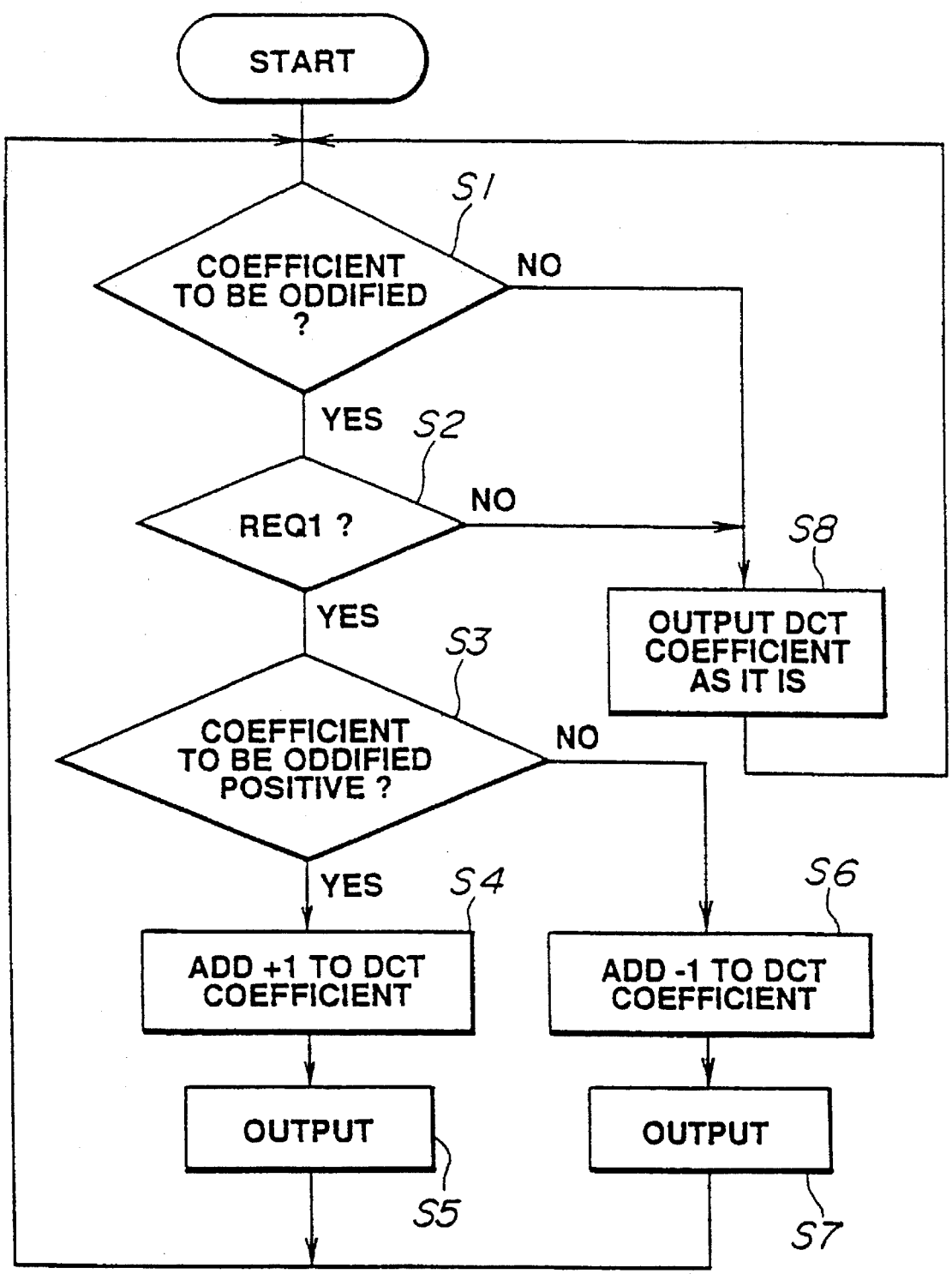
FIG. 16 is a flow chart for explaining the operation of a fourth embodiment of the above-mentioned parity inverter.

The fourth embodiment of the parity inverter 28 may be provided using a computer or digital signal processor operating in accordance with the flow chart shown in FIG. 16. At step S1, parity inverter 28 judges whether or not the DCT coefficient is the DCT coefficient whose parity may be inverted. For example, the parity inverter judges whether or not the DCT coefficient is the last non-zero DCT coefficient. If the result at step S1 is YES, and the DCT coefficient is the DCT coefficient whose parity may be inverted, execution proceeds to step S2. Otherwise, and the DCT coefficient is not the DCT coefficient whose parity may be inverted, execution proceeds to step S8.

At step S2, the parity inverter 28 determines whether or not the processing request signal REQ1 has been received. If the result at step S2 is YES, indicating that the processing request signal REQ1 has been received, execution proceeds to step S3. Otherwise, no processing request has been received, and execution proceeds to step S8. Since a YES result at step S2 can only occur if a YES result is obtained at step S1, the YES result at step S2 indicates that the DCT coefficient is the DCT coefficient whose parity is to be inverted.

At step S3, the parity inverter 28 determines the polarity of the DCT coefficient. If the result at step S3 is YES, indicating that the polarity of the DCT coefficient is positive, execution proceeds to step S4. Otherwise, the polarity of the DCT coefficient is zero or negative, and execution proceeds to step S6.

At step S4, the parity inverter 28 adds one to the DCT coefficient, after which execution passes to step S5, where the parity-inverted DCT coefficient is fed to the IDCT circuit 15 (FIG. 10A). Then, execution returns to step S1, where the next DCT coefficient is processed.

Otherwise, at step S6, the parity inverter 28 subtracts one from the DCT coefficient (i.e., adds −1 thereto), after which execution proceeds to step S7, where the parity-inverted DCT coefficient is fed to the IDCT circuit 15. Then, execution returns to step S1, where the next DCT coefficient is processed.

Execution passes to step S8 when the DCT coefficient is not the DCT coefficient whose parity may be inverted, or when the DCT coefficient whose parity may be inverted is not to have its parity inverted, i.e., when the processing request signal REQ1 has not been received. At step S8, the DCT coefficient is fed to the IDCT circuit 15 without modification. Then, execution returns to step S1, where the next DCT coefficient is processed.

Figure 17:
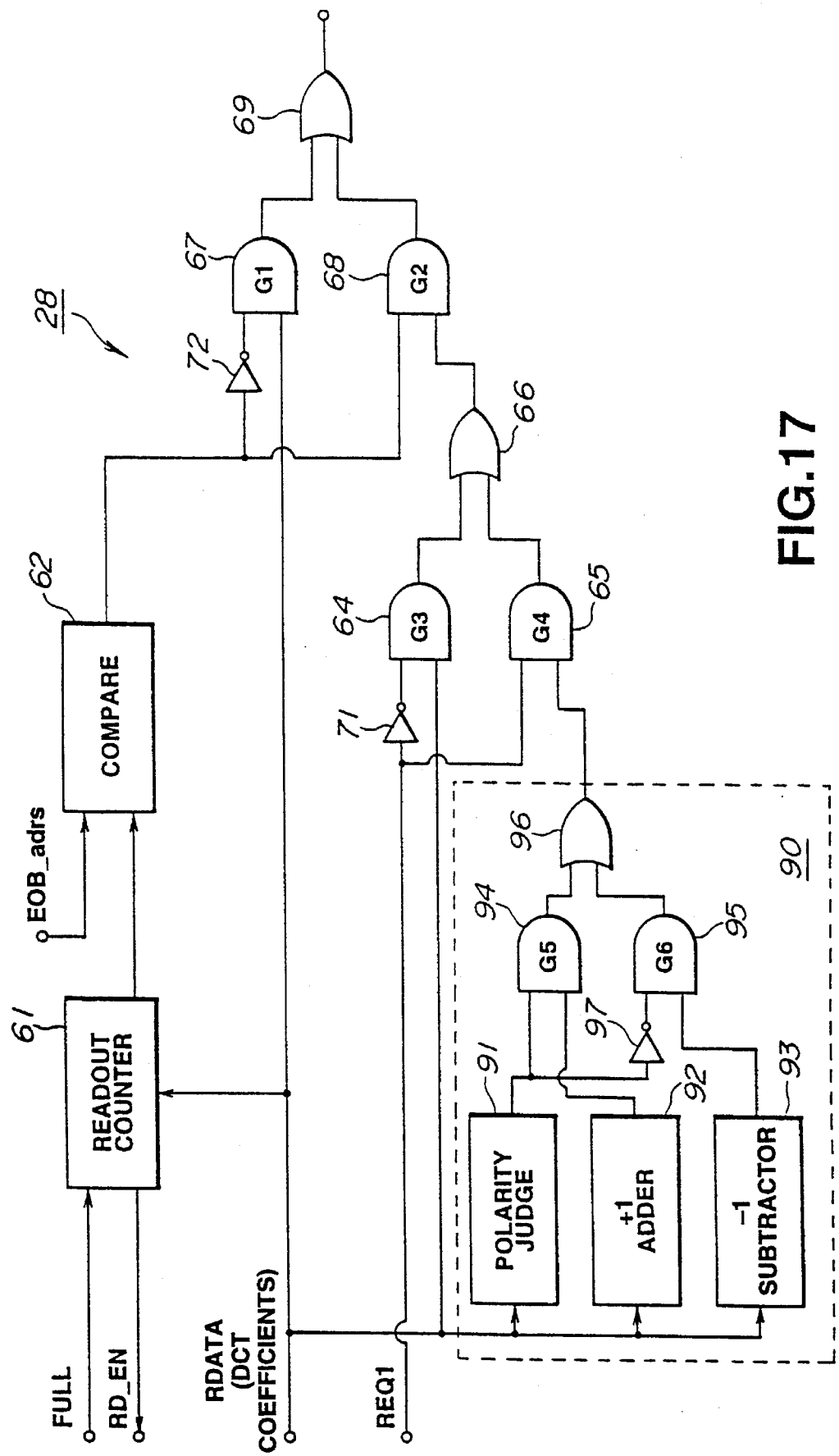
FIG. 17 is a block diagram of the fourth embodiment of the above-mentioned parity inverter.

FIG. 17 shows a practical example of the circuit configuration of the fourth embodiment of the parity inverter 28, in which the parity inversion is carried out to increase the magnitude of the DCT coefficient whose parity is inverted, i.e., to make the DCT coefficient whose parity is inverted further from zero.

The parity inverter shown in FIG. 17 is similar to the parity inverter 28 shown in FIG. 11. Elements in the circuit shown in FIG. 17 corresponding to those in the circuit shown in FIG. 11 are indicated by the same reference numerals, and will not be described again here. The parity inverter shown in FIG. 17 differs from the parity inverter shown in FIG. 11 in that it includes the magnitude increasing circuit 90 in lieu of the LSB inverter 63.

The magnitude increasing circuit 90 determines the polarity of each DCT coefficient received from the first memory 26 or the second memory 27, via the path RDATA. When the polarity of the DCT coefficient is positive, the magnitude increasing circuit adds one to the DCT coefficient, whereas, when the polarity of the DCT coefficient is zero or negative, it subtracts one from the DCT coefficient. The parity inverting circuit shown in FIG. 17 oddities the sum of the DCT coefficients in the block by selecting the DCT coefficient whose parity is to be inverted from the magnitude increasing circuit, and substituting the magnitude-increased DCT coefficient for the DCT coefficient whose parity is to be inverted.

The magnitude increasing circuit 90 comprises the polarity judgement circuit 91, which controls the fifth AND gate 94 directly, and the sixth AND gate 95 via the inverter 97. The magnitude increasing circuit 90 also includes the +1 adder 92 and the −1 subtractor 93 that respectively add one to and subtract one from each DCT coefficient. Either the output of the +1 adder 92 or the output of the −1 subtractor 93 is selected by the fifth AND gate 94 or the sixth AND gate 95 in response to the output of the polarity judgment circuit 91. The outputs of the AND gates 94 and 95 feed the OR gate 96, which provides the selected magnitude-increased DCT coefficient to the fourth AND gate 65. When the parity of the sum of the DCT coefficients in the block needs to be inverted, the fourth AND gate selects the parity-inverted, magnitude-increased output of the magnitude increasing circuit 90 for feeding to the IDCT circuit 15 in lieu of the DCT coefficient whose parity may be inverted.

The polarity judgment circuit 91 judges the polarity of each DCT coefficient in the block of DCT coefficients received via the path RDATA, and sets the state of its output to a one or a zero, depending upon whether the polarity of the DCT coefficient is positive or negative. When the polarity judgment circuit judges that the polarity of the DCT coefficient is positive, the output of the polarity judgment circuit opens the fifth AND gate 94 and closes the sixth AND gate circuit 95. This feeds the output of the +1 adder 92, i.e., the DCT coefficient to which one has been added, to the fourth AND gate 65 via the fifth AND gate 94, and the OR gate 96.

On the other hand, when the polarity judgment circuit 91 judges that the polarity of the DCT coefficient is negative or zero, the output of the polarity judgment circuit closes the fifth AND gate 94 and opens sixth AND gate 95. This feeds the output of the −1 subtractor 93, i.e., the DCT coefficient from which one has been subtracted, to the fourth AND gate 65 via the sixth AND gate 95 and the OR gate 96.

The fourth AND gate 65 feeds the parity-inverted, magnitude-increased DCT coefficient from the magnitude increasing circuit 90 to the second AND gate 68 in response to the processing request signal REQ1. When the comparator 62 determines that the DCT coefficient received on the path RDATA is the DCT coefficient whose parity may be inverted, the DCT coefficient is fed from the magnitude increasing circuit to the IDCT circuit 15 (FIG. 10A) in the manner described above with reference to FIG. 11. On the other hand, when the fourth embodiment of the parity inverter shown in FIG. 17 receives no processing request signal REQ1, the DCT coefficient whose parity may be inverted is fed to IDCT circuit 15 unchanged.

When the sum of the DCT coefficients is to be oddified, the fourth embodiment of the parity inverter 28 shown in FIG. 17 feeds to the IDCT circuit 15 the DCT coefficient whose parity has been inverted by adding one to it when its polarity is positive, and feeds to the IDCT circuit 15 the DCT coefficient whose parity has been inverted by subtracting one from it when its polarity is zero or negative. This processing inverts the parity and increases the magnitude of the DCT coefficient whose parity is inverted, and oddities the sum of the DCT coefficients.

The parity inverters 28 shown in FIGS. 11, 13, 15 and 17, and the parity inverters operating in accordance with the flow charts shown in FIGS. 9, 12, 14, and 16 may be modified to oddify the sum of the DCT coefficients by changing the parity of a DCT coefficient other than the last non-zero DCT coefficient read out by the zigzag scan. For example, in a two-dimensional 8×8 DCT transform, the parity of one of the DCT coefficient of the DC component, the DCT coefficient of the (7, 7) component, i.e., the highest-frequency component, the DCT coefficient of the (7, 0) component at the upper-right corner, or the DCT coefficient of the (0, 7) component at the lower-left corner may be changed. Since, in particular, the DCT coefficient of the (7, 7) component, which is the highest-frequency component, has a small influence on the picture quality, this component is particularly suitable for being the coefficient whose parity may be changed.

In the parity inverters shown in FIGS. 11, 13, 15, and 17, alternative DCT coefficients may be selected as the DCT coefficient whose parity may be changed by substituting the address of the DCT coefficient for the address EOB_adrs fed into the comparator 62. Alternatively, if the parity of the DCT coefficient of the highest-frequency component is to be changed, the readout counter 61 and the comparator 62 may be omitted, and the memory full signal FULL may be used to identify the DCT coefficient of the highest-frequency component as the DCT coefficient whose parity may be changed.

Figure 18:
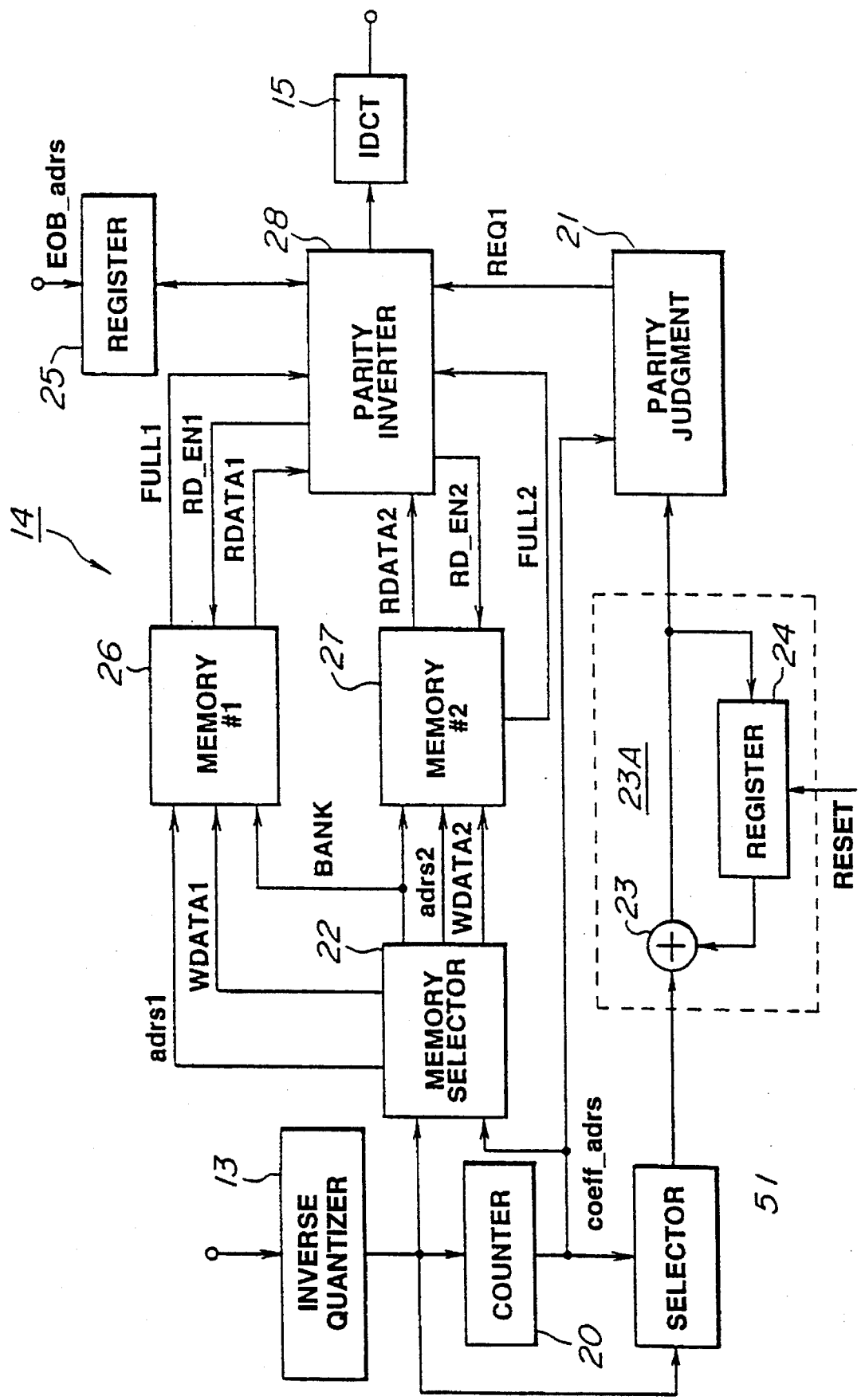
FIG. 18 is a block diagram of a third embodiment of the sum oddifying circuit shown in FIG. 6.

In a further alternative, the sum oddifying circuits 14 shown in FIGS. 6, 8, 10A, and 10B may determine the sum of specific DCT coefficients, for example, the DCT coefficients of the (0, 0) component, the (4, 0) component, the (0, 4) component and the (4, 4). Then, the sum oddifying circuit would carry out a parity inversion operation to make the sum of the specific DCT coefficients an odd number. FIG. 18 shows a variation on the sum oddifying circuit 14 shown in FIG. 8. In this, the sum of specific DCT coefficients is determined to determine whether parity inversion is necessary. Elements in the circuit shown in FIG. 18 corresponding to those in the circuit shown in FIG. 8 are indicated by the same reference numerals, and will not be described again here.

In the sum oddifying circuit shown in FIG. 18, the selector 51 interrupts the line between the inverse quantizer 13 and the accumulator 23A. The selector 51 also receives from the counter 20 the count value coeff_adrs, which indicates the number of DCT coefficients in the block that have been received from the inverse quantizer 13.

In response to the count value coeff_adrs received from counter 20, the selector 51 determines whether or not each DCT coefficient received from inverse quantizer 13 is one of the specific DCT coefficients, and is therefore to be included in the sum determined by the accumulator 23A. Thus, for example, the selector determines whether the count value coeff_adrs is a value corresponding to the (0, 0) component, the (4, 0) component, the (0, 4) component or the (4, 4) component. When the selector 51 determines that the DCT coefficient is one of the specific DCT coefficients, it delivers the DCT coefficient to the accumulator 23A. Accordingly, the sum oddifying circuit shown in FIG. 18 determines the sum of a set of specific DCT coefficients in the block, and, if the parity of the sum is even, changes the parity of at least one of the DCT coefficients to make the sum an odd number. The sum oddifying circuit shown in FIG. 18 then feeds the block of parity-adjusted DCT coefficients to the IDCT circuit 15.

The embodiment shown in FIG. 18 may be modified in a manner similar to that shown in FIG. 10A to enable the circuit to determine the exclusive logical sum of the LSBs of the specific DCT coefficients. The circuit in FIG. 18 is modified by replacing the adder 23 by the LSB detector 29 and the exclusive-OR gate 30 shown in FIG. 10A.

The embodiment shown in FIG. 18 may also be modified in a manner similar to that shown in FIG. 10B to enable the circuit to count the number of DCT coefficients in the block having an LSB of one. The circuit in FIG. 18 is modified by replacing the adder 23 and register 24 by the LSB detector 29, the gate 88 and the counter 89 shown in FIG. 10B.

Returning now to FIG. 6, the DCT coefficients in the block of DCT coefficients are fed from the sum oddifying circuit 14 to the IDCT circuit 15, described above. The sum of the DCT coefficients from the sum oddifying circuit is an odd number. If the sum of the DCT coefficients from the inverse quantizer 13 was an even number, the sum oddifying circuit 14 changed the parity of at least one of the DCT coefficients to oddify the sum of the DCT coefficients fed to the IDCT circuit 15. The IDCT circuit 15 applies IDCT processing to the DCT coefficients in the block to provide the recovered difference block S4. The recovered difference block is fed to the adder 16.

The adder 16 performs pixel-by-pixel addition between the recovered difference block S4 and the matching block S2 received from second picture memory group 4. The resulting reconstructed picture block S5 is fed to the picture memory group 4, where it provides a block of the reconstructed picture stored in the one of the picture memories specified by the memory controller 3.

The variable-length coder 17 applies variable-length coding, such as Huffmann coding, etc., to each block of quantized DCT coefficients SC from the difference block encoder 9, and its motion vector MV, prediction mode MM, quantizing table data, etc. The variable-length coder also assembles the variable-length coded data with the start codes and header information of the respective layers of the MPEG standard to form the compressed motion picture signal.

The slice/macro block counter 5 counts the slice start signals SS and the macroblock start signals BS generated by the memory controller 3 in synchronism with the start of each slice and each macroblock of the pictures read out from the first picture memory group 2 for processing. When the count value of the slice/macro block counter 5 reaches a predetermined value, the slice/macro block counter 5 generates the start signal SO, which is fed to the variable-length coder 17.

In response to the start signal, the variable-length coder 17 feeds the compressed motion picture signal to the output buffer 19, where it is temporarily stored. Then, the compressed motion picture signal is read out of the output buffer as a bit stream with a predetermined bit rate. The bit stream of the compressed motion picture signal may be recorded on a suitable recording medium, such as an optical disc. Alternatively, the bit stream of the compressed motion picture signal may be distributed by a transmission system such as terrestrial or satellite broadcasting, a telephone system, an ISDN system, a cable or optical distribution system, etc.

The recording medium is a recording medium on which there is recorded the compressed motion picture signal derived from the motion picture signal by prediction coding and discrete cosine transform processing. The blocks of the reconstructed pictures used as reference pictures in the prediction coding applied to the motion picture signal, prior to recording a recording signal derived from the compressed motion picture signal on the recording medium, are reconstructed by inversely quantizing blocks of the quantized DCT coefficients included in the compressed motion picture signal. The sum of the DCT coefficients in each resulting block of DCT coefficients is oddified, and the sum-oddified block of DCT coefficients is inversely orthogonally transformed to provide a block of a reconstructed picture.

It may be thought that it would be better to carry out the sum oddifying operation in the difference block encoder 9 in the compressor. The sum oddifying operation would cause the sum of the DCT coefficients in each block of quantized DCT coefficients included in the compressed motion picture signal to be an odd number. Processing the compressed motion picture signal in this way would make it unnecessary to oddify the sum of the DCT coefficients in the expander or in the local decoder in the compressor. However, with such an arrangement, after the sum-oddified block of DCT coefficients has been quantized in the compressor, and inversely quantized in the expander, the sum of the DCT coefficients in the block of DCT coefficients entering the IDCT circuit in the expander is no longer necessarily an odd number. Hence, sum oddification processing must be carried out prior to the IDCT processing in the expander and in the local decoder in the compressor to ensure that a mismatch error will not occur.

Figure 19:
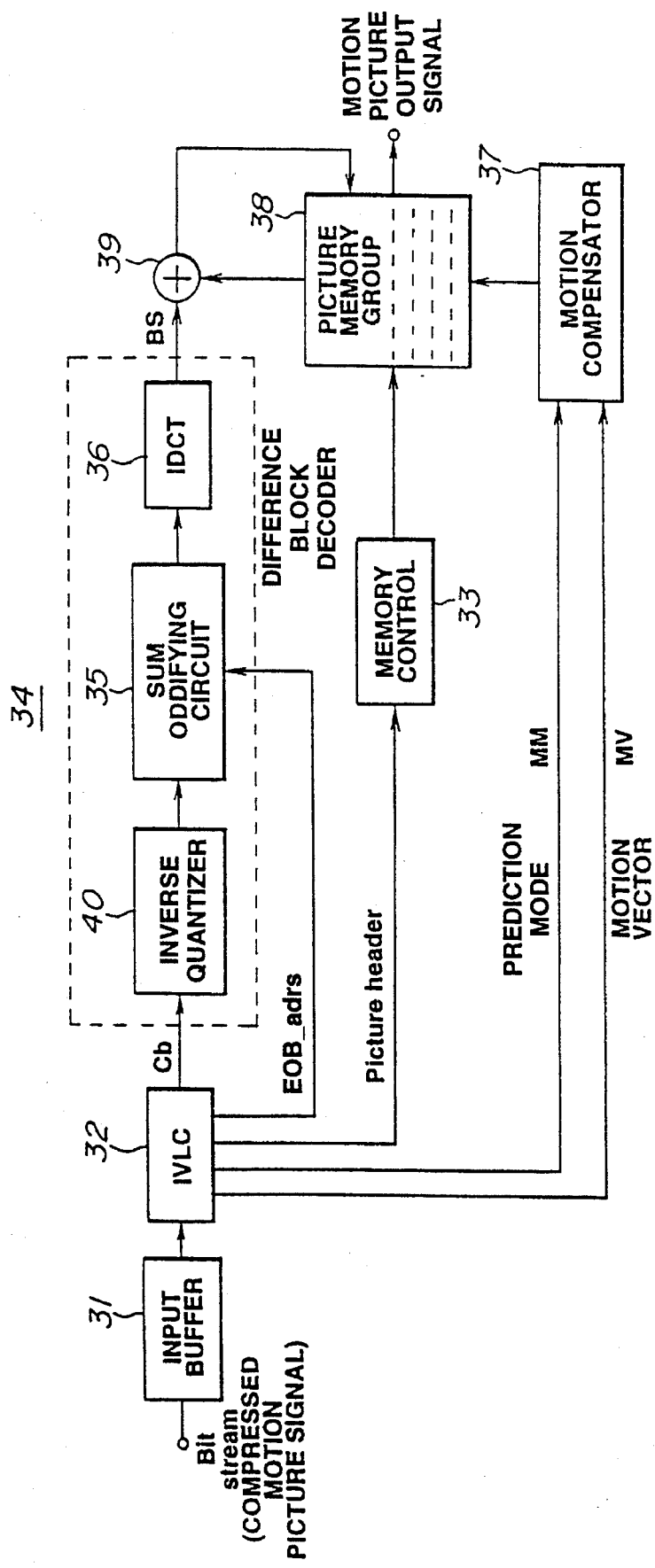
FIG. 19 is a block diagram showing the configuration of the first embodiment of a compressed motion picture expander apparatus according to the invention.

A compressed motion picture signal expander to which the invention is applied will now be described with reference to FIG. 19. In FIG. 19, the compressed motion picture signal is received as a bit stream. The compressed motion picture signal may originate from a transmission medium or may be reproduced from a suitable recording medium, such as an optical disc. The bit stream is fed into the input buffer 31, where it is temporarily stored, and whence it is read out, picture-by-picture, into the inverse variable-length coder (the "IVLC") 32. The inverse variable-length coder 32 extracts from the compressed motion picture signal the header information of respective layers of the MPEG coding, and from the header information, extracts the picture decoding control information PH, which it feeds to the memory controller 33.

The IVLC 32 applies inverse variable-length coding to the blocks of variable-length coded DCT coefficients to provide blocks of quantized DCT coefficients including the current block of quantized DCT coefficients Cb. The block of quantized DCT coefficients Cb is delivered to the difference block decoder 34. The difference block decoder 34 decodes the block of quantized DCT coefficients Cb to provide the restored difference block BS, and feeds the restored difference block to the adder 39.

The IVLC 32 also extracts from the compressed motion picture signal the motion vector MV and the prediction mode MM for the block of quantized DCT coefficients Cb, and feeds them to the motion compensator 37. The motion compensator 37 causes the picture memory group 38 to read out a matching block for the restored difference block BS.

The picture memory block 38 includes several picture memories, each of which stores one already-reconstructed picture. The matching block BS is a block of the reconstructed picture stored in one of the picture memories at the address specified by the motion vector MV. The picture memory in the picture memory group 38 storing the reconstructed picture from which the matching block is read is specified by the memory controller 33.

As mentioned above, a picture can be coded by prediction coding using, as a reference picture, a prior reconstructed picture, a following reconstructed picture, or a block obtained by performing a pixel-by-pixel linear operation on a prior reconstructed picture and a following reconstructed picture. Finally, a picture may be coded using no prediction at all. In this case, the matching block provided by the picture memory group 38 is a zero block, i.e., a block in which all the pixel values are set to zero. The motion-compensated matching blocks provided by the picture memory group 38 are adaptively modified, and the optimum one is selected for each block. This process is carried out using a macroblock having a block size of 16×16 pixels.

The matching block provided by the picture memory group 38 is fed to the adder 39. The adder 39 performs a pixel-by-pixel addition between the restored difference block BS received from the difference block decoder 34, and the matching block provided by the picture memory group 38. The result of this addition is a reconstructed picture block, which is stored in the one of the picture memories in the picture memory group 38 specified by the memory controller 33. The reconstructed picture blocks produced by the adder 39 are stored one-by-one in the selected picture memory, overwriting the reconstructed picture previously stored in the picture memory, to form a new reconstructed picture. The new reconstructed picture will be used as a reference picture for prediction decoding other pictures of the motion picture signal.

The reconstructed pictures stored in the picture memory group 38 are read out in a sequence controlled by an output picture indication signal provided by the memory controller 33. The read out pictures are fed, as the motion picture output signal, to a suitable picture display, e.g., a video monitor. The picture display displays a motion picture in response to the motion picture output signal.

The difference block decoder 34 will now be described with reference to FIG. 19. The difference block decoder 34 comprises the inverse quantizer 40, the sum oddifying circuit 35, and the inverse discrete cosine transform circuit 36. The inverse quantizer 40 uses a quantizing table to inversely quantize the block of quantized transform coefficients Cb received from the inverse variable-length coder 32. The sum oddifying circuit 35 receives the resulting block of DCT coefficients from the inverse quantizer 40, and prevents mismatch errors from occurring in the IDCT processing by the IDCT circuit 36. The IDCT circuit 36 applies IDCT processing to the block of sum-oddified DCT coefficients from the sum oddifying circuit 35.

Figure 20:
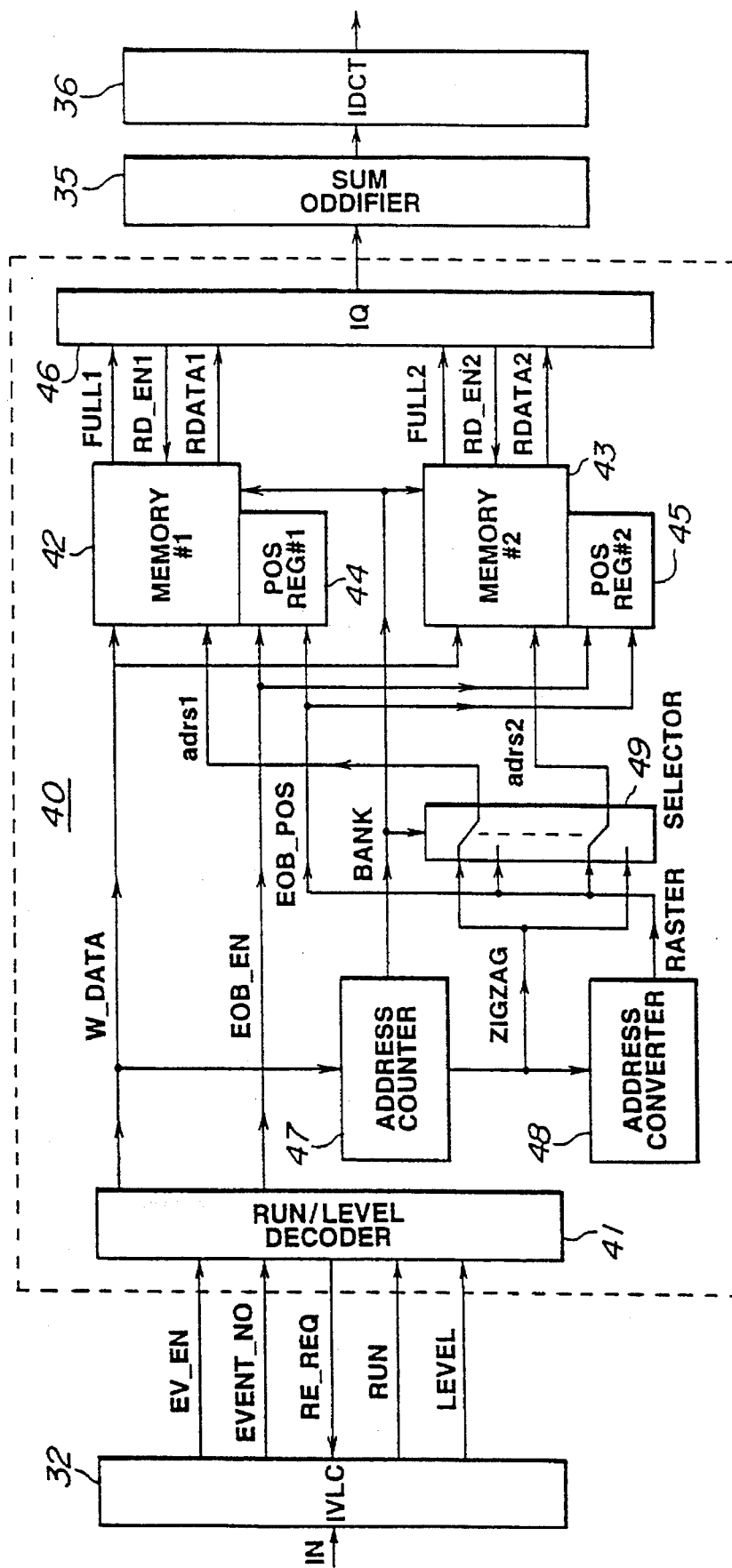
FIG. 20 is a block diagram of the inverse quantizer and sum oddifier in the compressed motion picture signal expander apparatus shown in FIG. 19.

FIG. 20 shows an example of the construction of the inverse quantizer 40. The main components of the inverse quantizer 40 are the run/level decoder 41, the address counter 47, the address converter 48, the selector 49, the first block memory 42, the second block memory 43, and the inverse quantizing circuit (the "IQ circuit") 46.

The run/level decoder 41 receives the block of quantized DCT coefficients Cb from the inverse variable-length coder 32. The run/level decoder decodes the run/level coding that was applied to the quantized DCT coefficients in the variable-length coder 17 in the motion picture signal compressor (FIG. 6). The resulting block of quantized DCT coefficients are fed to the first block memory 42 or to the second block memory 43 in zigzag scan order. The first block memory 42 and the second block memory 43 each store one block of quantized DCT coefficients.

The address counter 47 and the address converter 48 respectively generate write addresses and the read addresses for the first block memory 42 and the second block memory 43. Blocks of quantized DCT coefficients are alternately written into and read out of the first block memory and the second block memory. Each block of quantized DCT coefficients is written into one of the block memories in zigzag scan order in response to the addresses provided by the address counter 47. Each block of DCT coefficients is then read out of the block memory in raster scan order in response to the addresses provided by the address converter 48. The different order of the addresses between writing and reading converts the order of the quantized DCT coefficients in the block from zigzag scan order to raster scan order.

The address counter generates 47 the writing addresses in zigzag scan order. The address converter 48 receives the addresses in zigzag scan order from the address counter and uses an address conversion table to convert the addresses to addresses in raster scan order. In response to the bank select signal BANK, the selector 49 selects the addresses generated by the address counter 47 and the address converter 48 for feeding to the first block memory 42 and the second block memory 43 as the addresses adrs1 and adrs2. When a block of quantized DCT coefficients from the run/level decoder 41 is written into the first block memory 42 or the second block memory 43, the respective addresses adrs1 and adrs2 are provided by the address counter 47 via the selector 49 in zigzag scan order. When the block of quantized DCT coefficients is read out from the first block memory 42 or the second block memory 43 to the inverse quantizer 46, the respective addresses adrs1 and adrs2 are provided by the address converter 48 via the selector 49 in raster scan order.

When all the quantized DCT coefficients in the block have been stored in the first block memory 42 or the second block memory 43, the block of DCT coefficients is read out in raster scan order to the inverse quantizer (the "IQ") 46. The IQ 46 inversely quantizes the quantized DCT coefficients in the block, and feeds the resulting block of DCT coefficients to the sum oddifying circuit 35. The inverse quantizing performed by the IQ 46 is the same as the inverse quantizing performed by the inverse quantizer 13 in the local decoder in the motion picture signal compressor shown in FIG. 6.

When the sum oddifying circuit 35 determines that the parity of the sum of the DCT coefficients in the block of DCT coefficients from the inverse quantizer 40 is even, it operates on at least one DCT coefficient in the block to make the sum of the DCT coefficients in the block an odd number. The sum oddifying circuit 35 feeds the block of sum-oddified DCT coefficients to the IDCT circuit 36. The sum oddifying operation performed by the sum oddifying circuit 35 is the same as the sum oddifying operation performed by the sum oddifying circuit 14 in the local decoder in the motion picture signal compressor shown in FIG. 6.

The IDCT circuit 36 performs IDCT processing on the block of sum-oddified DCT coefficients to provide the restored difference block BS, which is fed to the adder 39.

The practical operation of the inverse quantizer 40 shown in FIG. 20 is illustrated by the timing chart shown in FIGS. 21A through 21I. The inverse variable-length coder 32 extracts blocks of quantized DCT coefficients from the compressed motion picture signal, including the current block of quantized DCT coefficients Cb. The inverse variable-length coder generates the event enable signal EV__EN, shown in FIG. 21A, which instructs the run/level decoder 41 to read the block of quantized DCT coefficients. The quantized DCT coefficients in the block of quantized DCT coefficients Cb are run/level coded.

Figure 21:
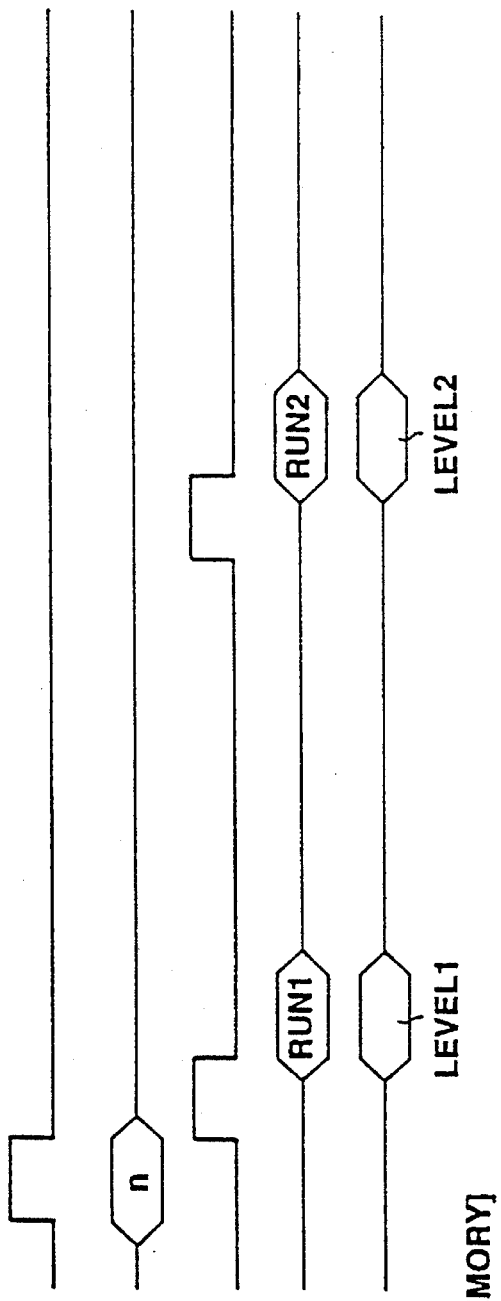
FIG. 21 is a timing chart explaining the operation of the above-mentioned inverse quantizer and sum oddifier.

The IVLC 32 also provides the event number signal EVENT__NO to the run/level decoder 41, as shown in FIG. 21B. The event number signal indicates the number of run/level pairs in the block of quantized DCT coefficients Cb, i.e., the number of pairs of data indicating run and level.

When the run/level decoder 41 receives the event number signal EVENT__NO, it feeds a readout request signal RE__REQ for each run/level pair back to the inverse variable-length coder 32, as shown in FIG. 21C. Each time it receives the readout request signal RE__REQ, the inverse variable-length coder 32 feeds one run/level pair to the run/level decoder 41, as shown in FIGS. 21D and 21E. Thus, the IVLC 32 feeds to the run/level decoder 41 the number of run/level pairs corresponding to the number of readout request signals it receives.

The run/level decoder 41 decodes the run/level coding of the run/level coded quantized DCT coefficients to deliver a block of quantized DCT coefficients in zigzag scan order as WDATA to the first block memory 42, as shown in FIG. 21G. At the same time, as shown in FIG. 21F, the address counter 47 counts the quantized DCT coefficients from the run/length decoder and feeds the address signal adrs1 in zigzag scan order, indicating the write address of each quantized DCT coefficient, via the selector 49 to the first block memory 42.

When the run/level decoder 41 receives the EOB code from the IVLC 32, indicating that it has received the last non-zero DCT coefficient, the run/level decoder sets the quantized DCT coefficient corresponding to the EOB code, and all the following quantized DCT coefficients, to zero, and feeds these zero DCT coefficients into the first block memory 42.

Also when it receives the EOB code, the run/level decoder 41 feeds the signal EOB__EN to the position registers (POS REG) 44 and 45, as shown in FIG. 21H. The EOB__EN signal indicates to the position registers that the EOB code has been received. The position registers also receive, from the address counter 47 via the address converter 48, the address of each quantized DCT coefficient fed to the first and second block memories 42 and 43. When the run/level decoder receives the EOB code, the address generated by the address counter 47 is the address of the last non-zero coefficient. The EOB__EN signal causes the address, EOB__POS, of the last non-zero coefficient, convened to a raster scan address by the converter 48, to be written into the position register of the block memory into which the block of quantized DCT coefficients is being written. Thus, the POS register 44 stores the address of the last non-zero coefficient of the block of quantized DCT coefficients.

When the run/level decoder 41 has fed the complete block of quantized DCT coefficients into the first block memory 42, the address counter 47 feeds the bank switching signal BANK to the first block memory 42 and the second block memory 43. The BANK signal switches over the mode of the block memories, so that the first block memory, which formerly was in write mode, is switched to read mode, and the second block memory is switched to write mode. Thus, when the run/level decoder 41 decodes the next block of quantized DCT coefficients, the resulting quantized DCT coefficients will be written into the second block memory 43. The BANK signal also switches over the selector 49, so that the addresses fed to the block memory in write mode are the addresses in zigzag scan order from the address counter 47, whereas the addresses fed to the block memory in read mode are the addresses in raster scan order from the address converter 48.

Also, when the run/level decoder 41 has fed the complete block of quantized DCT coefficients into the first block memory 42, the first block memory 42 feeds the memory full signal FULL1 to the inverse quantizer 46. The memory full signal indicates that all the quantized DCT coefficients in the block have been stored. When the IQ 46 receives the memory full signal FULL1, it sends the readout request signal RD__EN to the first block memory 42. The readout request signal causes the first block memory to read out the quantized DCT coefficients stored therein in response to the addresses adrs1 provided in raster scan order by the address converter 48 via the selector 49. Consequently, the quantized DCT coefficients in the block are read out of the first block memory 42. The DCT coefficient read out in response to each address is fed into the inverse quantizer 46.

At the same time as the quantized DCT coefficients in the block are read from the first block memory 42, the quantized DCT coefficients in the next block are written in zigzag scan order into the second block memory 43 in response to addresses from the address counter 47 via the selector 49.

The inverse quantizer 46 inversely quantizes the quantized DCT coefficients in the block a manner similar to the inverse quantizer 13 in the motion picture signal compressor described above with reference to FIG. 6. The resulting block of DCT coefficients is fed to the sum oddifying circuit 35.

When the parity of the sum of the DCT coefficients in the block is an even number, the sum oddifying circuit 35 operates on at least one of the DCT coefficients in the block to oddify the sum of the DCT coefficients in the block in a manner similar to the sum oddifying circuit 14 in the motion picture signal compressor described above. The resulting block of sum-oddified DCT coefficients is fed to the IDCT circuit 36.

For example, the sum oddifying circuit 35 may refer to the POS registers 44 and 45 to determine whether or not the current DCT coefficient is the last non-zero coefficient in zigzag scan order so that the sum oddifying circuit can change the parity of the last non-zero DCT coefficient to oddify the sum of the DCT coefficients in the block. Alternatively, the sum oddifying circuits 35 may operate on the DCT coefficient of the highest-frequency component to oddify the sum of the DCT coefficients. Inverting the parity of the DCT coefficient of the highest-frequency component is preferable because the highest-frequency component has a small influence on the picture quality, and there is no necessity to determine which of the DCT coefficients is the last non-zero coefficient. This is also true in the case when the scan order is other than zigzag scan order.

It must be stressed that, to avoid mismatch errors, the sum oddifying operations carried out in the motion picture signal compressor and in the compressed motion picture signal expander must be identical to one another.

2. SECOND EMBODIMENT

Figure 22:
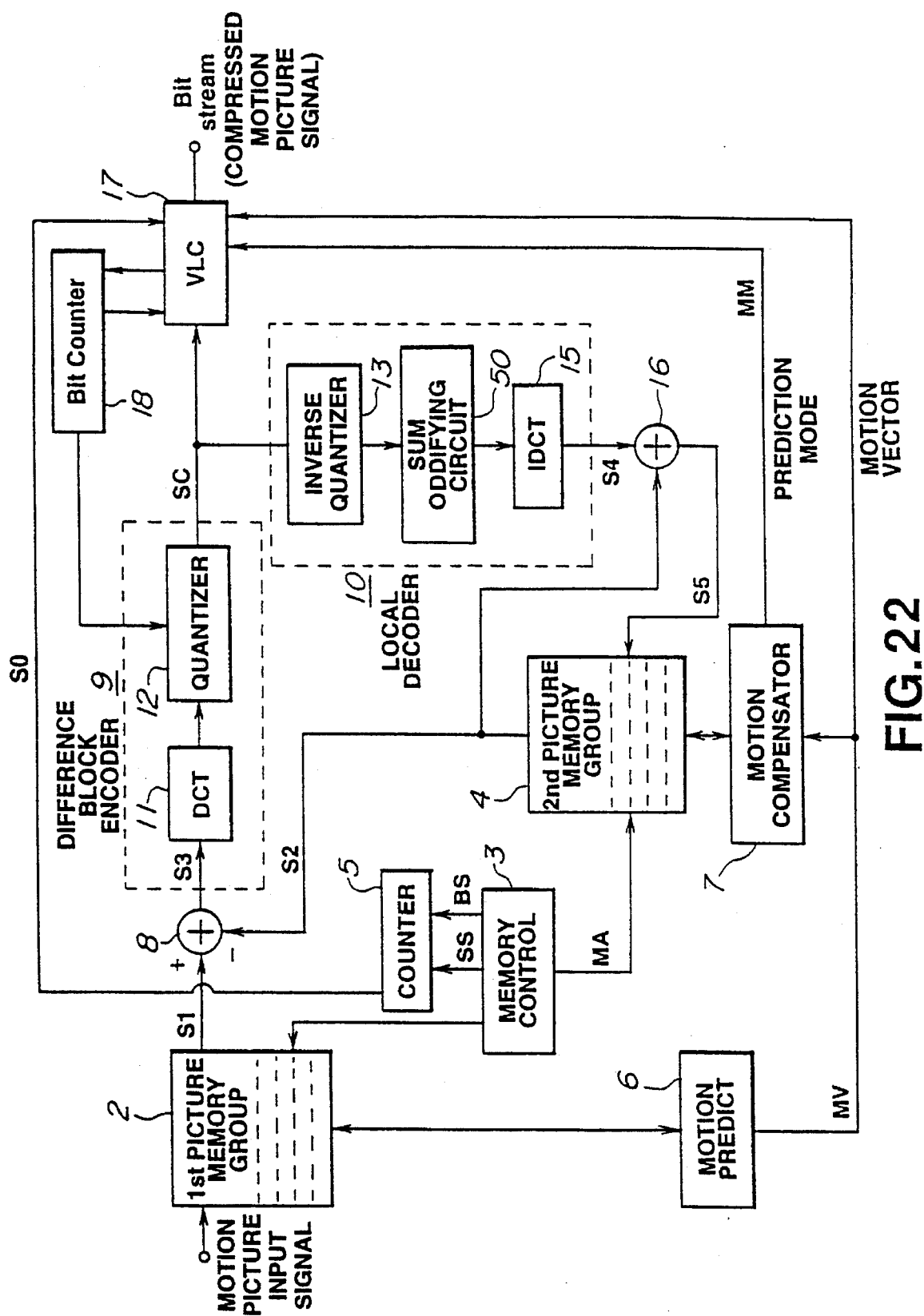
FIG. 22 is a block diagram showing the configuration of a second embodiment of the motion picture signal compressor apparatus according to the invention.
Figure 23:
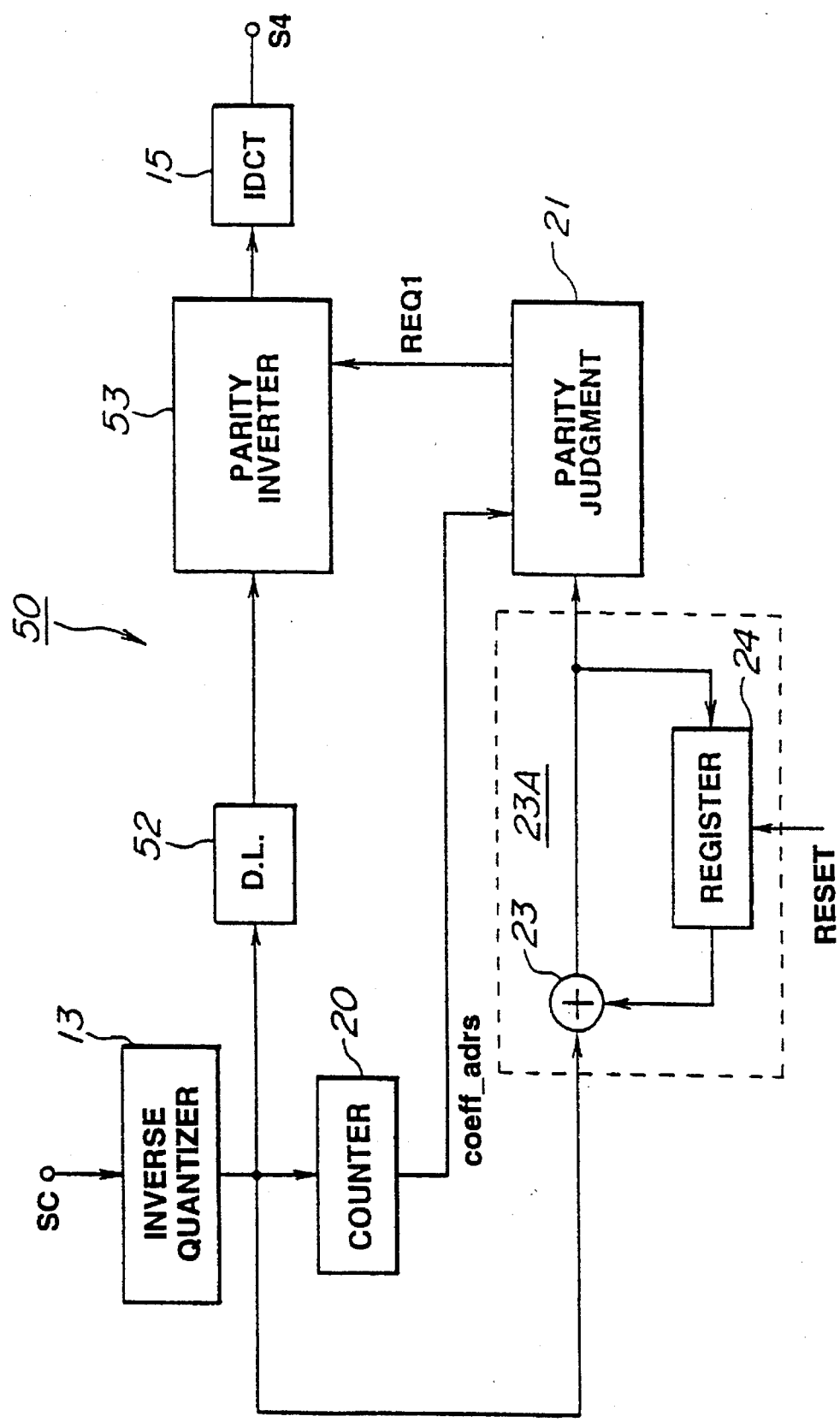
FIG. 23 is a block diagram showing a first embodiment of the sum oddifying circuit in the second embodiment of the motion picture signal compressor apparatus shown in FIG. 22.

The configuration of a second embodiment of a motion picture signal compressor is shown in FIG. 22. The second embodiment is the preferred embodiment of the invention. The configuration of the sum oddifying circuit 50 of the motion picture signal compressor shown in FIG. 22 is shown in FIG. 23. Elements of the second embodiment of the motion picture signal compressor corresponding to those in the first embodiment of the motion picture signal compressor shown in FIG. 6 are indicated by the same reference numerals, and will not be described again here. The second embodiment differs from the first embodiment in the configuration of the sum oddifying circuit 50.

In the sum oddifying circuit 50 shown in detail in FIG. 23, the counter 20 counts the number of DCT coefficients received from the inverse quantizer 13, and feeds the resulting count value coeff_adrs to the parity judgment circuit 21.

The accumulator 23A comprises the adder 23 and the register 24. The adder 23 adds each DCT coefficient in the block of DCT coefficients received from the inverse quantizer 13 to the sum of the already-received DCT coefficients in the block stored in the register 24. The register 24 is reset alter the sum has been determined for each block of DCT coefficients. The resulting sum of the DCT coefficients is fed from the adder 23 to the register 24, and to the parity judgment circuit 21. The accumulator 23A needs only sum the least significant bits of the DCT coefficients in the block to provide a result suitable for the parity judgment circuit to judge whether the parity of the sum of the DCT coefficients is odd or even.

The parity judgment circuit 21 receives the count value coeff_adrs from the counter 20. When the count value indicates that the accumulator 23A has summed all the DCT coefficients in the block, the parity judgment circuit 21 determines whether the parity of the sum of the DCT coefficients received from the accumulator 23A is odd or even. For example, in the case of a two-dimensional 8×8 DCT transform, when the count value indicates that the accumulator 23A has determined the sum of the 64 DCT coefficients in the block, the parity judgment circuit 21 determines whether the parity of the sum of the DCT coefficients received from the accumulator is odd or even.

In practice, when the DCT coefficients are represented by binary numbers, the parity judgment circuit 21 examines the least-significant bit (LSB) of the sum of the DCT coefficients received from the accumulator 23A. An LSB of zero indicates that the parity of the sum is even. In this case, the parity judgment circuit 21 feeds the processing request signal REQ1 to the parity inverter 53 to cause the parity inverter to carry out a parity inversion operation.

In response to the processing request signal REQ1, the parity inverter 53 inverts the parity of one of the DCT coefficients in the block to oddify the sum of the DCT coefficients. The parity inverter 53 may invert the parity of more than one (i.e., an odd number) of the DCT coefficients in the block to oddify the sum of the DCT coefficients. However, it is only necessary to invert the parity of one DCT coefficient. On the other hand, an LSB of one indicates that the parity of the sum is odd. In this case, the parity judgment circuit 53 does not provide the processing request signal REQ1, and the parity inverter 53 leaves the parity of all the DCT coefficients in the block unchanged, because the parity of the sum of the DCT coefficients is already odd.

The block of DCT coefficients is fed from the inverse quantizer 13 not only to the accumulator 23A, but also to the parity inverter 53 via the delay circuit 52. The delay circuit 52 delays the DCT coefficients in the block by a time corresponding to the processing times of the accumulator 23A and the parity judgment circuit 21, such that the last DCT coefficient, i.e., the DCT coefficient of the highest-frequency component (e.g., the DCT coefficient of the (7, 7) component in an 8×8 DCT transform) arrives at the parity inverter 53 at the same time as the processing request signal.

Thus, the parity inverter 53 feeds all the DCT coefficients except for the DCT coefficient of the highest-frequency component to the IDCT circuit 15 unchanged. When the parity judgment circuit 21 has not generated the processing request signal REQ1, the parity inverter 53 also feeds the DCT coefficient of the highest-frequency component to the IDCT circuit unchanged. Only when the parity judgment circuit 21 has generated the processing request signal REQ1 does the parity inverter 53 invert the LSB of the DCT coefficient of the highest-frequency component, and feed the parity-inverted DCT coefficient of the highest-frequency component to the IDCT circuit 15.

Thus, when the parity judgment circuit 21 indicates that the parity of the sum of the DCT coefficients in the block is even, the parity inverter 53 operates on the DCT coefficient of the highest-frequency component (e.g., the DCT coefficient of the (7, 7) component in an 8×8 DCT transform)in the block. The parity inverter inverts the parity of the highest-frequency DCT component, and hence oddities the sum of the DCT coefficients in the block of DCT coefficients fed to the IDCT circuit 15. Thus, the parity of the sum of the DCT coefficients in the block of DCT coefficients is always odd. The DCT coefficient of the (7, 7) component is the DCT coefficient that has the least influence on the output values of the IDCT.

Further practical examples of the sum oddifying circuit 50 of the preferred embodiment of the invention will now be described.

Figure 24:
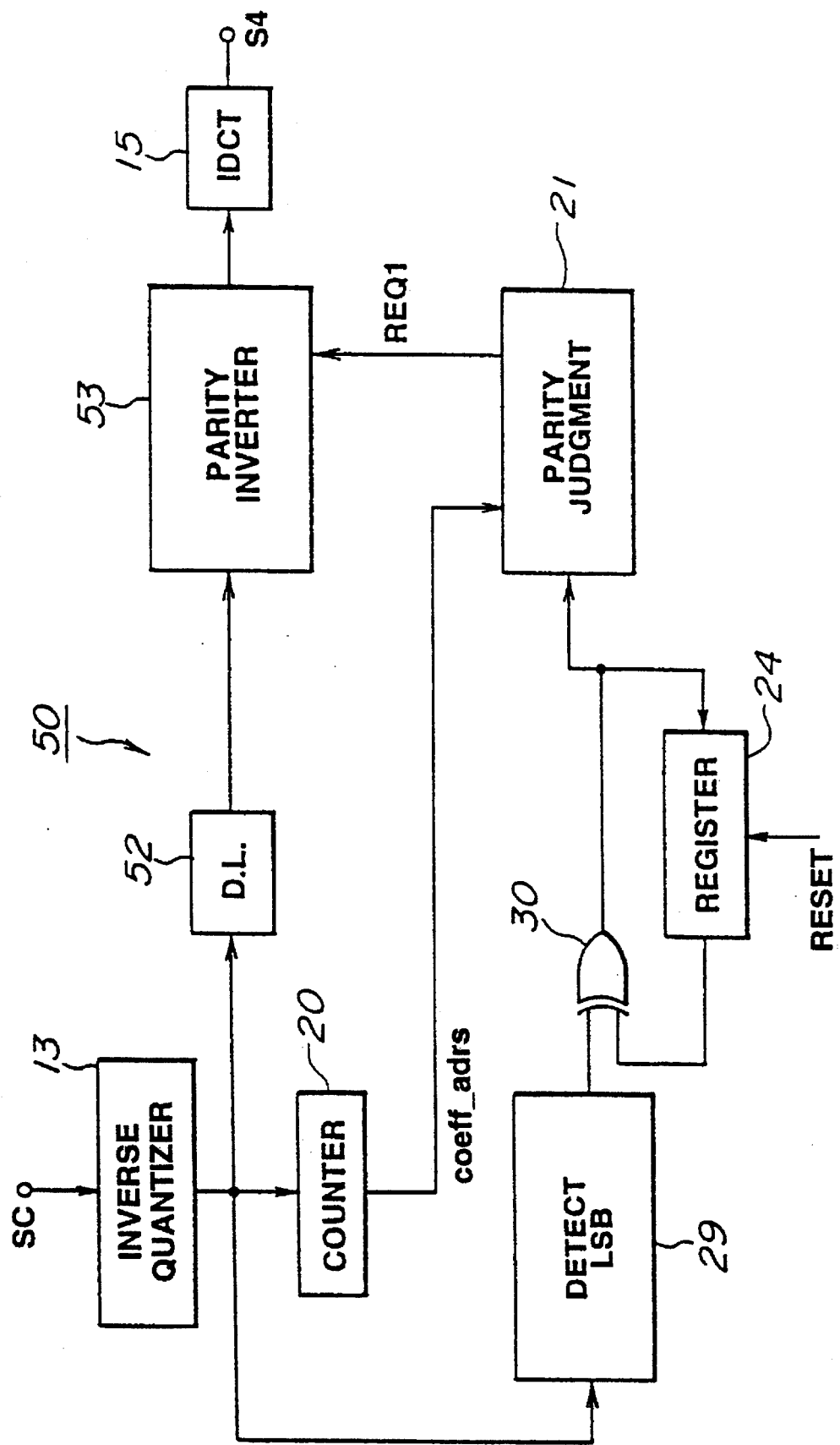
FIG. 24 is a block diagram showing a second embodiment of the sum oddifying circuit in the second embodiment of the motion picture signal compressor apparatus shown in FIG. 22.

FIG. 24 shows an example in which the LSB detector 29 and the exclusive OR (EXOR) gate 30 are substituted for the adder 23 in FIG. 23. Elements in the circuit shown in FIG. 24 corresponding to those in the circuit shown in FIG. 23 are indicated by the same reference numerals, and will not be described again here.

In the circuit shown in FIG. 24, the LSB detector detects the LSB of each DCT coefficient in the block, and the EXOR circuit 30 and the register 24 together determine the exclusive logical sum of the LSBs of the DCT coefficients in the block. The parity of the exclusive logical sum is determined by the parity judgment circuit 21, as described above with reference to FIGS. 10A and 23. The circuit shown in FIG. 23 can also be amended in the way shown in FIG. 10B so that the number of DCT coefficients having a least-significant bit of one are counted, and the parity judgment circuit determines the parity of the count.

Alternatively, the AND gate 88 and counter 89 shown in FIG. 10B can be substituted for the exclusive-OR gate 30 and the register 24 shown in FIG. 24.

Figure 25:
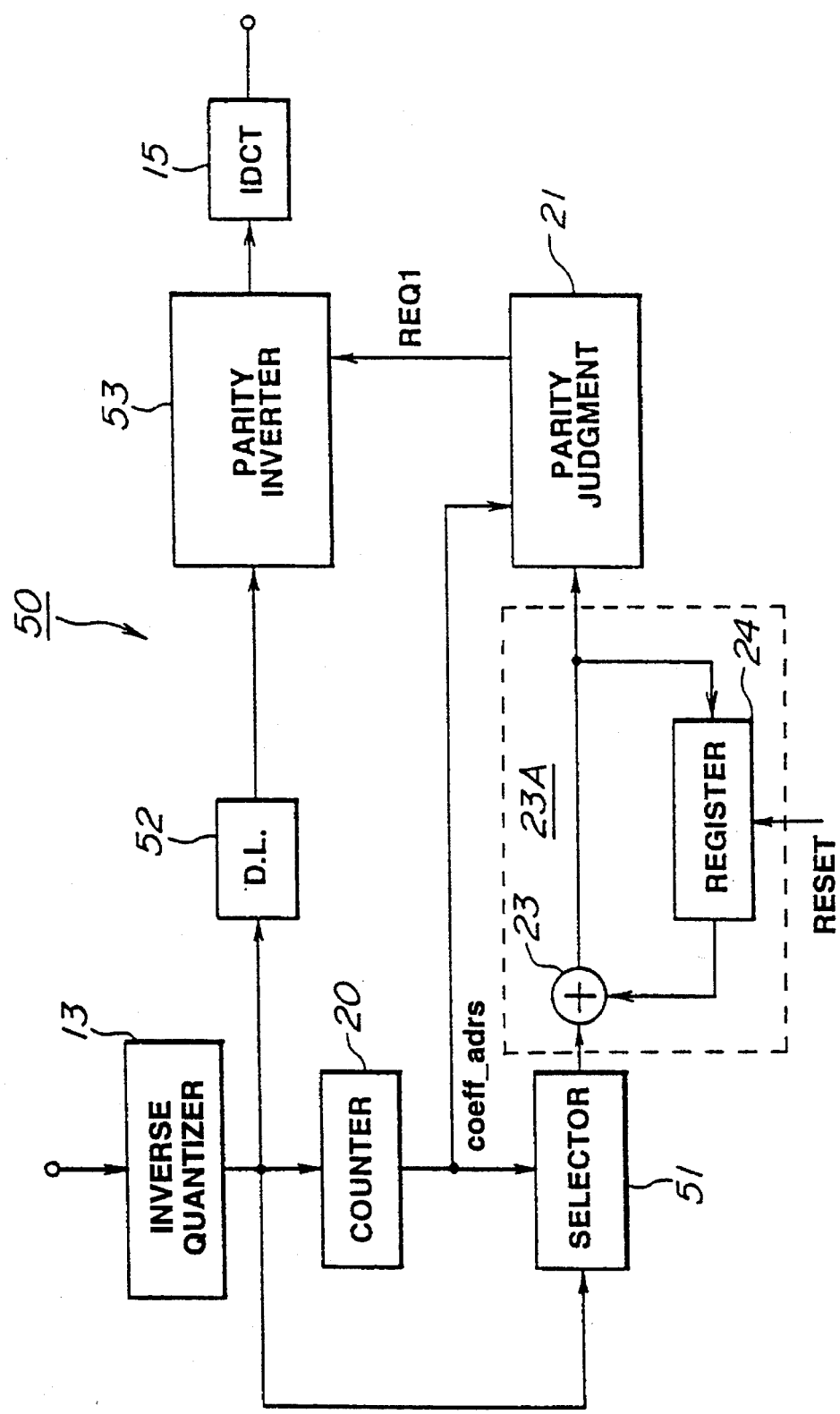
FIG. 25 is a block diagram showing a third embodiment of the sum oddifying circuit in the second embodiment of the motion picture signal compressor apparatus shown in FIG. 22.

Another example is shown in FIG. 25. In this, the selector 51 is inserted between the inverse quantizer 13 and the accumulator 23A in the sum oddifying circuit 50 shown in FIG. 23. Elements in the circuit shown in FIG. 25 corresponding to those in the circuit shown in FIG. 23 are indicated by the same reference numerals, and will not be described again here.

The circuit shown in FIG. 25 determines the sum of the DCT coefficients of only specific components, e.g., the (0, 0) component, the (4, 0) component, the (0, 4) component, and the (4, 4) component, to determine whether sum oddifying is required. The selector 51 receives the count value coeff__adrs from the counter 20 to determine whether or not each DCT coefficient received from the inverse quantizer 13 is one of the specific coefficients, and is therefore to be summed. When the selector determines that the DCT coefficient is one of the specific coefficients and is to be summed, i.e., the count value coeff__adrs has a value corresponding to, e.g., the (0, 0) component, the (4, 0) component, the (0, 4) component, or the (4, 4) component, the selector 51 delivers the DCT coefficient to the accumulator 23A. The selector 51 causes the sum oddifying circuit shown in FIG. 25 to determine the sum of specific coefficients. The parity inverter 53 then operates on at least one of the specific DCT coefficients, if necessary, to make the sum of the specific DCT coefficient an odd number. The block of sum-oddified DCT coefficients is then fed to the IDCT circuit 15.

In another alternative, the selector 51 shown in FIG. 25 may be inserted into the line between the inverse quantizer 13 and the LSB detector 29 in the circuit shown in FIG. 24. The circuit shown in FIG. 24, modified in this way, would determine the exclusive logical sum of the LSBs of the specific DCT coefficients selected by the selector.

In a further alternative embodiment of the sum oddifying circuit 50, when the last DCT coefficient received from the inverse quantizer 13 is the DCT coefficient of DC component, i.e., when the order of the raster scan is opposite to that in the embodiments described above, the DCT coefficient to which the parity inversion operation applied is not the highest-frequency DCT component, but DCT coefficient of DC component.

An example of the practical circuit configuration of the parity inverter 53 will now be described with reference to FIG. 26. The parity inverter 53 is a simplified version of the parity inverter 28 shown in FIG. 11. The parity inverter 53 includes the LSB inverter 63, the third and fourth AND gates 64 and 65, the OR gate 66, and the inverter 71.

In the parity inverter 53, the LSB inverter 63 inverts the LSB of each DCT coefficient in the block of DCT coefficients received from the inverse quantizer 13. This inverts the parity of each DCT coefficient. Normally, the processing request signal REQ1 is absent, so the parity inverter feeds each DCT coefficient received to the IDCT circuit 15 (FIG. 23) via the third AND gate 64 and the OR gate 69.

When the DCT coefficient of the highest-frequency component in the block is received by the sum oddifying circuit 50 (FIG. 23), the count value coeff__adrs from the counter 20 indicates to the parity judgment circuit 21 that the value received by the parity judgment circuit is the sum of all the DCT coefficients in the block. In response, the parity judgment circuit determines whether the parity of the sum of the DCT coefficients is odd or even.

When the parity judgment circuit 21 determines that the parity of the sum of the DCT coefficients in the block is even, it feeds the processing request signal REQ1 to the parity inverter 53. The processing request signal arrives at the parity inverter 53 via the delay circuit 52 at the same time as the parity inventer receives the highest-frequency DCT coefficient via the delay circuit 52. The processing request signal REQ1 changes the states of the third and fourth AND gates 64 and 65. This feeds the LSB-inverted DCT coefficient of the highest-frequency component from the LSB inverter 63 to the IDCT circuit 15, via the fourth AND gate 65 and the OR gate 69. The LSB-inverted DCT coefficient of the highest-frequency component is fed to the IDCT circuit in lieu of the normal DCT coefficient of the highest-frequency component to oddify the sum of the DCT coefficients fed to the IDCT circuit.

On the other hand, when the parity judgment circuit 21 determines that the parity of the sum of the DCT coefficients in the block is odd, it does not generate the processing request signal REQ1. The parity inverter 53 feeds the normal DCT coefficient of the highest-frequency component to the IDCT circuit 15, via the AND gate 64 and the OR gate 69, since no sum oddifying of the block of DCT coefficients is required.

Figure 26:
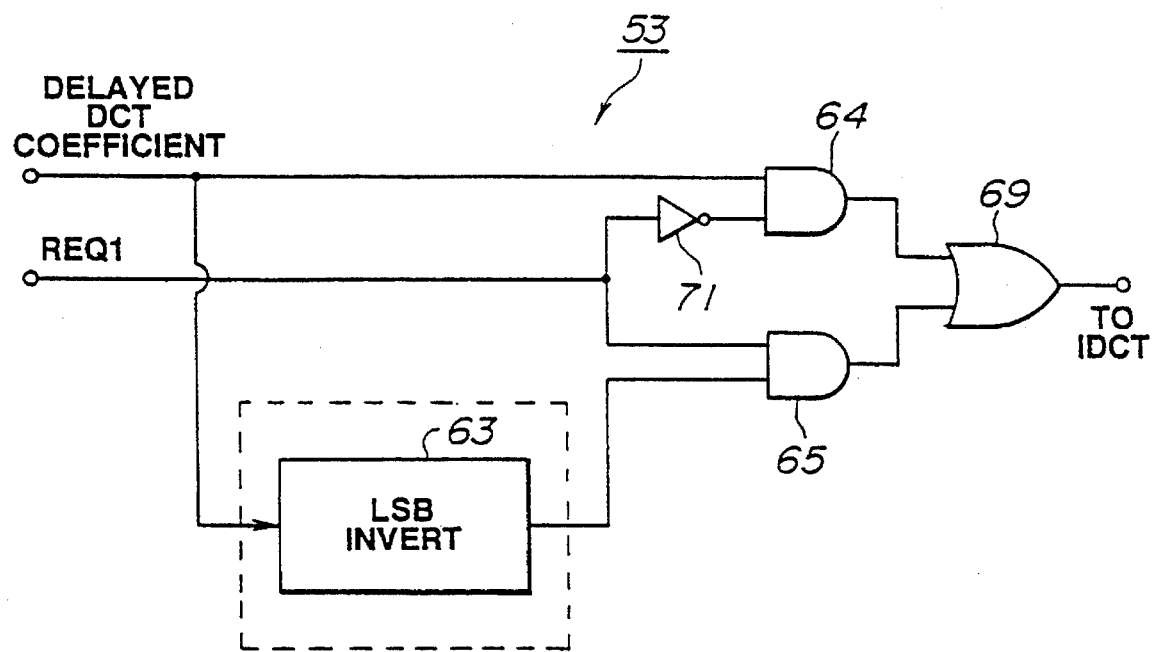
FIG. 26 is a block diagram showing an embodiment of the parity inverter in the sum oddifying circuits shown in FIGS. 23–25.
Figure 27:
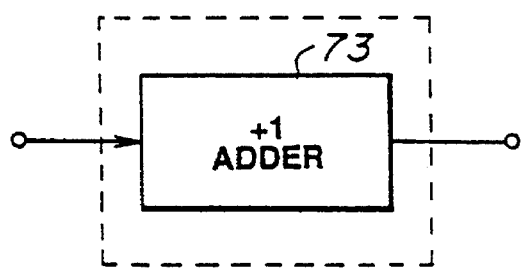
FIG. 27 shows a first variation on the parity inverter shown in FIG. 26.
Figure 28:
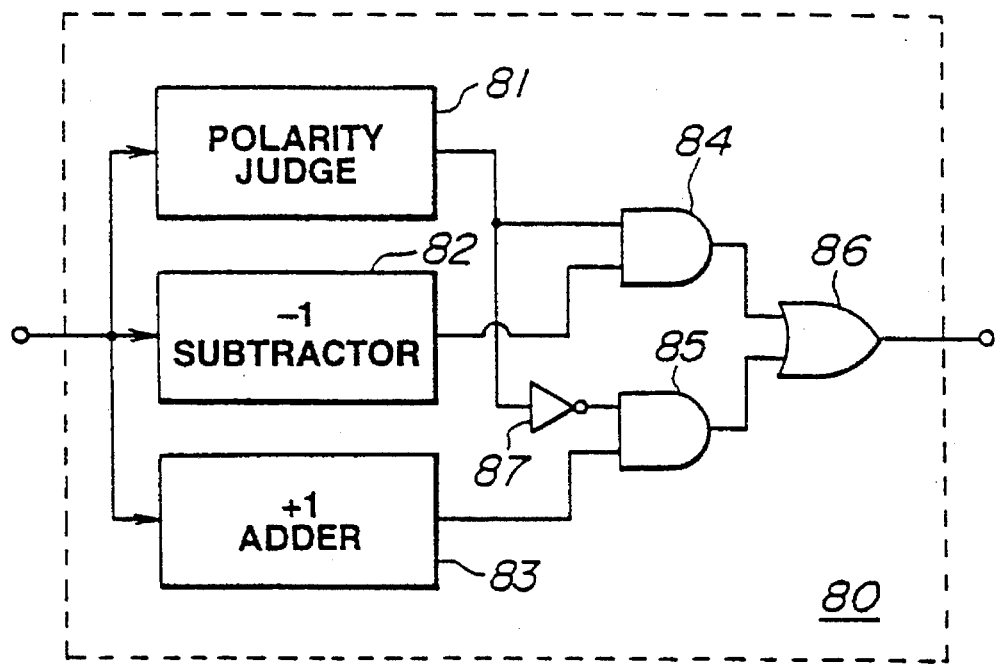
FIG. 28 shows a second variation on the parity inverter shown in FIG. 26.
Figure 29:
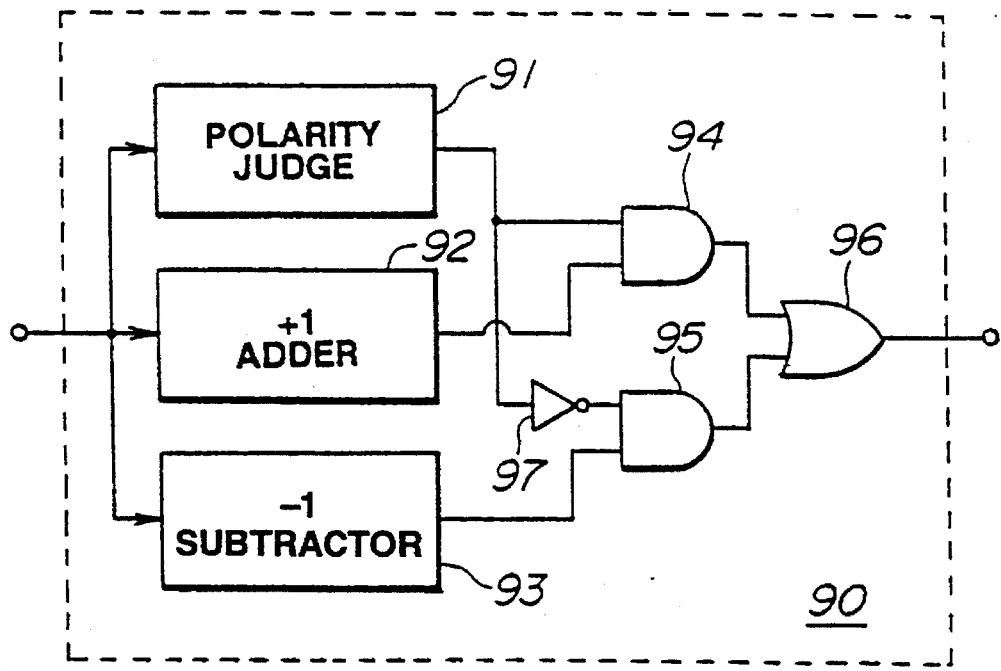
FIG. 29 shows a third variation on the parity inverter shown in FIG. 26.

Modifications to the practical example of the parity inverter 53 shown in FIG. 26 are shown in FIGS. 27 through 29.

FIG. 27 shows the +1 adder 73, similar to the +1 adder shown in FIG. 13, substituted for the LSB inverter 63 in the parity inverter shown in FIG. 26. The circuit is otherwise unchanged. The parity inverter modified as shown in FIG. 27 inverts the parity of each DCT coefficient in the block by adding one to it. Thus, when the parity judgment circuit 21 feeds the processing request signal REQ1 to the parity inverter, the parity inverter feeds to the IDCT circuit 15 the DCT coefficient of the highest-frequency component with one added to it in lieu of the normal highest-frequency DCT coefficient. This substitution oddities the sum of the DCT coefficients in the block.

As shown in FIG. 28, the magnitude reducing circuit 80 shown in FIG. 15 may be substituted for the LSB inverter 63 in the circuit shown in FIG. 26. The circuit shown in FIG. 26 is otherwise unchanged. The parity inverter shown in FIG. 26, modified as shown in FIG. 28, oddities the sum of the DCT coefficients according to equation (15), described above. When the parity judgment circuit 21 generates the processing request signal REQ1, the sum of the DCT coefficients in the block is oddified by feeding the DCT coefficient of the highest-frequency component with its parity inverted to the IDCT circuit 15. The parity of the DCT coefficient of the highest-frequency component is inverted in one of two ways: one is subtracted from the DCT coefficient of the highest-frequency component by the −1 subtractor 82 when the DCT coefficient of the highest-frequency component is positive, or one is added to the DCT coefficient of the highest-frequency component by the +1 adder 83 when the DCT coefficient of the highest-frequency component is zero or negative.

As shown in FIG. 29, the magnitude increasing circuit 90 shown in FIG. 17 may be substituted for the LSB inverter 63 in the circuit shown in FIG. 26. The circuit shown in FIG. 26 is otherwise unchanged. The parity inverter shown in FIG. 26, modified as shown in FIG. 29, oddities the sum of the DCT coefficients according to equation (16), described above. When the parity judgment circuit 21 generates the processing request signal REQ1, the sum of the DCT coefficients in the block is oddified by feeding the DCT coefficient of the highest-frequency component with its parity inverted to the IDCT circuit 15. The parity of the DCT coefficient of the highest-frequency component is inverted in one of two ways: one is subtracted from the DCT coefficient of the highest-frequency component by the −1 subtractor 93 when the DCT coefficient of the highest-frequency component is zero or negative, or one is added to the DCT coefficient of the highest-frequency component by the +1 adder 92 when the DCT coefficient of the highest-frequency component is positive.

Figure 30:
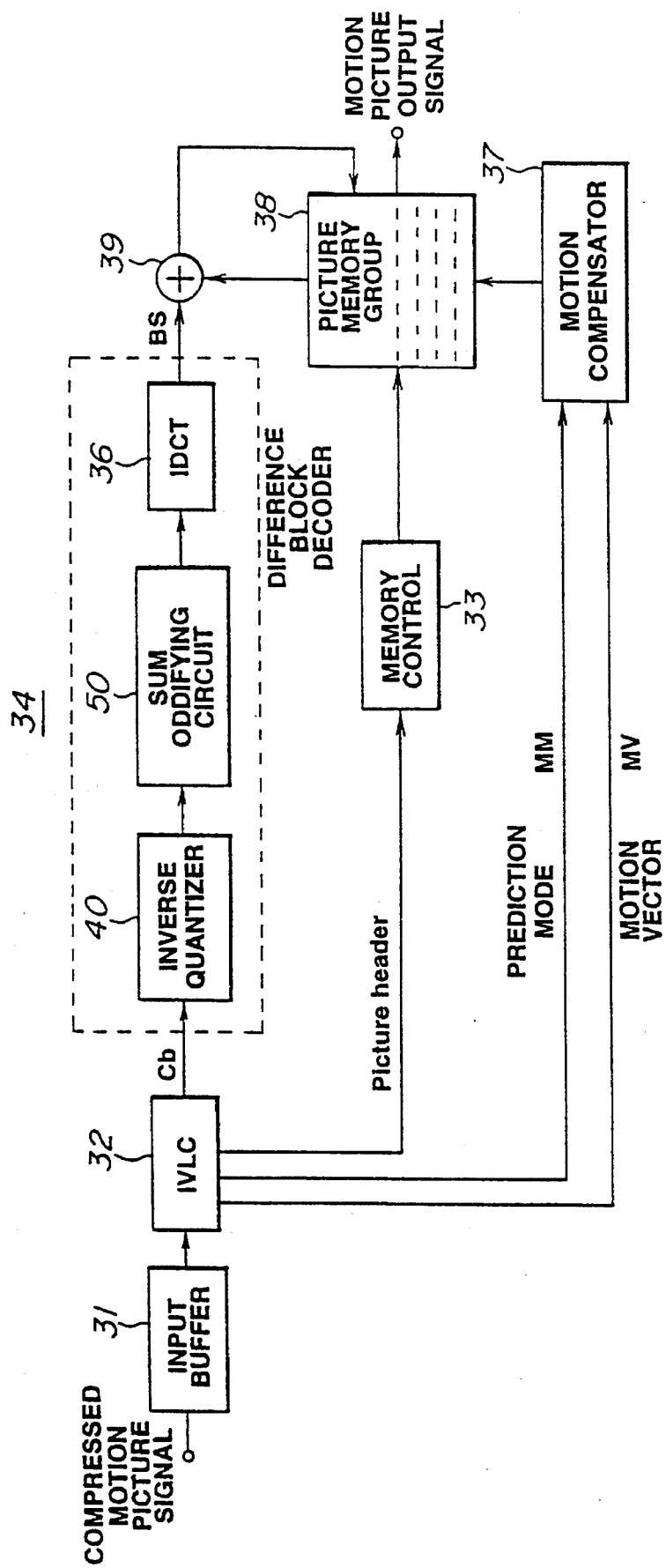
FIG. 30 is a block diagram showing the configuration of a second embodiment of the compressed motion picture signal expander apparatus according to the invention.

A second embodiment of the compressed motion picture signal expander will now be described with reference to FIG. 30.

In the second embodiment of the compressed motion picture signal expander, the sum oddifying circuit 50 is substituted for the sum oddifying circuit 35 in the first embodiment of the compressed motion picture signal expander shown in, and described above with reference to, FIG. 19. The circuit shown in FIG. 19 is otherwise unchanged. In the second embodiment of the compressed motion picture signal expander, the processing to oddify the sum of the DCT coefficients is carried out in a manner similar to the processing carried out by the sum oddifying circuit in the second embodiment of the motion picture signal compressor shown in, and described above with reference to, FIG. 22. Thus, in the second embodiment of the compressed motion picture signal expander, it is unnecessary to feed the address EOB_adrs from the inverse variable-length coder 32 to the sum oddifying circuit 50.

The invention described above makes it possible to realize a method and apparatus for pre-processing transform coefficients, a method and apparatus for performing inverse orthogonal transform, a method and apparatus for compressing an information signal, a method and apparatus for expanding a compressed information signal in which the probability of a mismatch error occurring in the course of inverse discrete cosine transform processing is reduced to the point at which mismatch errors do not occur in practice.

When an orthogonal transform is used to compress the motion picture signal and an inverse orthogonal transform is used to expand the compressed motion picture signal, the invention makes it possible to prevent inverse orthogonal transform mismatch errors from occurring. This prevents deterioration of picture quality. Accordingly, in a motion picture signal compressor and a compressed motion picture signal expander to which this invention is applied, there is no possibility of the locally-decoded pictures in the compressor, and the pictures reconstructed by the expander being different from one another. Thus, a high picture quality can be provided.

Although illustrative embodiments of the invention have been described herein in detail, it is to be understood that the invention is not limited to the precise embodiments described, and that various modifications may be practiced within the scope of the invention defined by the appended claims.

We claim:

1. A method of processing a set of transform coefficients, each of the transform coefficients having parity, to provide an error-immune set of transform coefficients for processing by an inverse orthogonal transform, the error-immune set of transform coefficients being immune to rounding errors when subject to the inverse orthogonal transform, the method comprising the steps of:

summing the transform coefficients in the set to provide a sum, the sum having parity;

judging the parity of the sum;

when the parity of the sum is even, inverting the parity of one of the transform coefficients in the set to provide a parity-inverted transform coefficient, the parity-inverted transform coefficient making the parity of the sum odd; and providing the transform coefficients including the parity-inverted transform coefficient as the error-immune set.

2. The method of claim 1, wherein the transform coefficients in the set all have a value other than zero.

3. The method of claim 1, wherein:

each transform coefficient in the set is represented by binary number having a least-significant bit; and in the step of summing the transform coefficients, only the least-significant bit of each transform coefficient is summed.

4. The method of claim 1, additionally comprising the step of selecting the transform coefficients in the set from a block of transform coefficients.

5. The method of claim 1, wherein:

the method is for processing transform coefficients resulting from a two-dimensional discrete cosine transform;

the set of transform coefficients includes a transform coefficient representing a DC component; and in the step of inverting the parity of one of the transform coefficients, the parity of one of the transform coefficients other than the transform coefficient representing the DC component is inverted.

6. The method of claim 5, wherein:

each transform coefficient in the set has a polarity; and the step of inverting the parity of one of the transform coefficients includes the steps of:
determining the polarity of the one of the transform coefficients,
when the polarity is negative, adding a predetermined odd value to the one of the transform coefficients, and
when the polarity is positive, subtracting the predetermined odd value from the one of the transform coefficients.

7. The method of claim 5, wherein:

the method additionally includes the step of receiving the transform coefficients in the set in serial order, the transform coefficients including a last-received transform coefficient; and in the step of inverting the parity of one of the transform coefficients, parity of the last-received transform coefficient is inverted.

8. The method of claim 5, wherein:

the set of transform coefficients also includes a transform coefficient representing a highest-frequency component; and in the step of inverting the parity of one of the transform coefficients, the parity of the transform coefficient representing the highest-frequency component is inverted.

9. The method of claim 8, wherein:

each transform coefficient in the set is represented by binary number having a least-significant bit; and in the step of inverting the parity of one of the transform coefficients, the least significant bit of the one of the transform coefficients is inverted.

10. An apparatus for pre-processing a set of transform coefficients, each of the transform coefficients having parity, to provide an error-immune set of transform coefficients for processing by an inverse orthogonal transform, the error-immune set of transform coefficients being immune to rounding errors when subject to the inverse orthogonal transform, the apparatus comprising:

an accumulator, the accumulator receiving each of the transform coefficients in the set and providing a sum having parity;

parity judgment means, receiving the sum from the accumulator, for judging the parity of the sum;

parity inverting means, operating when the parity judgment means judges that the parity of the sum is even, for inverting the parity of one of the transform coefficients to provide a parity-inverted transform coefficient, the parity-inverted transform coefficient making the parity of the sum odd; and means for providing the transform coefficients including the parity-inverted transform coefficient as the error-immune set.

11. The apparatus of claim 10, wherein:

each transform coefficient in the set is represented by binary number having a least-significant bit; and the accumulator includes means for summing only the least-significant bit of each transform coefficient.

12. The apparatus of claim 10, additionally comprising means for selecting the transform coefficients in the set from a block of transform coefficients.

13. The apparatus of claim 10. wherein:

the apparatus is for preprocessing a set of transform coefficients generated by a two-dimensional discrete cosine transform;

the set of transform coefficients includes a transform coefficient representing a DC component; and the parity inverting means is for inverting the parity of one of the transform coefficients other than the transform coefficient representing the DC component.

14. The apparatus of claim 13, wherein:

the set of transform coefficients also includes a transform coefficient representing a highest-frequency component; and the parity inverting means is for inverting the parity of the transform coefficient representing the highest-frequency component.

15. The apparatus of claim 14, wherein:

each transform coefficient in the set is represented by binary number having a least-significant bit; and the parity inverting means includes means for inverting the least significant bit of the one of the transform coefficients.

16. A method of inversely orthogonally transforming a set of transform coefficients without incurring rounding errors, each of the transform coefficients being represented by a binary number having a least-significant bit, the method comprising the steps of:

determining the least-significant bit of each of the transform coefficients;

counting the transform coefficients having a least-significant bit of one to provide a count;

judging when the count is an even number;

when the count is an even number, changing one of the transform coefficients to provide a changed transform coefficient, the changed transform coefficient making the count an odd number; and inversely orthogonally transforming the set of transform coefficients including the changed transform coefficient.

17. An apparatus for inversely orthogonally transforming a set of transform coefficients without incurring rounding errors, each of the transform coefficients having parity, the apparatus comprising:

means for summing the transform coefficients to provide a sum, the sum having parity;

parity judging means for judging the parity of the sum;

sum oddifying means, operating when the parity judging means judges that the parity of the sum is even, for inverting the parity of one of the transform coefficients to provide a parity-inverted transform coefficient, the parity-inverted transform coefficient making the sum odd; and an inverse orthogonal transform circuit receiving the set of transform coefficients, including the parity-inverted transform coefficient, from the sum oddifying means.

18. The apparatus of claim 17, wherein the sum oddifying means adds one to the one of the transform coefficients when the parity judging means judges that the parity of the sum is even.

19. The apparatus of claim 17, wherein: each transform coefficient has a polarity; and the sum oddifying means includes:

polarity determining means for determining the polarity of each transform coefficient, and means, operating in response to the polarity determining means, for adding one to the transform coefficient when the polarity determining means determines that the polarity of the transform coefficient is positive, and for subtracting one from the transform coefficient when the polarity determining means determines that the polarity of the transform coefficient is negative.

20. The apparatus of claim 17, wherein:

each transform coefficient in represented by a binary number having a least-significant bit; and the parity judging means comprises:

LSB detecting means for detecting the least-significant bit of each transform coefficient;

an exclusive logical OR gate including a first input receiving the least-significant bit of each transform coefficient from the LSB detecting means, a second input, and an output;

a register having an input connected to the output of the exclusive-OR gate and an output connected to the second input of the exclusive-OR gate; and a parity judging circuit connected to the output of the register.

21. An apparatus for inversely orthogonally transforming a set of transform coefficients without incurring rounding errors, each of the transform coefficients being represented by a binary number including a least-significant bit having a state, the state being one of a one state and a zero state, the apparatus comprising:

least significant bit judging means for judging the state of the least-significant bit of each transform coefficient;

counting means for providing a count by counting the transform coefficients whose least-significant bits are judged by the least-significant bit judging means to be in the one state;

count judging means for judging when the count from the counting means is an even number;

count oddifying means, operating when the count judging means judges that the count is an even number, for changing one of the transform coefficients to provide a changed transform coefficient, the changed transform coefficient making the count an odd number; and an inverse orthogonal transform circuit, receiving the set of transform coefficients, including the changed transform coefficient, from the count oddifying means.

22. An apparatus for compressing a motion picture signal, the motion picture signal including pictures, each picture being divided into blocks, the apparatus comprising:

predictive coder means for predictively coding blocks of the motion picture signal by using matching blocks of a reference picture to form difference blocks;

difference block encoding means for compressing the difference blocks from the predictive coder means to form a compressed motion picture signal, the difference block encoding means including:
  orthogonal transform means for orthogonally transforming the difference blocks from the predictive coder means to provide blocks of transform coefficients, and
  quantizing means for quantizing the blocks of transform coefficients from the orthogonal transform means to provide compressed signal blocks wherefrom the compressed motion picture signal is derived;
local decoding means for expanding the compressed signal blocks from the difference block encoding means to provide restored difference blocks without incurring rounding errors when the compressed signal blocks are inversely orthogonally transformed, the local decoding means including:
  inverse quantizing means for inversely quantizing the compressed signal blocks from the difference block encoding means to provide blocks of restored transform coefficients, each of the restored transform coefficients having parity,
  means for summing the restored transform coefficients in each block of transform coefficients from the inverse quantizing means to provide a sum, the sum having parity,
  parity judging means for judging the parity of the sum,
  sum oddifying means, operating when the parity judging means judges that the parity of the sum is even, for inverting the parity of one of the restored transform coefficients in the block to provide a parity-inverted transform coefficient, the parity-inverted transform coefficient making the sum odd, and
  an inverse orthogonal transform circuit, receiving the block of restored transform coefficients, including the parity-inverted transform coefficient, from the sum oddifying means, the inverse orthogonal transform circuit providing the restored difference blocks;
predictive decoder means for predictively decoding the restored difference blocks from the local decoding means to reconstruct picture blocks corresponding to the blocks of the motion picture signal; and
a picture memory, the picture memory storing the reconstructed picture blocks from the predictive decoding means as blocks of a reconstructed picture for use as a reference picture for predictively coding other pictures of the motion picture signal.

23. The apparatus of claim 22, wherein:
the apparatus is additionally for recording the compressed motion picture signal on a recording medium; and
the apparatus additionally comprises:
  means for applying variable-length coding to the compressed signal blocks to derive the compressed motion picture signal;
  means for deriving a recording signal from the compressed motion picture signal; and
  means for recording the recording signal on the recording medium.

24. The apparatus of claim 22, wherein:
the apparatus is additionally for transmitting the compressed motion picture signal via a transmission medium; and
the apparatus additionally comprises:
  means for applying variable-length coding to the compressed signal blocks to derive the compressed motion picture signal;
  means for deriving a transmission signal from the compressed motion picture signal; and
  means for transmitting the transmission signal via the transmission medium.

25. The apparatus of claim 22, wherein
the picture memory is a second picture memory, and the apparatus additionally comprises a first picture memory, the first picture memory temporarily storing the motion picture signal;
the predictive coder means is for predictively coding blocks of the motion picture signal read out from the first picture memory;
the apparatus additionally comprises:
  variable length coding means for deriving the compressed motion picture signal by applying variable length coding to the compressed signal blocks from the difference block encoding means, and
  motion compensator means for detecting motion between the reconstructed pictures stored in the second picture memory and the motion picture signal stored in the first picture memory, for applying motion compensation to already-reconstructed pictures stored in the second picture memory in response to the detected motion to derive matching blocks of one of the already-reconstructed pictures selected as a reference picture, and for providing the matching blocks to the predictive coder means.

26. The apparatus of claim 25, wherein:
the apparatus is additionally for recording the compressed motion picture signal on a recording medium; and
the apparatus additionally comprises:
  means for deriving a recording signal from the compressed motion picture signal, and
  means for recording the recording signal on the recording medium.

27. The apparatus of claim 25, wherein:
the apparatus is additionally for transmitting the compressed motion picture signal via a transmission medium; and
the apparatus additionally comprises:
  means for deriving a transmission signal from the compressed motion picture signal, and
  means for transmitting the transmission signal via the transmission medium.

28. An apparatus for compressing a motion picture signal, the motion picture signal including pictures, each picture being divided into blocks, the apparatus comprising:
predictive coder means for predictively coding blocks of the motion picture signal by using matching blocks of a reference picture to form difference blocks;
difference block encoding means for compressing the difference blocks from the predictive coder means to form a compressed motion picture signal, the difference block encoding means including:
  orthogonal transform means for orthogonally transforming the difference blocks from the predictive coder means to provide blocks of transform coefficients, and
  quantizing means for quantizing the blocks of transform coefficients from the orthogonal transform means to provide compressed signal blocks wherefrom the compressed motion picture signal is derived;
local decoding means for expanding the compressed signal blocks from the difference block encoding means to provide restored difference blocks without incurring rounding errors when the compressed signal blocks are inversely orthogonally transformed, the local decoding means including;

inverse quantizing means for inversely quantizing the compressed signal blocks from the difference block encoding means to provide blocks of restored transform coefficients, each of the restored transform coefficients being represented by a binary number including a least-significant bit, least-significant bit determining means for determining the least-significant bit of each of the restored transform coefficients, counting means for providing a count by counting the restored transform coefficients in each block having least-significant bits of one, count judging means for judging when the count from the counting means is an even number, count oddifying means, operating when the count judging means judges that the count is an even number, for changing one of the restored transform coefficients in the block to provide a changed transform coefficient, the changed transform coefficient making the count an odd number, and an inverse orthogonal transform circuit, receiving each block of restored transform coefficients, including the changed transform coefficient, from the count oddifying means, the inverse orthogonal transform circuit additionally providing the restored difference blocks;

predictive decoder means for predictively decoding the restored difference blocks from the local decoding means to reconstruct picture blocks corresponding to the blocks of the motion picture signal; and a picture memory, the picture memory storing the reconstructed picture blocks from the predictive decoding means as blocks of a reconstructed picture for use as a reference picture for predictively coding other pictures of the motion picture signal.

29. The apparatus of claim 28, wherein:

the apparatus is additionally for recording the compressed motion picture signal on a recording medium; and the apparatus additionally comprises:
means for applying variable-length coding to the compressed signal blocks to derive the compressed motion picture signal,
means for deriving a recording signal from the compressed motion picture signal, and
means for recording the recording signal on the recording medium.

30. The apparatus of claim 28, wherein:

the apparatus is additionally for transmitting the compressed motion picture signal via a transmission medium; and the apparatus additionally comprises:
means for applying variable-length coding to the compressed signal blocks to derive the compressed motion picture signal,
means for deriving a transmission signal from the compressed motion picture signal, and
means for transmitting the transmission signal via the transmission medium.

31. The apparatus of claim 28, wherein the picture memory is a second picture memory, and the apparatus additionally comprises a first picture memory, the first picture memory temporarily storing the motion picture signal;

the predictive coder means is for predictively coding blocks of the motion picture signal read out from the first picture memory;

the apparatus additionally comprises:
variable-length coding means for deriving the compressed motion picture signal by applying variable-length coding to the compressed signal blocks from the difference block encoding means, and
motion compensator means for detecting motion between the reconstructed pictures stored in the second picture memory and the motion picture signal stored in the first picture memory, for applying motion compensation to already-reconstructed pictures stored in the second picture memory in response to the detected motion to derive matching blocks of one of the reconstructed pictures selected as a reference picture, and for providing the matching blocks to the predictive coder means.

32. The apparatus of claim 31, wherein:

the apparatus is additionally for recording the compressed motion picture signal on a recording medium; and the apparatus additionally comprises:
means for deriving a recording signal from the compressed motion picture signal, and
means for recording the recording signal on the recording medium.

33. The apparatus of claim 31, wherein:

the apparatus is additionally for transmitting the compressed motion picture signal via a transmission medium; and the apparatus additionally comprises:
means for deriving a transmission signal from the compressed motion picture signal, and
means for transmitting the transmission signal via the transmission medium.

34. An apparatus for expanding a compressed motion picture signal to provide a motion picture output signal, the compressed motion picture signal including signal portions each representing a picture of the motion picture output signal, the signal portions including variable-length coded compressed signal blocks, the apparatus comprising:

an inverse variable-length coding means for applying inverse variable length coding to the variable-length coded compressed signal blocks to provide compressed signal blocks;

decoding means for expanding the compressed signal blocks from the inverse variable-length coding means to provide restored difference blocks without incurring rounding errors when the compressed signal blocks are inversely orthogonally transformed, the decoding means including;

inverse quantizing means for inversely quantizing each compressed signal block from the difference block encoding means to provide a block of restored transform coefficients, each of the restored transform coefficients having parity, means for summing the restored transform coefficients in the block of transform coefficients from the inverse quantizing means to provide a sum, the sum having parity, parity judging means for judging the parity of the sum, sum oddifying means, operating when the parity judging means judges that the parity of the sum is even, for inverting the parity of one of the restored transform coefficients in the block to provide a parity-inverted transform coefficient, the parity-inverted transform coefficient making the parity of the sum odd, and an inverse orthogonal transform circuit, receiving the block of restored transform coefficients, including the parity-inverted transform coefficient, from the sum oddifying means, the inverse orthogonal transform circuit providing the restored difference blocks.

35. The apparatus of claim 34, wherein:

the variable-length decoding means additionally provides motion vectors and prediction mode data; and the apparatus additionally comprises:

predictive decoder means, operating in response to matching blocks, for predictively decoding the restored difference blocks from the decoding means to reconstruct the reconstructed picture blocks, a picture memory, the picture memory storing the reconstructed picture blocks from the predictive decoding means as blocks of a reconstructed picture for use as a reference picture for predictively decoding other pictures of the motion picture signal, means, operating the response to the motion vectors and the prediction mode data from the inverse variable-length coding means, for performing motion compensation on already-reconstructed pictures stored in the picture memory to derive, from one of the already-reconstructed pictures selected as a reference picture, blocks of the reference picture as matching blocks, and to provide the matching blocks to the predictive decoder means, and means for deriving the motion picture output signal by reading the reconstructed pictures from the picture memory.

36. An apparatus for expanding a compressed motion picture signal to provide a motion picture output signal, the compressed motion picture signal including signal portions each representing a picture of the motion picture output signal, the signal portions including variable-length coded compressed signal blocks, the apparatus comprising:

an inverse variable-length coding means for applying inverse variable length coding to the variable-length coded compressed signal blocks to provide compressed signal blocks;

decoding means for expanding the compressed signal blocks from the inverse variable-length coding means to provide restored difference blocks without incurring rounding errors when the compressed signal blocks are inversely orthogonally transformed, the decoding means including;

inverse quantizing means for inversely quantizing each of the compressed signal blocks from the inverse variable-length coding means to provide a block of restored transform coefficients, each of the restored transform coefficients being represented by a binary number including a least-significant bit having a state, the state being one of a one state and a zero state, least-significant bit judging means for judging the state of the least-significant bit of each of the restored transform coefficients, counting means for providing a count by counting the transform coefficients in the block whose least-significant bits are judged by the least-significant bit judging means to be in the one state, count judging means for judging when the count from the counting means is an even number, count oddifying means, operating when the count judging means judges that the count is an even number, for changing one of the restored transform coefficients to provide a changed transform coefficient, the changed transform coefficient making the count an odd number, and an inverse orthogonal transform circuit, receiving the block of restored transform coefficients, including the changed transform coefficient, from the count oddifying means, the inverse orthogonal transform circuit additionally providing the restored difference blocks.

37. The apparatus of claim 36, wherein:

the variable-length decoding means additionally provides motion vectors and prediction mode data; and the apparatus additionally comprises:

predictive decoder means, operating in response to matching blocks, for predictively decoding the restored difference blocks from the decoding means to reconstruct picture blocks, a picture memory, the picture memory storing the reconstructed picture blocks from the predictive decoder means as blocks of a reconstructed picture for use as a reference picture for predictively decoding other pictures of the motion picture signal, means, operating the response to the motion vectors and the prediction mode data from the inverse variable-length coding means, for performing motion compensation on already-reconstructed pictures stored in the picture memory to derive, from one of the already-reconstructed pictures selected as a reference picture, blocks of the reference picture as the matching blocks, and to provide the matching blocks to the predictive decoder means, and means for reading the motion picture output signal from the picture memory.

38. A method of compressing a motion picture signal to provide a compressed motion picture signal, the method comprising the steps of:

applying prediction coding and orthogonal transform processing to blocks of the motion picture signal to provide blocks of transform coefficients wherefrom the compressed motion picture signal is derived; and sum oddifying the blocks of transform coefficients prior to applying inverse orthogonal transform processing and prediction decoding to the blocks of transform coefficients to provide blocks of a reconstructed picture for use as a reference picture in prediction coding other pictures of the motion picture signal.

39. The method of claim 38, wherein the step of sum oddifying the blocks of transform coefficients comprises the steps of:

summing the transform coefficients in each block to provide a sum, the transform coefficients and the sum each having having parity;

judging when the parity of the sum is even; and when the parity of the sum is judged to be even, inverting the parity of one of the transform coefficients in the block to make the parity of the sum odd.

40. The method of claim 38, wherein:

each transform coefficient is represented by a binary number including a least-significant bit; and the step of sum oddifying the blocks of transform coefficients comprises the steps of:

determining the least-significant bit of each of the transform coefficients, counting the transform coefficients in the block having a least-significant bit of one to provide a count, and when the count is an even number, changing one of the transform coefficients in the block by one.

41. The method of claims 38, 39, or 40, wherein:

the method is additionally for recording the compressed motion picture signal on a recording medium; and the method additionally comprises the steps of:
providing a recording medium,
deriving a recording signal from the compressed motion picture signal, and
recording the recording signal on the recording medium.

42. The method of claims 38, 39, or 40, wherein:

the method is additionally for transmitting the compressed motion picture signal via a transmission medium; and the method additionally comprises the steps of:
providing a transmission medium,
deriving a transmission signal from the compressed motion picture signal, and
feeding the transmission signal into the transmission medium.

43. A method for compressing a motion picture signal to provide a compressed motion picture signal, the method comprising the steps of:

detecting motion between blocks of a picture of the motion picture signal and blocks of a reconstructed picture serving as a reference picture;

applying motion compensation to the reference picture in response to the motion detected by the detecting step to derive matching blocks of the reference picture;

using the matching blocks of the reference picture to apply predictive coding to the blocks of the picture of the motion picture signal to provide blocks of differences;

orthogonally transforming the blocks of differences to provide blocks of transform coefficients;

deriving the compressed signal from the blocks of transform coefficients by applying quantizing and variable-length coding;

prior to applying inverse orthogonal transform processing to the blocks of transform coefficients to provide blocks of restored differences, sum oddifying each block of transform coefficients to prevent rounding errors in the inverse orthogonal transform processing; and applying prediction decoding to the blocks of restored differences to provide picture blocks of an additional reconstructed picture for use as the reference picture in applying predictive coding to other pictures of the motion picture signal.

44. The method of claim 43, wherein the step of sum oddifying the blocks of transform coefficients comprises the steps of:

summing the transform coefficients in each block to provide a sum, the transform coefficients and the sum each having parity;

judging when the parity of the sum is even; and when the parity of the sum is judged to be even, inverting the parity of one of the transform coefficients in the block to make the parity of the sum odd.

45. The method of claim 43, wherein:

each transform coefficient is represented by a binary number including a least-significant bit; and the step of sum oddifying each block of transform coefficients comprises the steps of:
determining the least-significant bit of each of the transform coefficients,
counting the transform coefficients having a least-significant bit of one in the block to provide a count, and
when the count is an even number, changing one of the transform coefficients in the block by one.

46. The method of claims 43, 44, or 45, wherein:

the method is additionally for recording the compressed motion picture signal on a recording medium; and the method additionally comprises the steps of:
providing a recording medium,
deriving a recording signal from the compressed motion picture signal, and
recording the recording signal on the recording medium.

47. The method of claims 43, 44, or 45, wherein:

the method is additionally for transmitting the compressed motion picture signal via a transmission medium; and the method additionally comprises the steps of:
providing a transmission medium,
deriving a transmission signal from the compressed motion picture signal, and
feeding the transmission signal into the transmission medium.

* * * * *